US010065463B2

(12) United States Patent
Lawson et al.

(10) Patent No.: US 10,065,463 B2
(45) Date of Patent: Sep. 4, 2018

(54) INFLATION WORK STATION

(71) Applicant: Android Industries LLC, Auburn Hills, MI (US)

(72) Inventors: Lawrence J. Lawson, Troy, MI (US); Robert Reece, Clarkston, MI (US)

(73) Assignee: Android Industries LLC, Auburn Hills, MI (US)

(*) Notice: Subject to any disclaimer, the term of this patent is extended or adjusted under 35 U.S.C. 154(b) by 244 days.

(21) Appl. No.: 15/203,330

(22) Filed: Jul. 6, 2016

(65) Prior Publication Data

US 2016/0311276 A1 Oct. 27, 2016

Related U.S. Application Data

(63) Continuation of application No. 14/250,077, filed on Apr. 10, 2014, now Pat. No. 9,440,503, which is a
(Continued)

(51) Int. Cl.
*B60C 25/14* (2006.01)
*B25J 11/00* (2006.01)
(Continued)

(52) U.S. Cl.
CPC .......... *B60C 25/145* (2013.01); *B25J 9/0093* (2013.01); *B25J 11/00* (2013.01); *B60C 25/132* (2013.01);
(Continued)

(58) Field of Classification Search
CPC . B60C 25/132; B60C 25/145; B60C 25/0512; B60C 25/0515; B60C 25/12;
(Continued)

(56) References Cited

U.S. PATENT DOCUMENTS

| | | | |
|---|---|---|---|
| 2,918,115 | A | 12/1959 | Twiford |
| 3,182,823 | A | 5/1965 | Chasar |

(Continued)

FOREIGN PATENT DOCUMENTS

| | | |
|---|---|---|
| CA | 2314617 | 1/2002 |
| CN | 2093111 | 1/1992 |

(Continued)

OTHER PUBLICATIONS

Office Action from the Chinese Patent Office dated Jan. 15, 2010 for application No. 200680002608.1.

(Continued)

*Primary Examiner* — David B Thomas
(74) *Attorney, Agent, or Firm* — Honigman Miller Schwartz and Cohn LLP

(57) ABSTRACT

An inflation work station for inflating a tire-wheel assembly including a tire mounted to a wheel is disclosed. The inflation work station includes at least one inflation probe including a female portion and a male portion. The male portion is arrangeable with respect to the female portion in one of a non-mated orientation such that the at least one inflation probe is arranged in an offline orientation and a mated orientation such that the at least one inflation probe is arranged in an online orientation. The inflation work station further includes a working device including a controller, at least one movement actuator connected to the controller and the at least one inflation probe. The at least one movement actuator imparts movement to the male portion to result in the online/offline orientation of the at least one inflation probe. The inflation work station includes at least one valve connected to the controller and the at least one inflation probe. The inflation workstation includes at least one pressurized fluid source connected to the at least one inflation probe by way of the at least one valve to permit or deny
(Continued)

communication of a pressurized fluid of the at least one pressurized fluid source to a cavity formed by the tire-wheel assembly for inflating the tire-wheel assembly. A method is also disclosed.

20 Claims, 65 Drawing Sheets

Related U.S. Application Data continuation of application No. 13/347,390, filed on Jan. 10, 2012, now Pat. No. 8,701,736, which is a continuation-in-part of application No. 12/826,884, filed on Jun. 30, 2010, now Pat. No. 8,365,794, which is a continuation-in-part of application No. 11/335,063, filed on Jan. 18, 2006, now Pat. No. 7,845,655.

(60) Provisional application No. 60/644,857, filed on Jan. 18, 2005.

(51) Int. Cl.

| | |
|---|---|
| ***B25J 9/00*** | (2006.01) |
| ***B60S 5/04*** | (2006.01) |
| ***B60C 25/132*** | (2006.01) |
| *B60C 25/05* | (2006.01) |
| *B60C 25/12* | (2006.01) |
| *B62D 63/02* | (2006.01) |

(52) U.S. Cl.

CPC ............. *B60S 5/04* (2013.01); *B60C 25/0512* (2013.01); *B60C 25/0515* (2013.01); *B60C 25/12* (2013.01); *B62D 63/02* (2013.01)

(58) Field of Classification Search

CPC . B25J 9/0093; B25J 11/00; B60S 5/04; B62D 63/02

See application file for complete search history.

(56) References Cited

U.S. PATENT DOCUMENTS

| | | | | |
|---|---|---|---|---|
| 3,866,654 | A | 2/1975 | Duquesne | |
| 4,137,984 | A | 2/1979 | Jennings et al. | |
| 4,884,611 | A | 12/1989 | Schmidt | |
| 5,072,765 | A | 12/1991 | Kane et al. | |
| 5,074,143 | A | 12/1991 | Nolan et al. | |
| 5,115,747 | A | 5/1992 | Teissier et al. | |
| 5,257,443 | A | 11/1993 | Tanimura et al. | |
| 5,570,733 | A | 11/1996 | Desparois et al. | |
| 5,575,605 | A | 11/1996 | Fisher | |
| 5,878,801 | A | 3/1999 | Ellis | |
| 6,089,083 | A | 7/2000 | Curtis | |
| 6,095,541 | A | 8/2000 | Turner et al. | |
| 6,148,892 | A | 11/2000 | Koerner et al. | |
| 6,392,322 | B1 | 5/2002 | Mares et al. | |
| 7,044,188 | B2 | 5/2006 | Pellerin et al. | |
| 7,495,755 | B2 | 2/2009 | Voeller et al. | |
| 8,176,960 | B2 * | 5/2012 | Lawson | B60C 25/145 157/1 |
| 8,365,794 | B2 * | 2/2013 | Lawson | B25J 15/10 157/1.1 |
| 8,701,736 | B2 | 4/2014 | Lawson et al. | |
| 9,440,503 | B2 * | 9/2016 | Lawson | B60C 25/132 |
| 2006/0169415 | A1 * | 8/2006 | Lawson | B60C 25/132 157/1.1 |
| 2009/0084506 | A1 | 4/2009 | Lawson et al. | |
| 2010/0263801 | A1 | 10/2010 | Lawson et al. | |
| 2011/0132491 | A1 | 6/2011 | Donnay et al. | |
| 2014/0216600 | A1 * | 8/2014 | Lawson | B60C 25/132 141/4 |
| 2015/0047740 | A1 * | 2/2015 | Lawson | B60C 25/145 141/83 |

FOREIGN PATENT DOCUMENTS

| | | | |
|---|---|---|---|
| DE | 19823260 | | 12/1999 |
| DE | 19823260 | A1 | 12/1999 |
| DE | 29907990 | | 12/1999 |
| DE | 29907990 | U1 | 12/1999 |
| DE | 102005001212 | A1 | 7/2006 |
| EP | 0052586 | | 5/1982 |
| EP | 0544150 | | 6/1993 |
| EP | 1342593 | A1 | 9/2003 |
| EP | 2193875 | A1 | 6/2010 |
| JP | 06-080090 | | 3/1994 |
| JP | 06080090 | | 3/1994 |
| JP | 11-129714 | A | 5/1999 |
| KR | 20020043291 | A | 6/2002 |
| WO | WO-03/049988 | | 6/2003 |
| WO | WO-2006078784 | A2 | 7/2006 |
| WO | WO-2011/063134 | A2 | 5/2011 |

OTHER PUBLICATIONS

Office Action from the Canadian Patent Office Action dated Mar. 1, 2010 for Application No. 2,591,674.

Office Action from Mexican Patent Office for Application MX/a/2007/008703 dated Apr. 4, 2010.

European Search Report for Application EP10155607 dated May 7, 2010.

Office Action dated Jan. 11, 2010 for U.S. Appl. No. 11/335,063.

Office Action dated Jun. 22, 2010 for U.S. Appl. No. 11/335,063.

Office Action from Canadian Patent Office for Application 2,591,674 dated Apr. 15, 2011.

International Search Report for application PCT/US2011/039936 dated Feb. 29, 2012.

Office Action from Mexican Patent Office for application No. MX/a/2009/011229 dated May 16, 2012.

Extended European Search Report for Application No. 11804003.9 dated Oct. 31, 2013.

Office Action from counterpart Chinese Application No. 201210015463.6 dated Dec. 27, 2013 (8 pages).

European Search Report for EP 13736017 dated Oct. 14, 2015.

Office Action dated Mar. 24, 2016 for U.S. Appl. No. 14/250,077.

Office Action dated May 26, 2016 for U.S. Appl. No. 14/250,0077.

* cited by examiner

INFLATION WORK STATION

CROSS-REFERENCE TO RELATED APPLICATIONS

This disclosure is a continuation of U.S. patent application Ser. No. 14/250,077 filed on Apr. 10, 2014, which is a continuation of U.S. patent application Ser. No. 13/347,390 filed on Jan. 10, 2012, which is a continuation-in-part of U.S. patent application Ser. No. 12/826,884 filed on Jun. 30, 2010, which was a continuation-in-part of U.S. patent application Ser. No. 11/335,063 filed on Jan. 18, 2006, which claims priority to U.S. Provisional Patent Application No. 60/644,857 filed on Jan. 18, 2005. The disclosures of these prior applications are considered part of the disclosure of this application and are hereby incorporated by reference in their entireties.

TECHNICAL FIELD

The disclosure generally relates to transportation and manipulation systems and more particularly relates to systems for transporting and manipulating tires and wheels.

BACKGROUND

It is known in the art that a tire-wheel assembly is processed in several steps. Usually, conventional methodologies that conduct such steps require a significant capital investment and human oversight. The present disclosure provides several exemplary implementations that overcome drawbacks associated with the prior art by setting forth several devices that may be utilized for processing a tire-wheel assembly.

DESCRIPTION OF THE DRAWINGS

FIG. 51C' illustrates an enlarged view of FIG. 51C.

DETAILED DESCRIPTION

Figure 1:
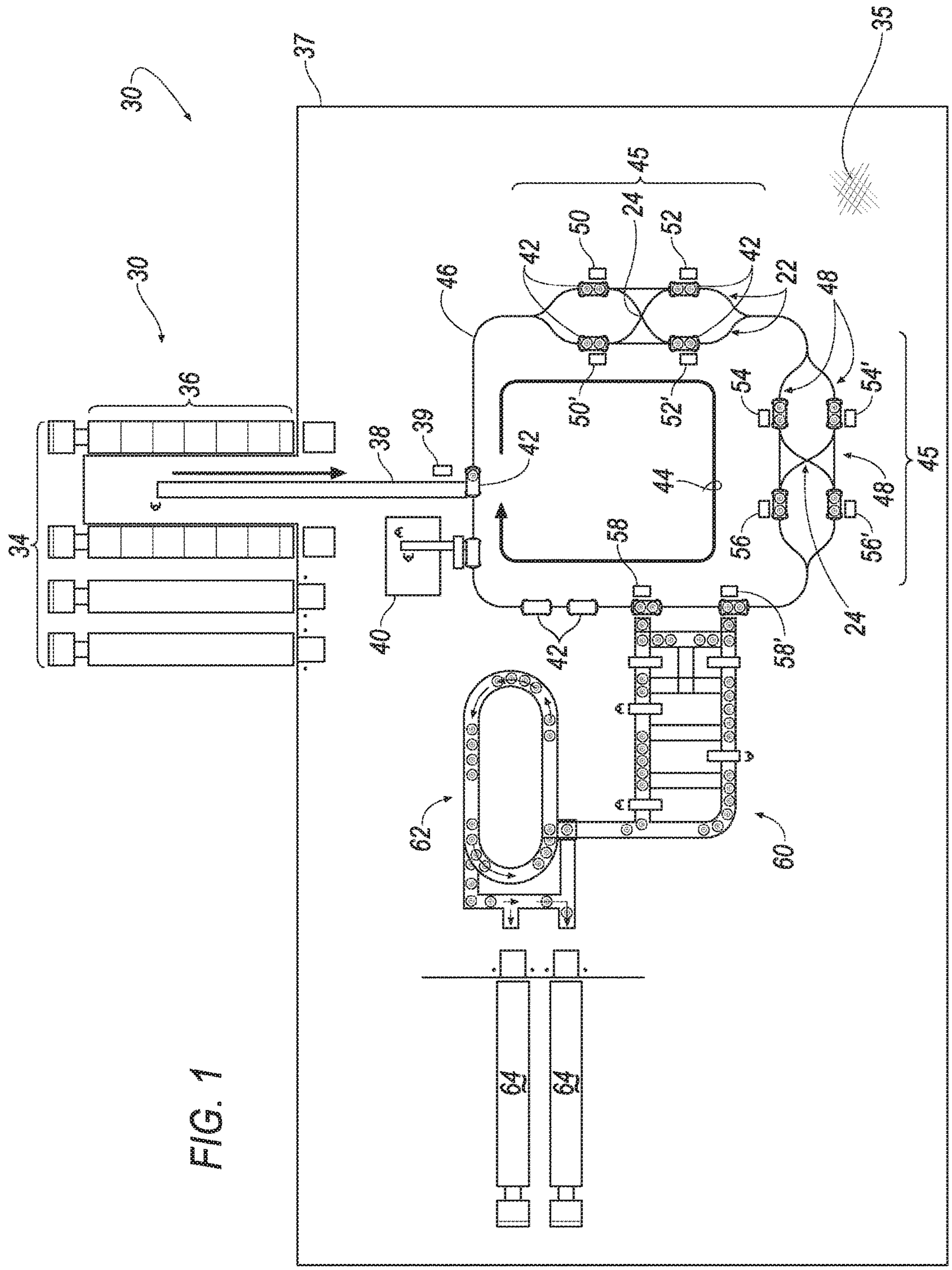
FIG. 1 is a schematic view of an exemplary plant layout utilizing a plurality of work stations and a plurality of wheeled carts to transport tires, wheels, and tire/wheel assemblies between work stations.

The Figures illustrate exemplary inflation work station. Based on the foregoing, it is to be generally understood that the nomenclature used herein is simply for convenience and the terms used to describe the implementations should be given the broadest meaning by one of ordinary skill in the art.

Plant Layout

The plant layout 30 of the present disclosure includes one or more delivery areas 34 adapted to accept the inflow of vehicles carrying wheels, tires, tire pressure valves, tire pressure sensors, and any other components or subcomponents that are adapted to be integrated into a completed tire/wheel assembly. Delivery areas 34 can be adapted to receive trucks, railroad cars or any other delivery means commonly used for the delivery of components used in a tire/wheel assembly. The components are unloaded from the vehicles docked in the delivery areas and they may be transported therefrom to one or more staging areas 36. Staging areas 36 can be used for component inspection, testing, or pre-assembly. Once the components are ready for assembly, they are transported by way of a transport means 38 to a first work station 39. Transport means 38 can be a conveyor system, a wheeled cart or any mechanism used to transport components. First work station 39 operates in a first manner upon the tire/wheel assembly. The particulars of this first operation may include any number of operations (such as mounting an air inflation valve to a wheel and applying soap to select surfaces of the tire, the wheel, or both, or the like). Work station 39 may represent a manual operation, a fully automatic operation, or a hybrid manual-automatic operation. After the task performed at first work station 40 is complete, wheeled cart 42 manipulates its way along circuit 44 by way of track 46. Track 46 is designed to define one or more paths of travel available to wheeled cart 42 and can be comprised of traditional track materials (such as rails and the like) or, it may be comprised of any means that wheeled cart 42 can use to guide its movement as it traverses circuit 44.

Alternatives to installing traditional track materials include a painted line or the like disposed on a floor surface 35 of plant 37. This painted line can be detected using an optical track sensing device located on wheeled cart 42 to guide the traversal path of wheeled cart 42 as it traverses circuit 44. Other track following devices (e.g. proximity devices) may be used such as pressure sensitive sensors used to follow a floor depression or a floor protuberance. It is also contemplated that various conduits, electrical conductors or other means can be laid beneath the surface of the plant floor 35 such that radio frequency, ultrasonic or other sensing means can be used to sense the location of the "buried" tracks. Track 46 can be positioned above or below wheeled cart 42. It is also contemplated that wheeled cart 42 can include a receiver (e.g. a radio) and servo controller, wherein the receiver is capable of receiving GPS coordinate information. Under this design, cart 42 could use the GPS coordinate information for traversing one or more paths of circuit 44 defined within a preprogrammed storage means. Preprogrammed storage means can be implemented on cart 42, or can be implemented on a remote central controller (not shown) wherein the coordinate information could be transmitted from the remote controller to cart 42.

Predefined zones 45 along circuit 44 can split into parallel track segments 22, 48. Parallel track segments 22 can include cross-over segments 24. Cross-over segments 24 positioned between parallel track segments 22 allow a cart that is located on one of the parallel track segments 22 to cross-over to a neighboring parallel track. This cross-over function can be useful if a cart 42 is taken off-line for servicing or is otherwise rendered unoperational. Circuit 44 can be designed to include two or more parallel cart tracks 22, 48, at select locations along circuit 44, where various work stations are located. For example, tire mounter work stations 50, 50' and tire inflator work stations 52, 52' are located along parallel tracks 22. Also, tire pressure monitor checker work stations 54, 54' and bead seater work station 56, 56' are located in parallel cart tracks 48. Pick and place work stations 58, 58' can be used to remove tire/wheel assemblies from the carts traversing circuit 44 and to transfer the tire/wheel assemblies to off-circuit work stations (such as balancer/balance audit work station 60). From work station 60, the tire/wheel assemblies are transferred to silo 62 where they are categorized, stacked, and otherwise made ready for shipment by way of carriers 64. If any tire/wheel assemblies do not meet audit standards, they are transitioned by way of a wheeled cart 42 to a repair work station 40 where repair is attempted.

Figure 2:
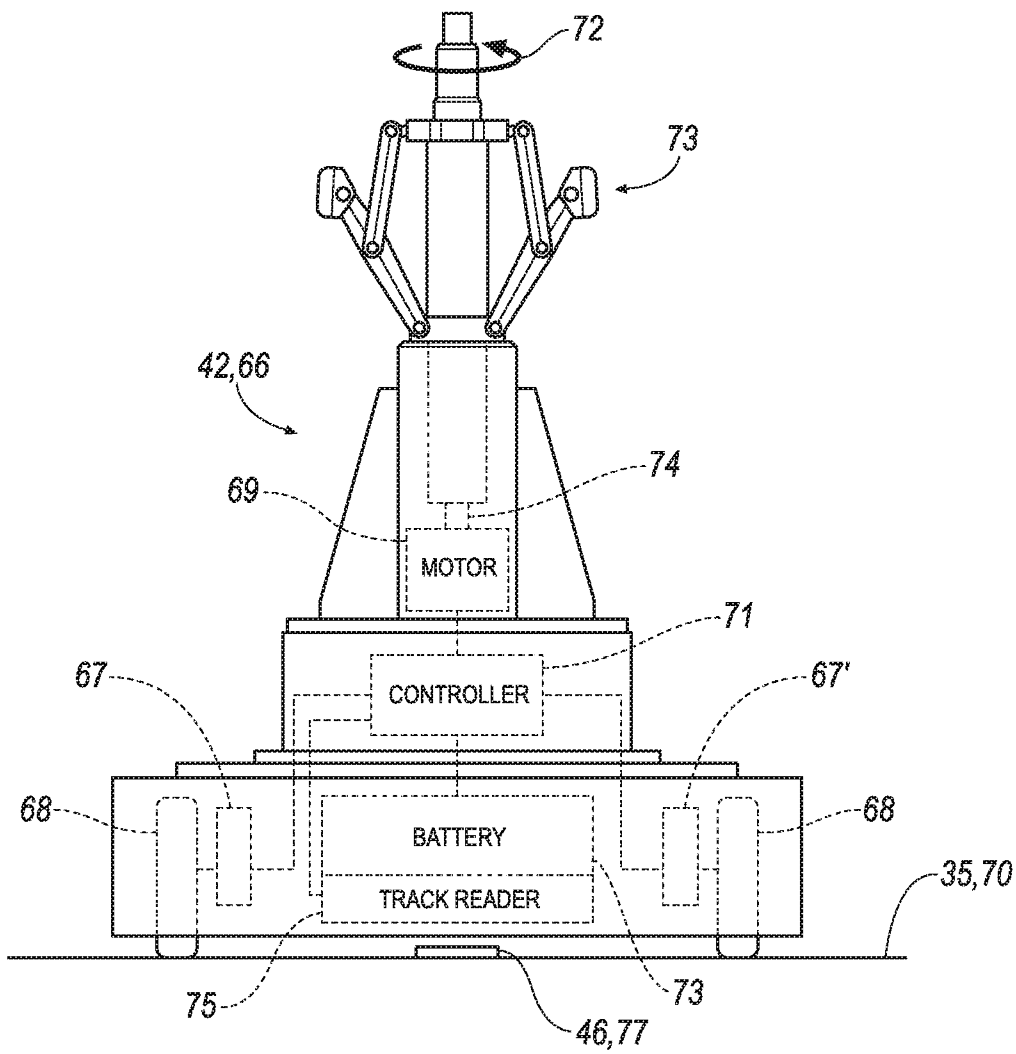
FIG. 2 is an exemplary wheeled cart adapted to traverse the circuit of FIG. 1.

FIG. 2 illustrates an exemplary implementation of a wheeled cart 42, 66 that includes a plurality of wheels 68 adapted to engage a load bearing surface 70 (such as a plant floor 35 or the like). Wheeled cart 42, 66 can include one or more motors 69 which are controlled by one or more controllers 71. One or more controllers 71 can be powered by one or more electric batteries 73. In an alternative implementation, electric power for powering the various electric devices 69, 71 on wheeled cart 66 can be delivered via electrical conductors placed along load bearing surface 70 wherein wheeled cart 66 can be fashioned with contact elements (such as brushes or the like) effective for transferring electrical current from the conductive members in load bearing surface 70 to the electrical components 69, 71 on wheeled cart 42, 66. Various implementations of track reader 75 have already been discussed in conjunction with FIG. 1 and track reader 75 includes any means of determining the position of wheeled cart 42, 66 with respect to one or more prescribed paths 46, 77 along load bearing surface 70. The prescribed path can be defined by track materials or other physical mediums 46, 77 (already described) associated with floor 35, or the prescribed path may be coordinate data associated with the plant floor (that is never embodied in the plant floor—e.g. GPS coordinates).

One or more controllers 71 are effective for interfacing with wheel motors 67, 67', battery 73, and track reader 75 for manipulating the direction, speed and other devices that may be located on wheeled cart 42, 66. Controller 71 can be preprogrammed to operate autonomously without the intervention of a central controller (central controller not shown) or, in the alternative, wheeled cart 42, 66 can be designed so that it executes the commands transmitted to it by way of a central controller. Commands may be transmitted to wheeled cart 42, 66 from a central controller by way of radio signals, track member 77, or other means (e.g. infrared signals, copper cables, and the like).

Figure 3:
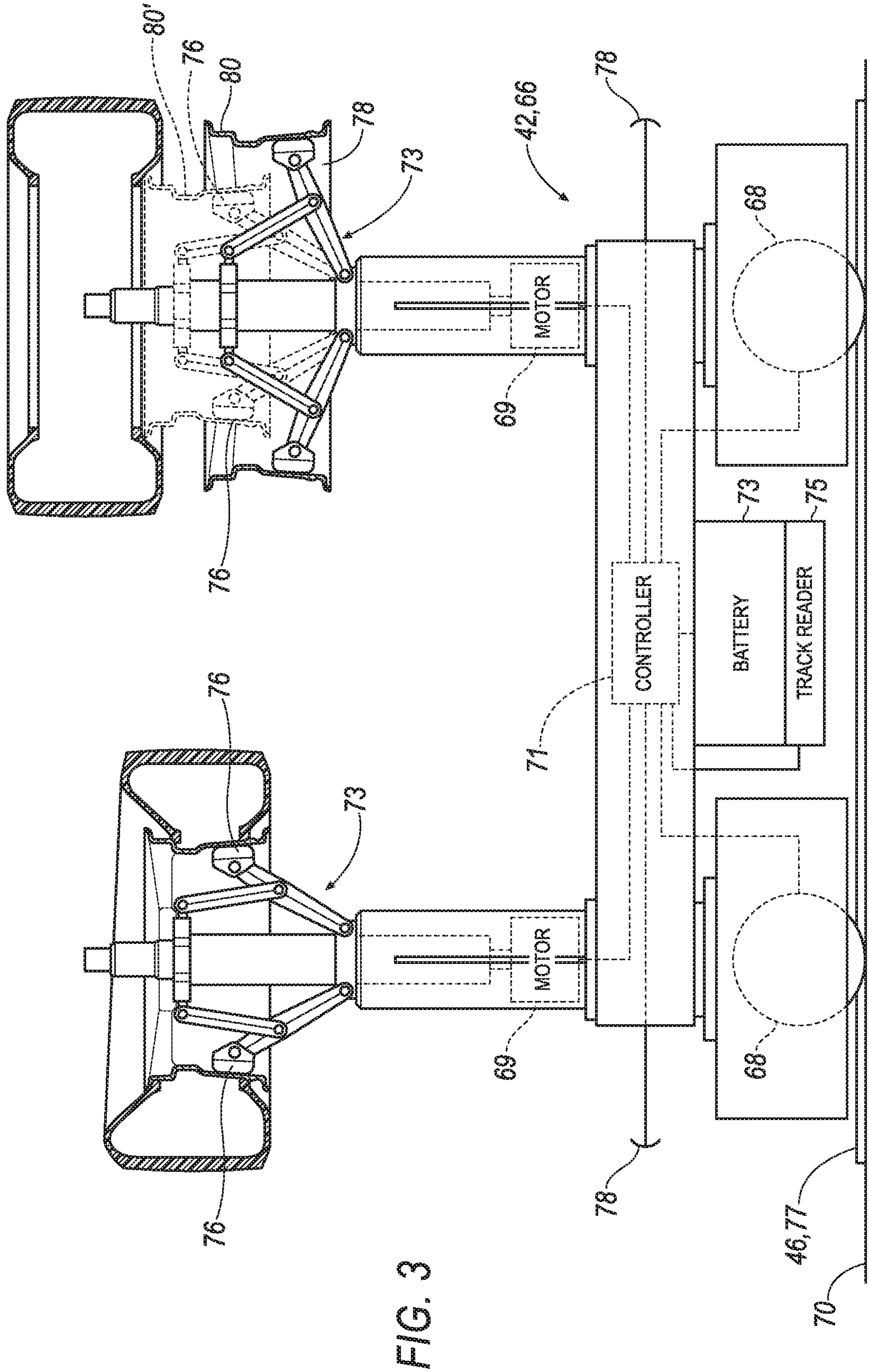
FIG. 3 is another exemplary wheeled cart adapted to traverse the circuit of FIG. 1.

FIGS. 2 and 3 illustrate an exemplary wheeled cart 42, 66 that can be a single unit implementation (see FIG. 2) or a double unit implementation (see FIG. 3). Single unit implementations are typically capable of carrying one tire/wheel assembly while dual unit carts are capable of carrying a pair of tire/wheel assemblies (see FIG. 3). Also, wheeled cart 42, 66 can be fashioned with one or more sensing bumpers 78 which communicate with controller 71. Whenever contact is made against sensing bumper 78, controller 71 can respond in any number of ways (such as immediately ceasing movement of wheeled cart 42, 66 in order to avoid possible equipment damage). Wheeled carts 42, 66 can be designed to carry any number of working apparatus' 73. For example, the exemplary working apparatus 73 illustrated in FIGS. 2 and 3 includes a radially adjustable wheel gripping mechanism for gripping an inner diameter portion 78 of a wheel 80.

Figure 4:
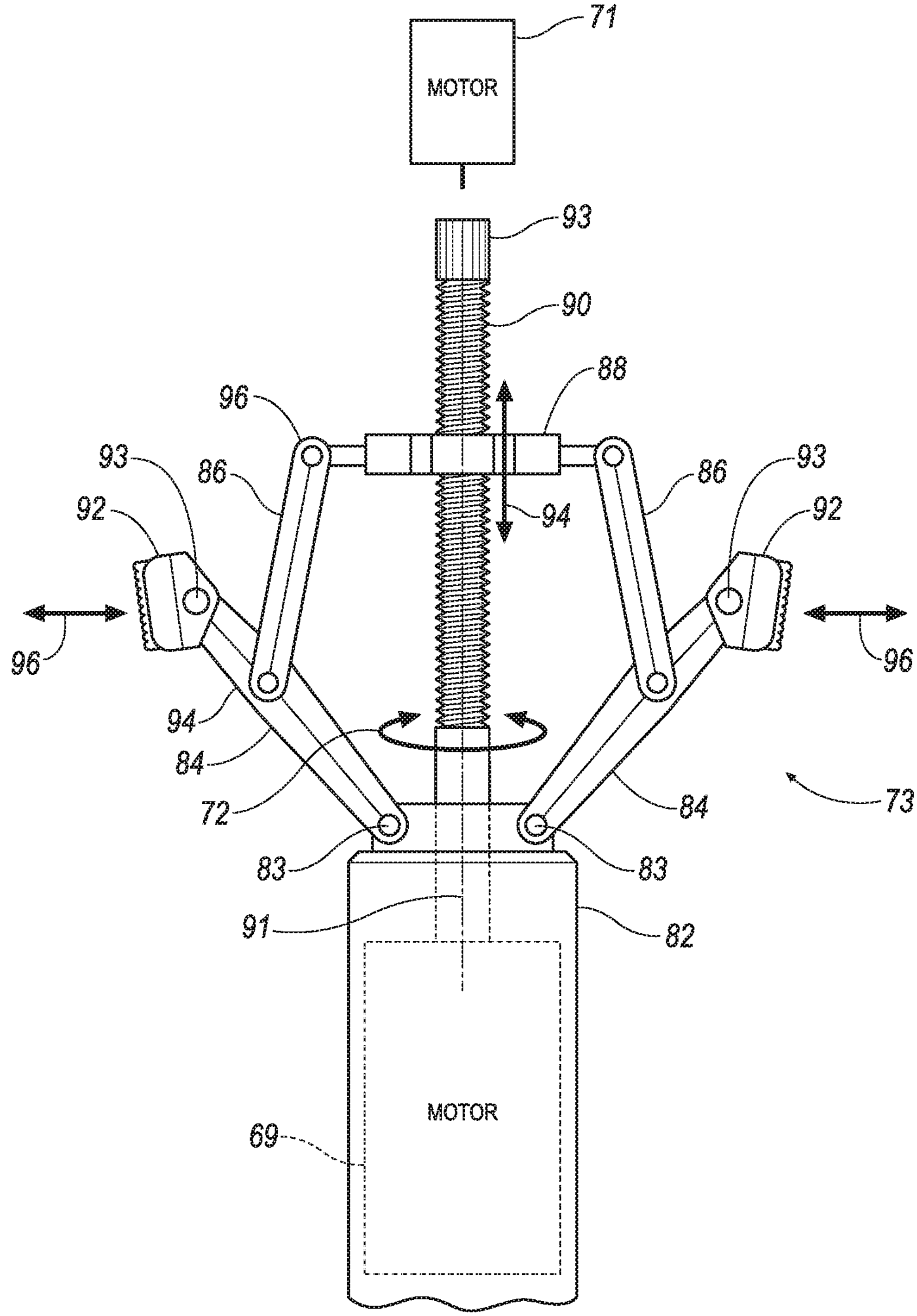
FIG. 4 is a schematic view of a wheel gripping mechanism adapted for attachment to one or more implementations of a wheeled cart.

Now referring to FIGS. 2-4, wheel gripping mechanism 73 includes base 82 which is attached to wheeled cart 42, 66. Base 82 supports, at a first pivot joint 83, one or more hinged arms 84. Hinged arms 84 terminate at a second pivot joint 93, that pivotally supports a wheel gripping member 92. Intermediate arm 86 includes a first end 94 and a second end 96. First end 94 of intermediate arm 86 is pivotally connected to hinged arm 84 and the second end 96 of intermediate arm 86 is pivotally connected to threaded nut 88. Threaded nut 88 is threadedly connected to threaded drive shaft 90. Threaded drive shaft 90 can be rotated from either motor 69 (mounted to wheeled cart 42, 66) or via an external motor 71 which can be selectively engaged to a top portion 93 of threaded drive shaft 90 when wheeled cart 42, 66 is located in proximity to one or more work stations. When either motor 69 or 71 is rotated, threaded nut 88 traverses threaded drive shaft 90 along path 94. Traversal path 94 is substantially parallel to the longitudinal axis 91 of threaded drive shaft 90. When threaded nut 88 traverses path 94, linkage 84, 86 causes wheel gripping members 92 to traverse along path 96. Path 96 is substantially perpendicular to path 94. When working apparatus 73 is placed within an inner diameter 78 of a wheel 80 (see FIG. 3), and motor 69, 71, is rotated 72, wheel gripping members 92 can be made to move outwardly along path 96 until they outwardly urge against the inner diameter 78 of wheel 80. Inner diameter 78 can be defined as a surface of the wheel 80 that is substantially parallel to the axis of rotation 91. This outward urging is effective for maintaining the vehicle wheel in a fixed position with respect to wheeled cart 42, 66. It can also be easily understood that working apparatus 73 is effective for gripping any number of different wheel diameters by virtue of the expanded or contracted positions wheel gripping members 92 can be made to assume (by virtue of manipulating either motor 69 or 71). The right-most working apparatus in FIG. 3 shows (in phantom) a wheel 80' (having a first wheel diameter) supported by wheel gripping mechanism 73 (in phantom) in a first position and also shows wheel 80 (having a second wheel diameter) supported by wheel gripping mechanism 73 in a second position. Thus, the working apparatus 73 of FIGS. 2-4 is effective for gripping and securing a tire/wheel assembly to wheeled cart 42, 66 as wheeled cart travels from work station to work station.

Figure 5:
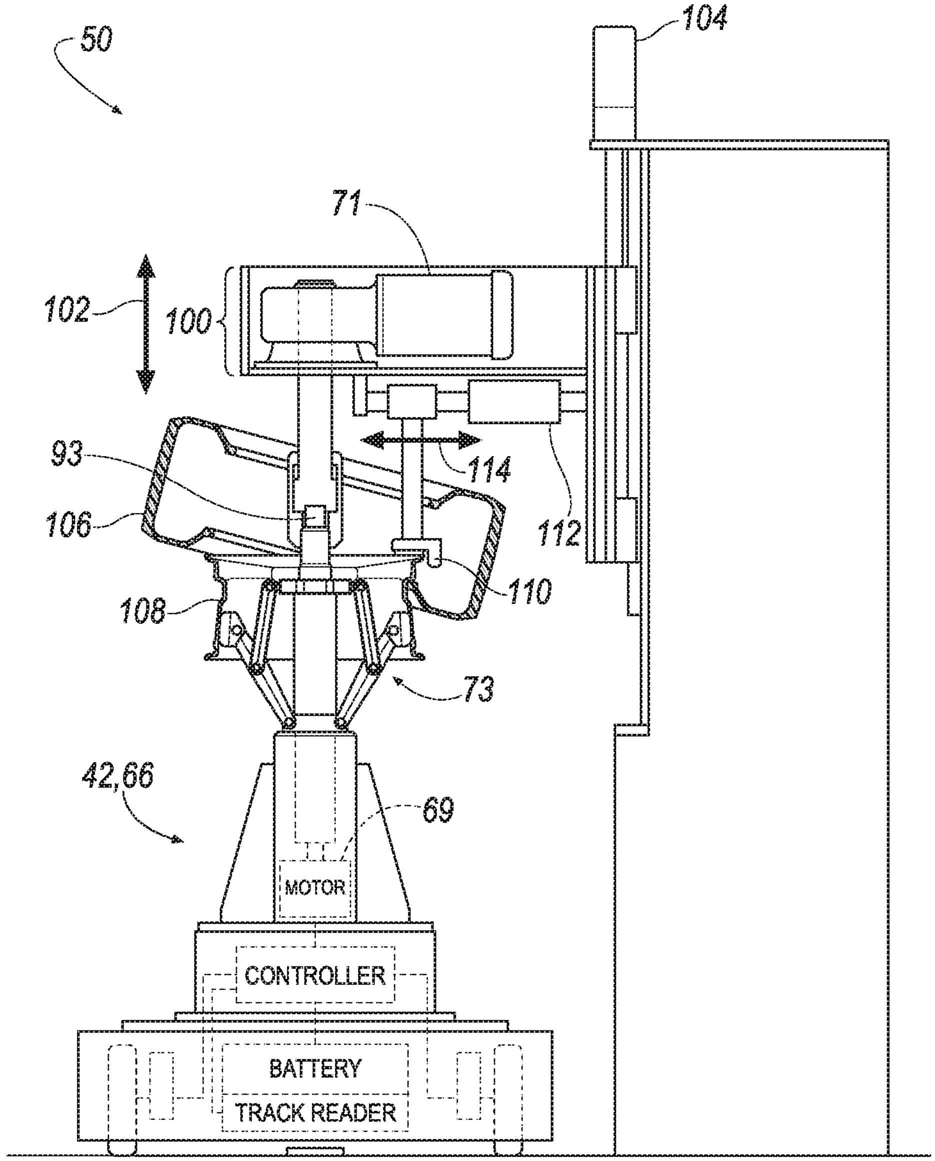
FIG. 5 is a front elevational view of an exemplary wheeled cart, wherein the wheeled cart is shown proximate an exemplary tire mounting work station located along the circuit of FIG. 1.
Figure 6:
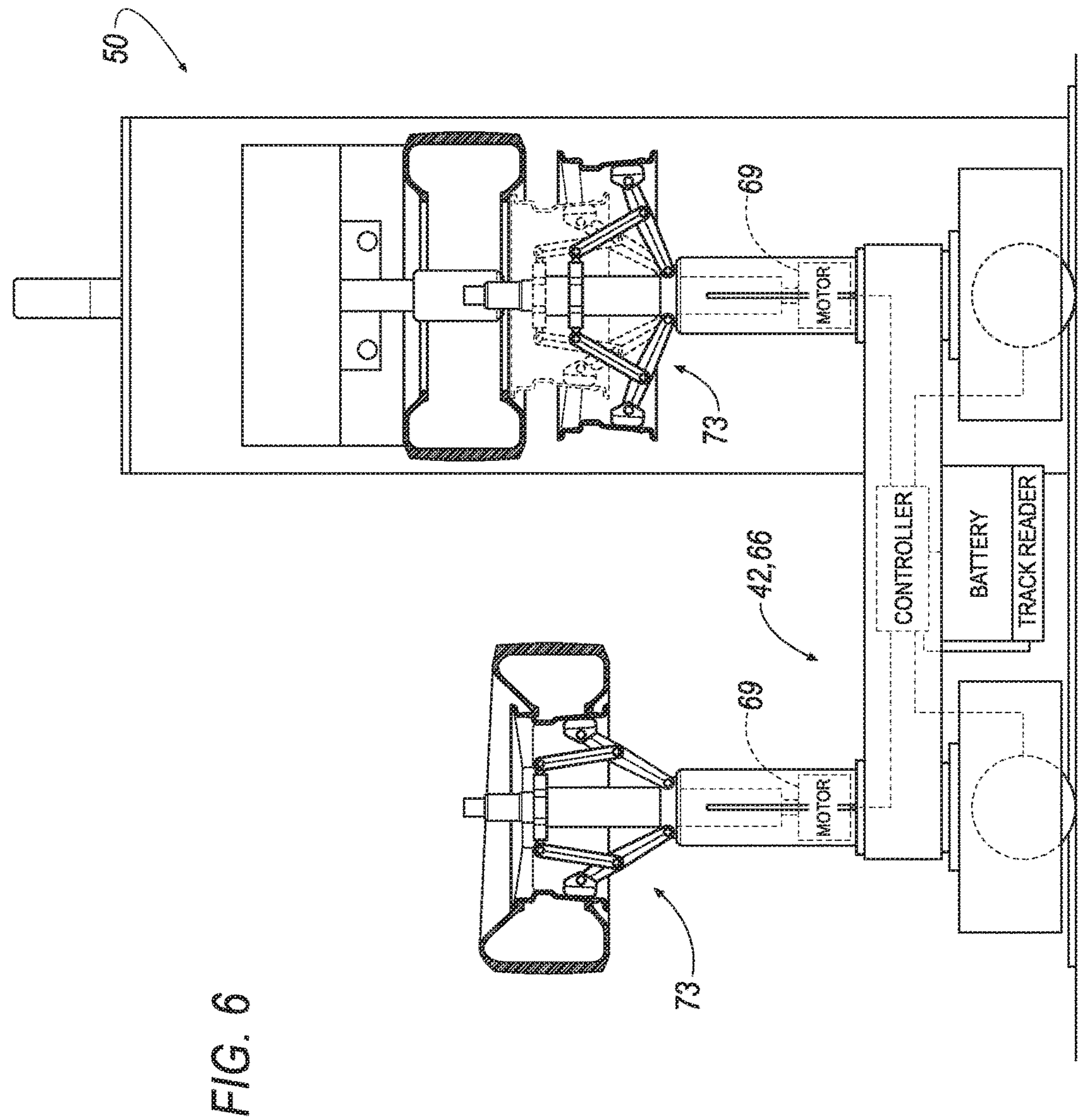
FIG. 6 is a side elevational view of FIG. 5.

Now referring to FIGS. 5 and 6, wheeled cart 42, 66 is shown in proximity to tire mounting work station 50. Tire mounting work station 50 includes a working head 100 which is vertically manipulatable 102 by way of drive 104. Working head 100 can carry any number of working apparatus designed to do work upon tire and wheel assembly. FIGS. 5 and 6 illustrate an exemplary working apparatus that includes a motor 71 for rotating the wheel 108 at the appropriate time. Other tire installation tools can be attached to working head 100 such as guide foot 110 which is used in a per se known manner to guide tire 106 onto wheel 108 as wheel is rotated by motor 69 or 71. Guide foot 110 maybe horizontally manipulatable along axis 114 by way of actuator 112. By enabling guide foot 110 to be manipulatable along axis 114, guide foot 110 can be adjusted to accommodate wheel sizes of different diameters. Although the implementation of FIGS. 5 and 6 shows motor 71 coupled to the top portion 93 of threaded drive shaft 90 (see FIG. 4), the rotation of working apparatus 73 may also be powered by one or more motors 69 located within wheeled cart 42, 66. An implementation of the wheeled cart 42, 66 depicted in FIG. 6 may carry two tire/wheel assemblies. FIG. 5 shows a tire/wheel pair positioned ready to be joined (i.e. mounted) to one another, and the left-most tire/wheel pair shown in FIG. 6 shows a tire/wheel pair after tire mounting work station 50 has mounted tire 106 to wheel 108.

Figure 7:
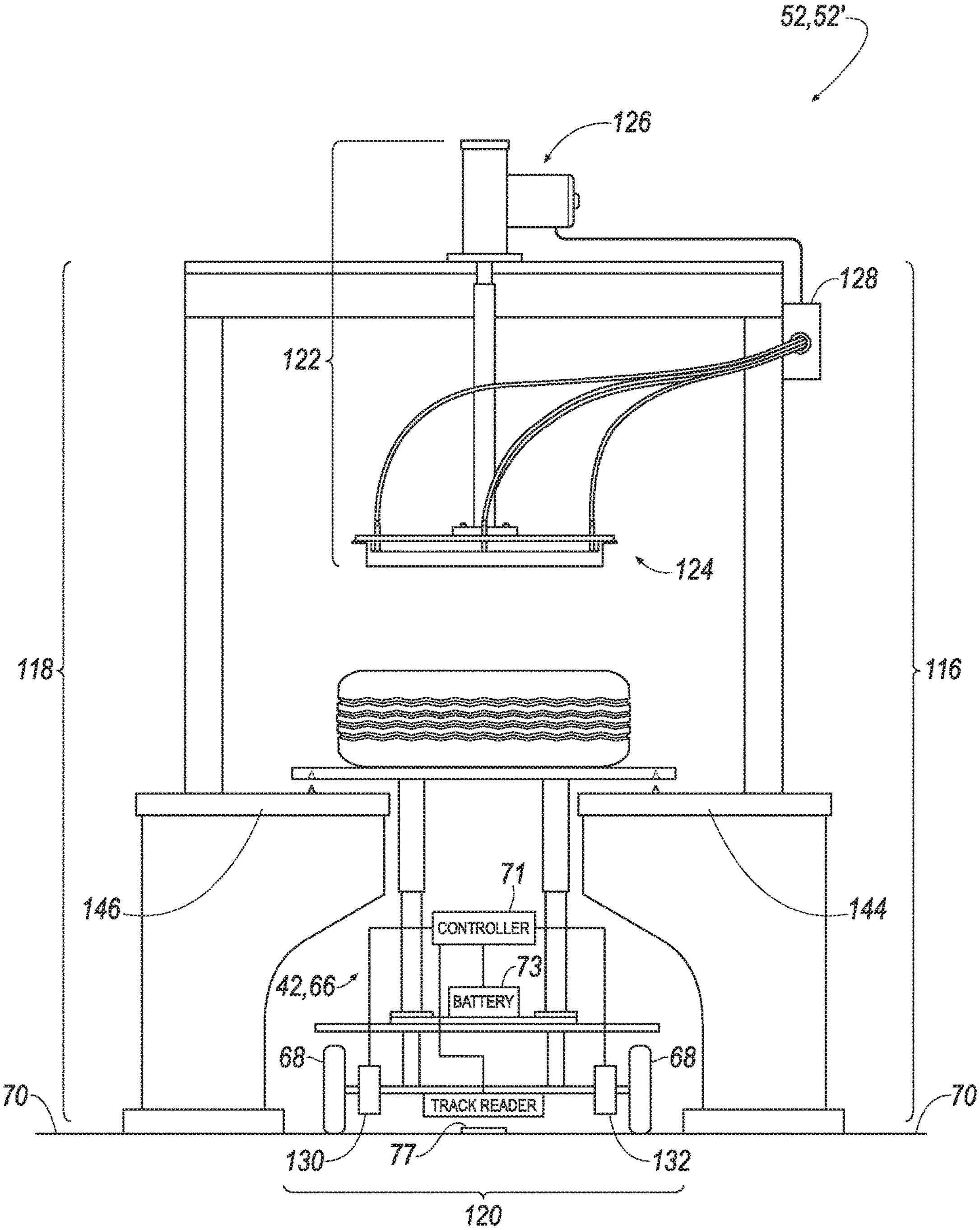
FIG. 7 is a schematic view of an exemplary wheeled cart having telescoping support legs.

FIG. 7 illustrates an exemplary implementation of a work station having a tire inflation work station 52, 52' includes a right segment 116 of tire inflation work station 52, 52' and a left segment 118 of tire inflation work station 52, 52'. Right and left segments 116, 118 are spaced apart 120 to create a space therebetween sufficient to accept wheeled cart 66. The work stations can carry any number of working devices 122 and, for example, the work station of FIG. 7 carries a tire inflation apparatus 124. In addition to carrying tire inflation apparatus 124, working device 122 can also include a motor 126 and a controller 128 for manipulating and controlling the tire inflation apparatus 124 during operation. Wheeled cart 66 can be powered by battery 73 which is controlled by controller 71. Controller 71 can interface with one or more wheel drive motors 130, 132 to propel wheeled cart 66 along track 77.

Figure 8:
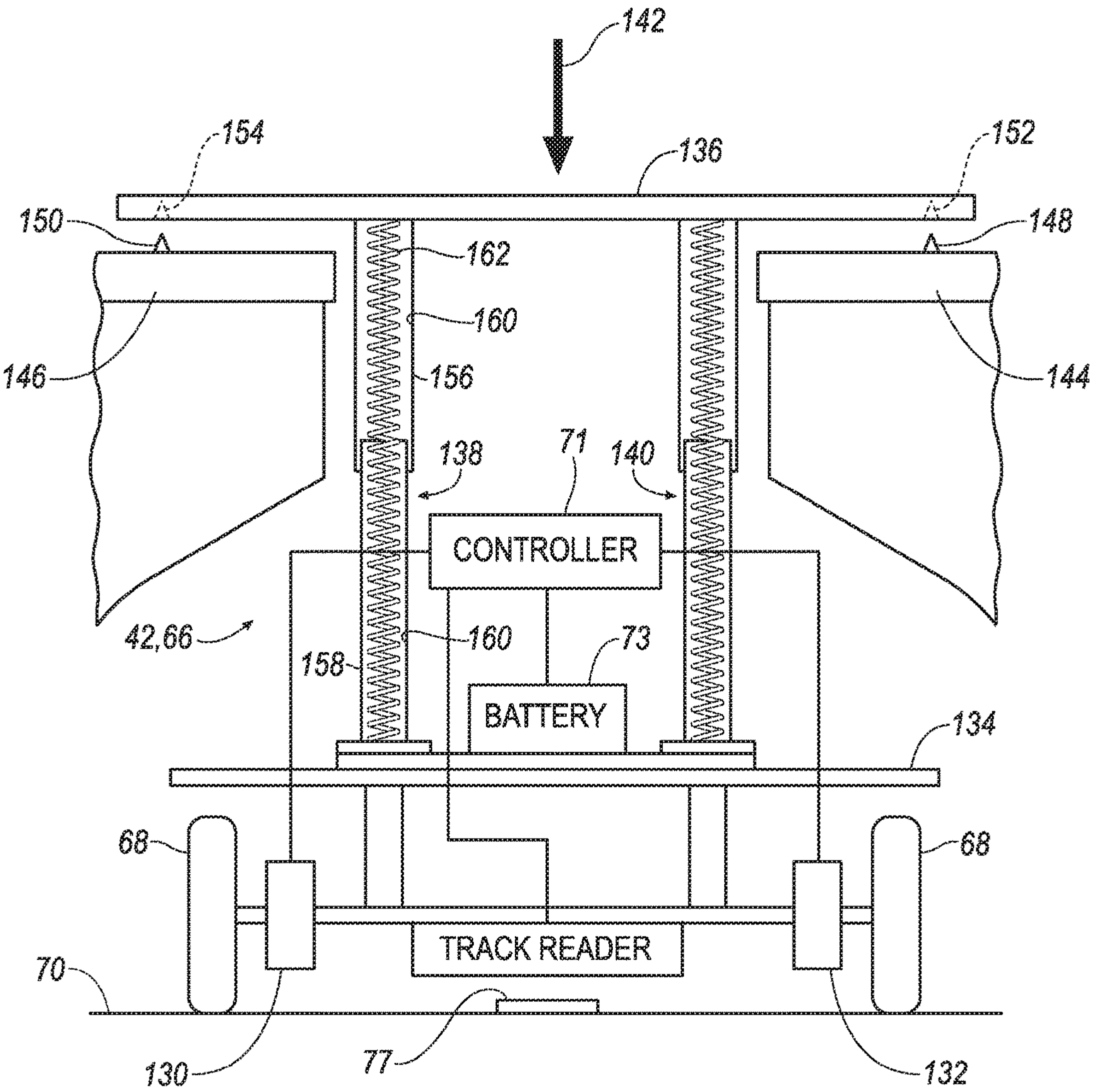
FIG. 8 is a partial cross sectional view of FIG. 7.

Now referring to FIGS. 7 and 8, wheeled cart 66 can be constructed with one or more vertical supports 138, 140 which extend between cart base 134 and cart work surface 136. Vertical supports 138, 140 may be collapsible so that when a load 142 of sufficient magnitude is placed upon cart work surface 136, vertical supports 138 and 140 collapse (i.e. compress).

Right and left segments 116, 118 include respectively associated load bearing surfaces 144, 146. Each load bearing surface, 144, 146 includes a respectively associated engagement member 148, 150 which is adapted to engage a respectively associated mating engagement member 152, 154 associated with cart work surface 136. Although engagement members 148, 150 are shown as male projections and engagement members 152, 154 are shown as female depressions located within cart work surface 136, and any number of different geometries may be used to positively locate cart work surface 136 against load bearing surfaces 144, 146 when cart work surface 136 is depressed by load 142. In some implementations, vertical support members 138, 140 may include two or more tubular telescoping members 156, 158 that are sized appropriately such that one of the members 158 is telescopically received within an adjacent member 156. Telescoping members 156, 158 can include a hollow central passageway 160 wherein an urging device 162 can reside. Urging device 162 can include a mechanical coil spring, compressed gas cylinder, or any other means effective for expanding telescopic members 156, 158 once load 142 is removed. In an implementation, telescoping members 156, 158 may comprise the outer housing of a gas cylinder and passageway 160 may be charged with a compressed gas.

The operation of a work station (exemplified by 52, 52') in conjunction with wheeled cart 42, 66 will now be explained in conjunction with FIGS. 9 and 10.

Once wheeled cart 42, 66 is properly positioned within opening 120 of work station 52, 52', working device 122 can be engaged to do its work upon work piece 164. In the example of FIGS. 9 and 10, work station 52, 52' is a tire inflation work station and work piece 164 is a tire which has been mounted to a wheel but has not yet been inflated.

In order for work station 52, 52' to inflate tire 164, working device 122 may be manipulated by controller 128 to lower inflation head 166 into operative engagement with work piece 164. This lowering operation 168 is accomplished by motor 126 and its associated drive mechanism 170.

Figure 9:
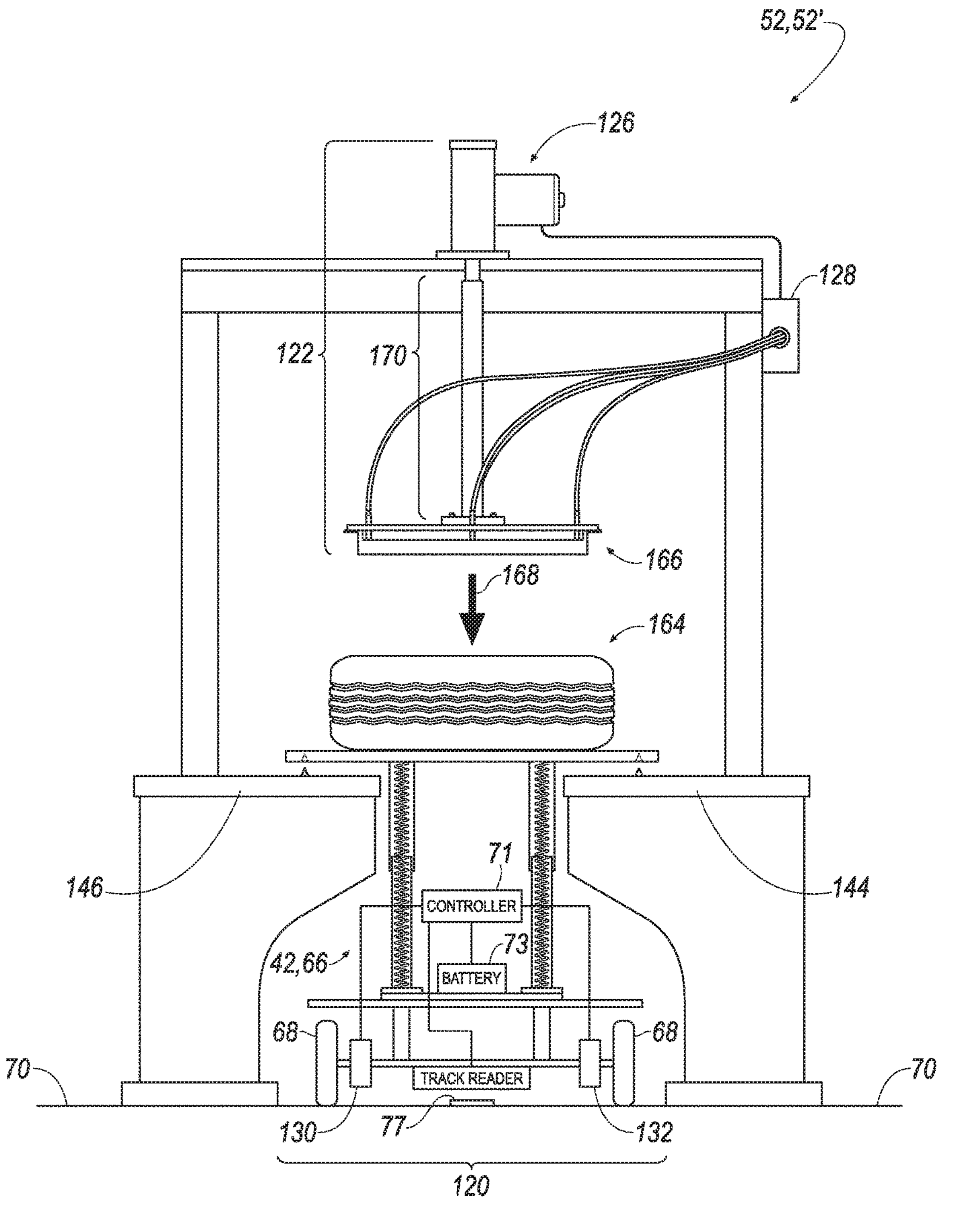
FIG. 9 depicts a first operational stage of locating the wheeled cart of FIGS. 7 and 8 at a work station.
Figure 10:
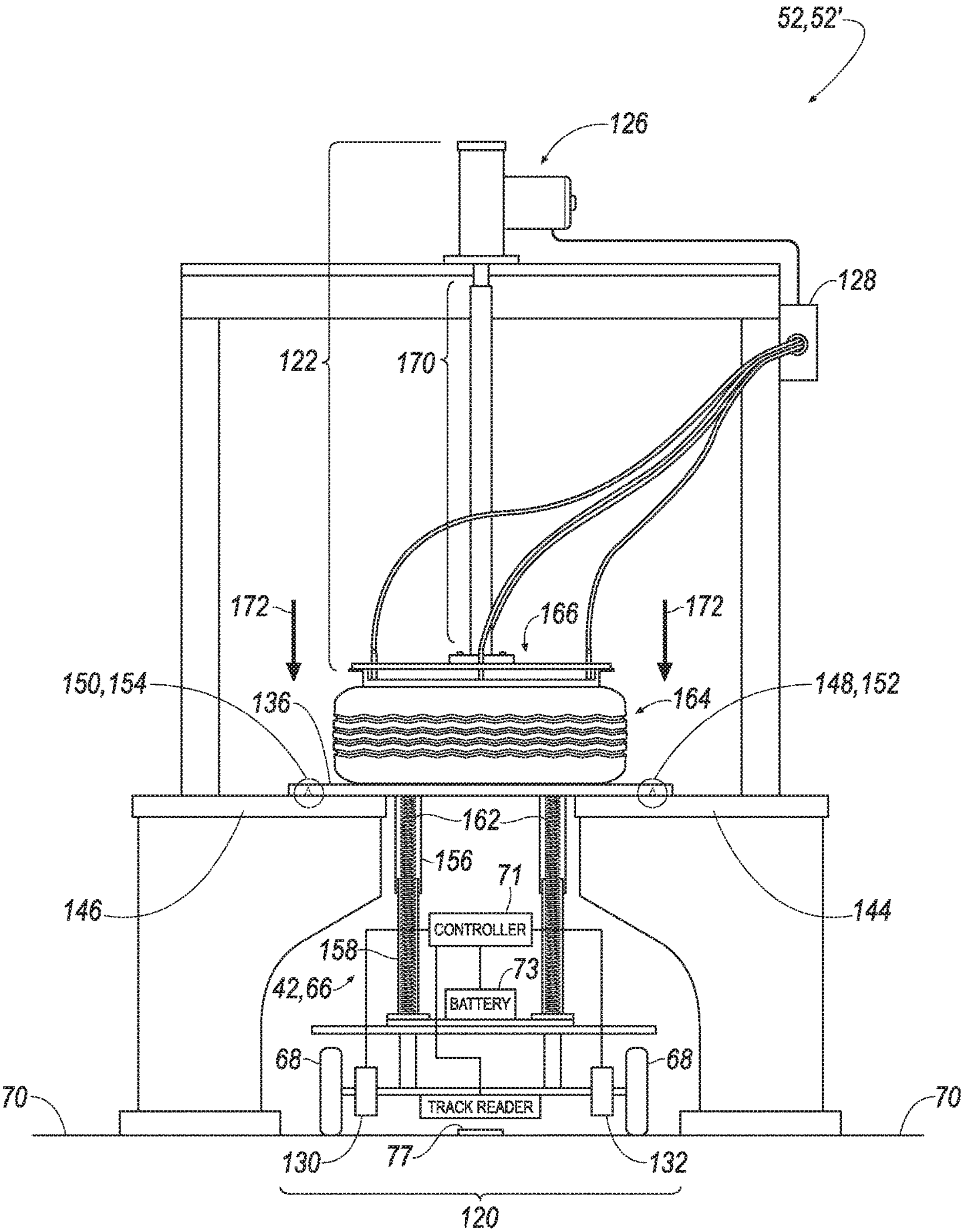
FIG. 10 depicts a second operational stage of loading a work surface of a wheeled cart.

Now referring to FIGS. 9 and 10, the strength of spring means 162 is designed such that it is sufficient to support work piece 164 in an extended position such that cart work surface 136 easily clears (i.e. is elevated above) load bearing surfaces 144, 146. However, urging device 162 is sized so that when the downward thrust 172 of working device 122 is exerted upon work piece 164, urging device 162 is not sufficiently strong to resist the downward thrust 172 thereby resulting in the compression of telescoping members 156, 158. This compression of members 156, 158 causes cart work surface 136 to move downwardly until cart work surface 136 engages load bearing surfaces 144, 146. At that point, cart work surface 136 ceases any further downward movement because any further load exerted by working devices 122 is absorbed by load bearing surface 144, 146 and not by members 156, 158. The proper alignment of paired engaging means 148, 152 and 150, 154 ensures that there will be no lateral shift of cart work surface 136 during the course in which working device 122 performs work upon work piece 164. It is important to note that if mating pairs of engagement means are cone shaped (see 144, 152) they promote/guide self alignment as surface 136 drops. Accordingly, cart 42, 66 does not have to be precisely aligned within space 120. It merely may be within a zone that is defined by the geometry of paired engaging means 148, 152 and 150, 154. In view of the above referenced description, it is easily understood that wheeled cart 66 can be constructed from much lighter materials than would be otherwise possible if the structure of cart 42, 66 were responsible for bearing all of the working load exerted by working device 122 on work piece 164.

Figure 11:
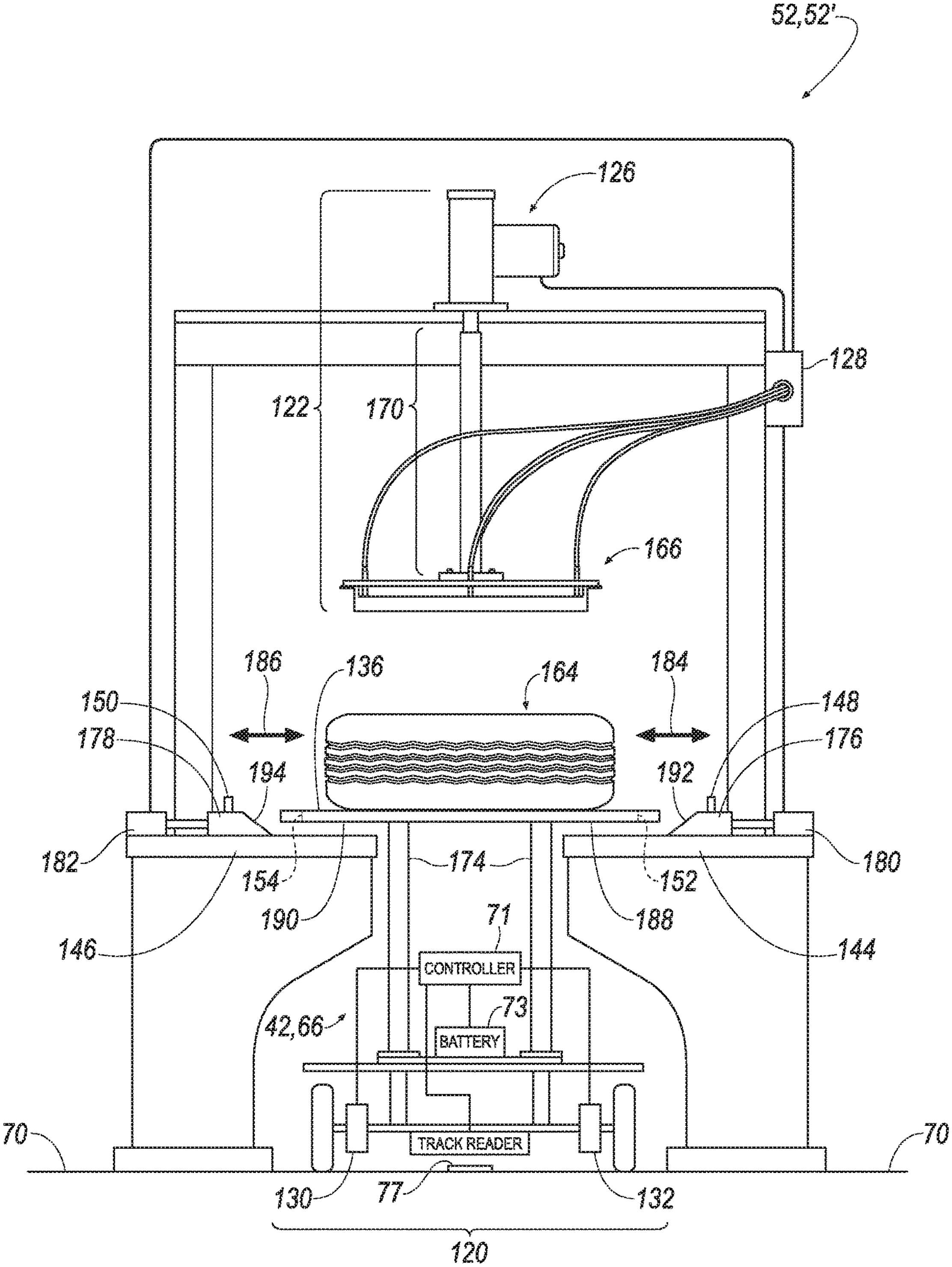
FIGS. 11-13 depict a second system for loading a work surface of a wheeled cart.
Figure 12:
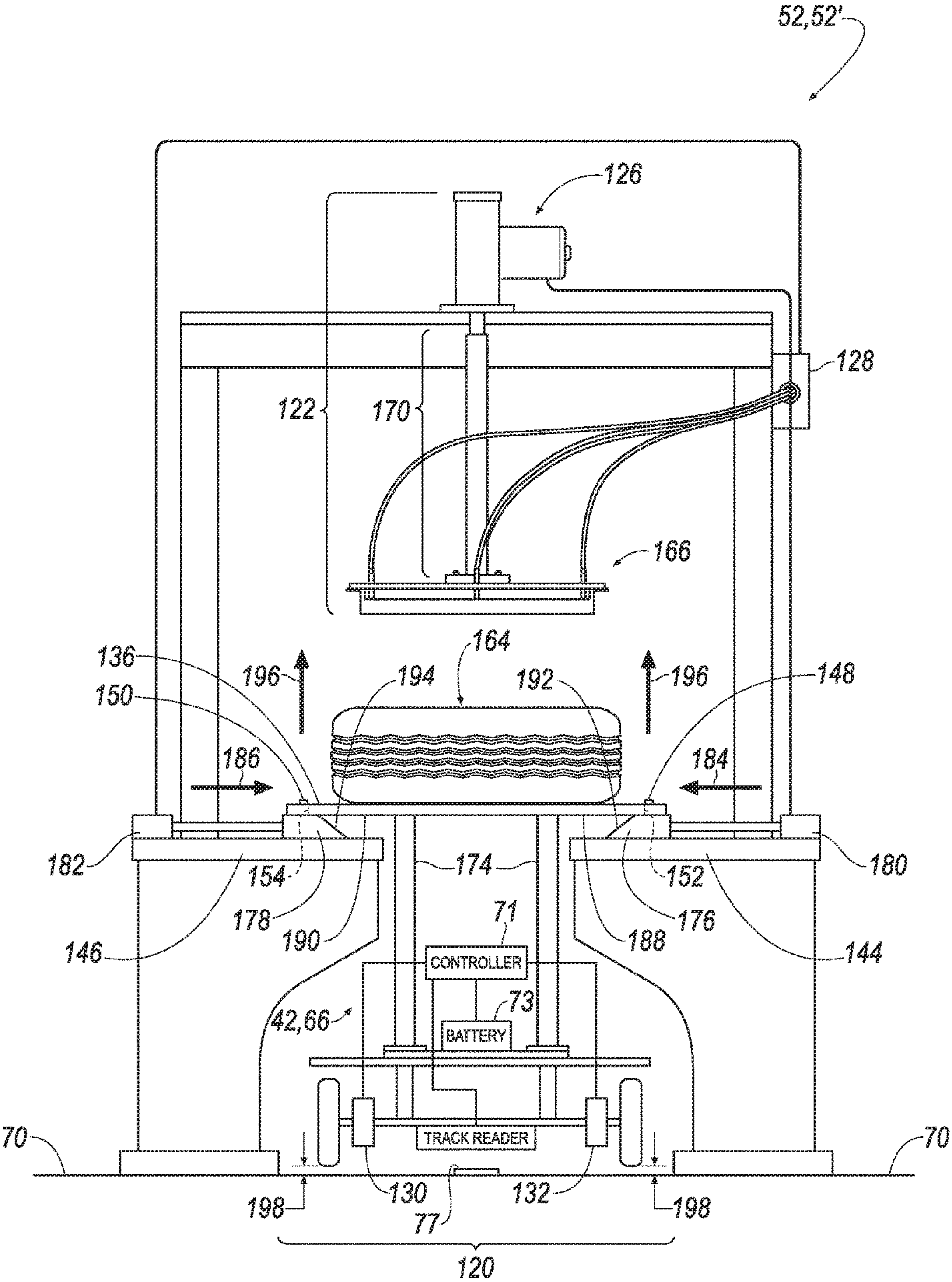
Figure 13:
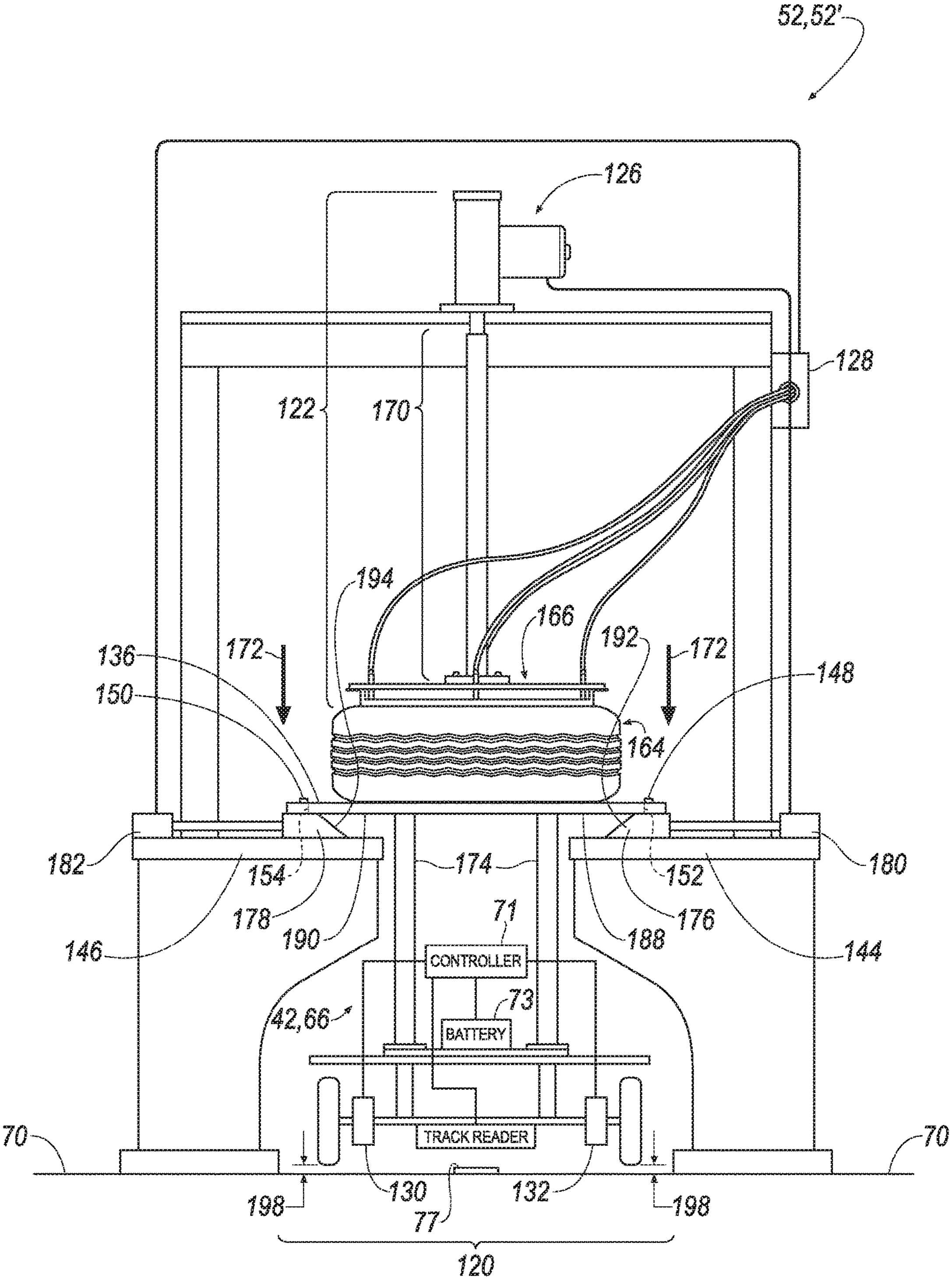

FIGS. 11-13 illustrate an exemplary implementation of a wheeled cart of the present disclosure. Now referring to FIGS. 11-13, wheeled cart 42, 66 is constructed with rigid (i.e. non-collapsible, non-extendable) legs. Work station 52, 52' includes one or more sliding wedges 176, 178 which are vertically manipulatable along a respectively associated portion of load bearing surface 144, 146. Sliding wedges 176, 178 can be activated using any number of known actuator mechanisms 180, 182 such as hydraulic cylinders, pneumatic cylinders, electric motors and the like. Mechanisms 180, 182 are effective for vertically sliding 184, 186 their respectively associated sliding wedges 176, 178 under a bottom portion 188, 190 of cart work surface 136.

Now referring to FIGS. 11 and 12, when mechanisms 180, 182 are activated by controller 128 to extend their respectively associated wedges 176, 178 under a bottom surface 188, 190 of cart work surface 136, the include face 192, 194 of each wedge 176, 178 forms a lifting ramp and moves cart work surface 136 upwardly 196. Because legs 174 are rigid (non-collapsible or non-extendable), the entire wheeled cart assembly 42, 66 is elevated 198 from the load bearing surface 70 as is shown in FIG. 12. Once wheeled cart 66 is elevated from load bearing surface 70, inflation head 166 can be lowered 172 and can be used to operate upon work piece 164 (see FIG. 13). In doing so, none of the downward thrust exerted by working device 122 is born by the wheels 68 or the legs 174 of wheeled cart 42, 66 inasmuch as all of the downward thrust exerted by working device 122 is born by load bearing surfaces 144, 146 by way of sliding wedges 176, 178. Each sliding wedge 176, 178 can include a respectively associated engagement means 148, 150. Also, cart work surface 136 can be fashioned with one or more complimentary (i.e. mating) engaging means 152, 154 which are respectively associated with engaging means 148, 150. Engaging means pair 148, 152 and 150, 154 are adapted to engage one another while wheeled cart 42, 66 is lifted 198 from load bearing surface 70 in order to prevent the lateral movement of cart work surface 136 throughout a period of time in which working device 122 operates on work piece 164.

Figure 14:
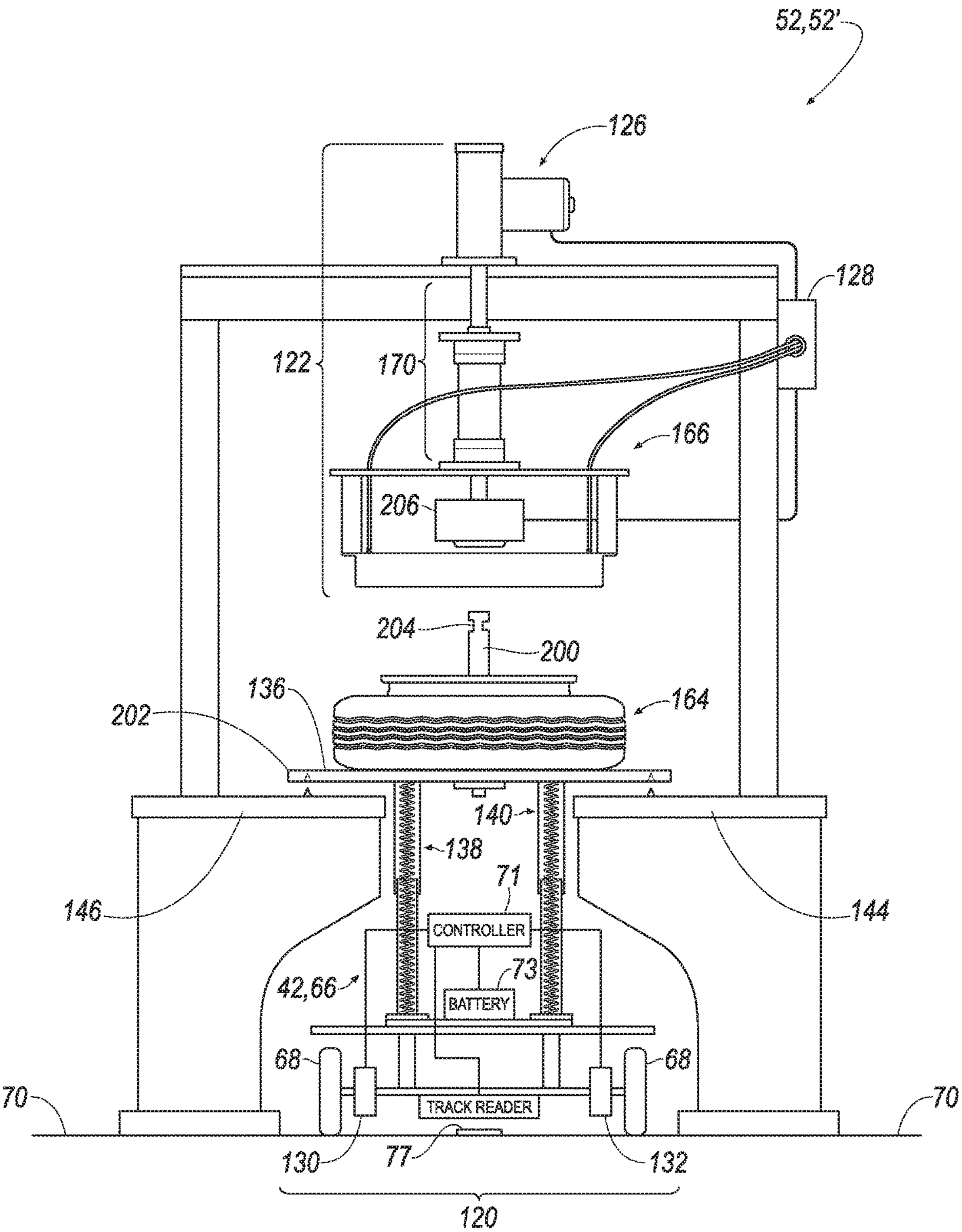
FIGS. 14-16 depict a third system for loading a work surface of a wheeled cart.
Figure 15:
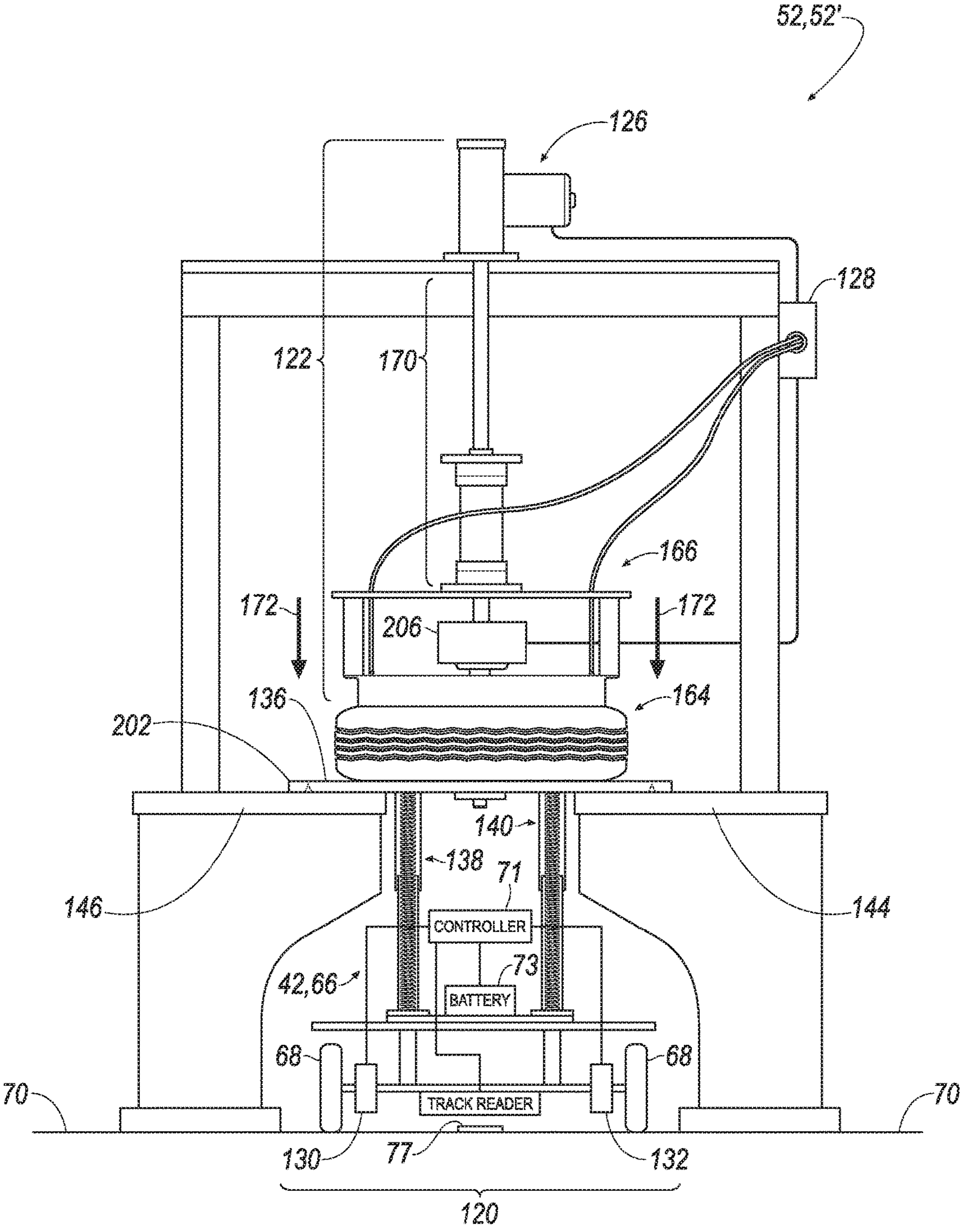
Figure 16:
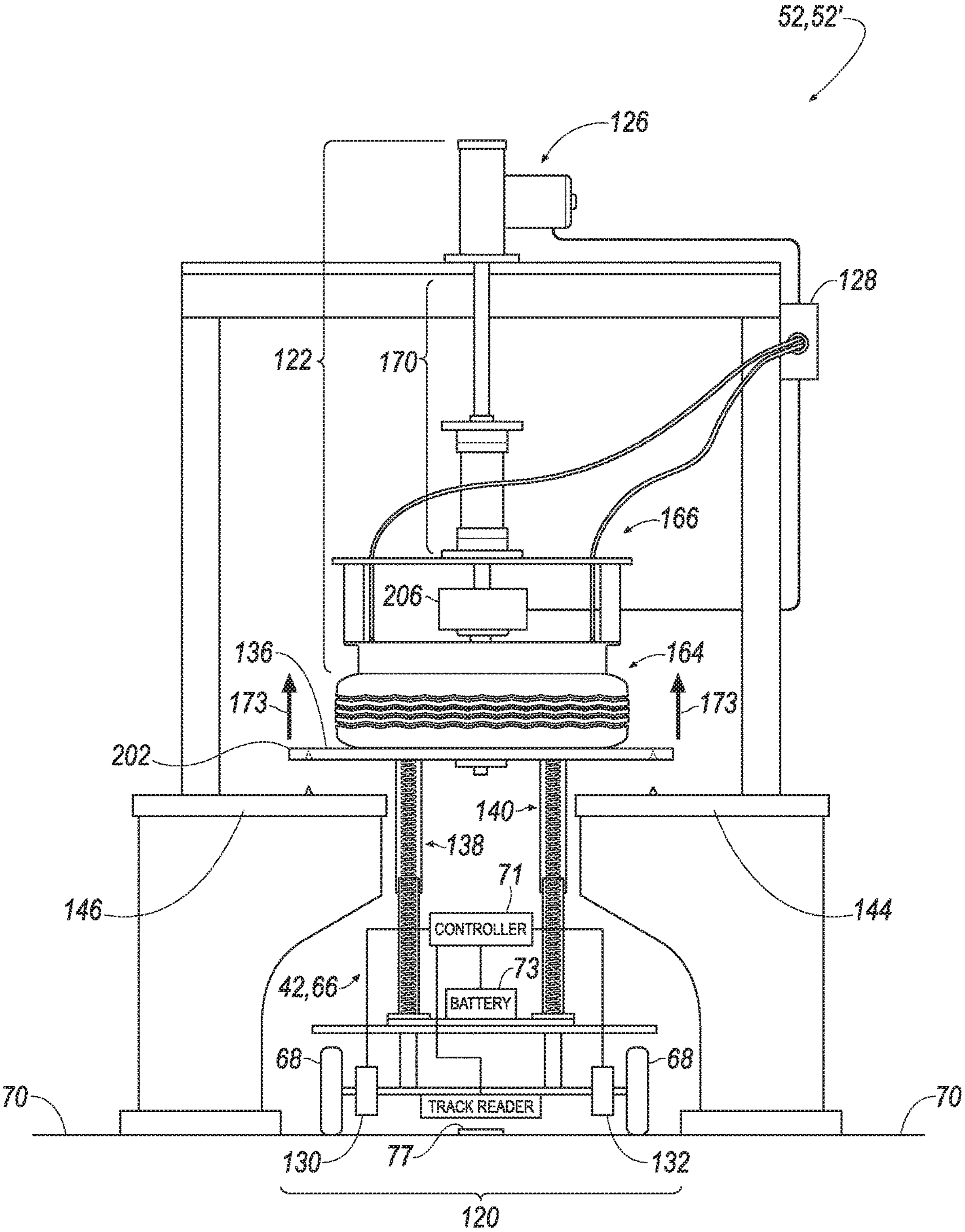

FIG. 14 illustrates an exemplary implementation of a wheeled cart 42, 66 that is fashioned with telescoping vertical supports 138, 140. Telescoping vertical supports 138, 140 have already been described in conjunction with the cart shown in FIGS. 7-10. Cart 42, 66 includes rigid, vertical post 200 which is firmly secured to cart work surface 136. Vertical post 200 may extend through the hollow center portion of work piece 164, or, in some implementations, vertical post 200 may extend from cart work surface 136 along an outer edge region of cart work surface 136. Vertical post 200 can be fashioned with a notch 204 and working device 122 may include a notch engaging mechanism 206. When working device 122 is activated, inflation head 166, is lowered 172 against work piece 164. Notch engaging mechanism 206 is controlled by controller 128, and it is adapted to engage notch 204 thereby securely joining working device 122 with vertical post 220 (see FIG. 15). Next, working device 122 is activated such that it lifts 173 vertical post 200 upwardly (see FIG. 16). Because vertical post 200 is rigid and firmly attached to cart work surface 136, cart work surface 136 also lifts upwardly. Telescopic legs 138, 140 permit the upward movement of cart work surface 136 while allowing the wheels 68 of wheeled cart 66 to remain engaged against load bearing surface 70. It is easily seen that by utilizing the rigid, vertical post 200 in conjunction with the lifting mechanism in working device 122, that any downward thrust exerted by working device 122 upon work piece 164 is absorbed by vertical post 200 and is not born by the telescoping leg portions 138, 140 or the wheels 68 of wheeled cart 66.

Figure 17:
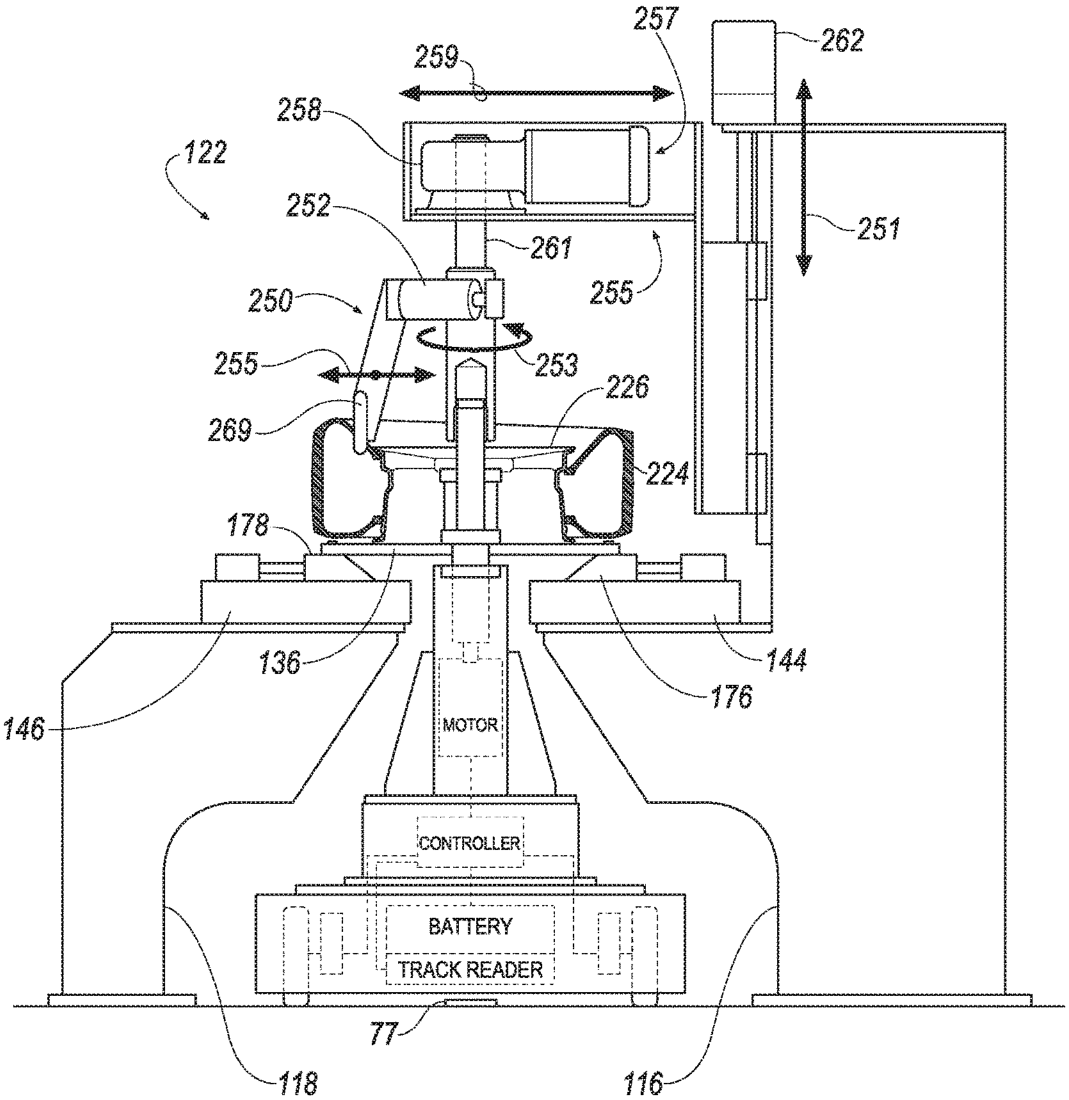
FIG. 17 is a front elevational view of an exemplary wheeled cart stationed at an exemplary tire/wheel mounting work station.

Now referring to FIG. 17, wheeled cart can be positioned at tire/wheel mounting work station 50, 50'. Work station 50, 50' includes working device 122 which, in the present example, is a tire/wheel mounting working device. Working device 122 may have a motor 257 for rotating working arm assembly 250 (working arm assembly is shown in greater detail in FIG. 19). In some implementations, assembly 250 may be rotationally fixed and the wheel 226 may instead by rotated. Motor 257 is coupled to drive mechanism 258. Drive mechanism 258 is effective for coupling the rotational movement of motor 257 to shaft 261. Drive mechanism 258 may include a worm gear drive, a spur gear drive or the like. Both motor 257 and drive mechanism 258 are preferably coupled to a common platform 263 which in turn, is coupled to vertical drive motor 262. Vertical drive motor 262 is effective for vertically manipulating 251 the vertical position of shaft 261, drive mechanism 258, motor 257 and platform 255. In applications where it is desirable, platform 255, motor 257, drive mechanism 258, and shaft 261 may be horizontally manipulated 259 by implementing any known linear drive technique.

Figure 19:
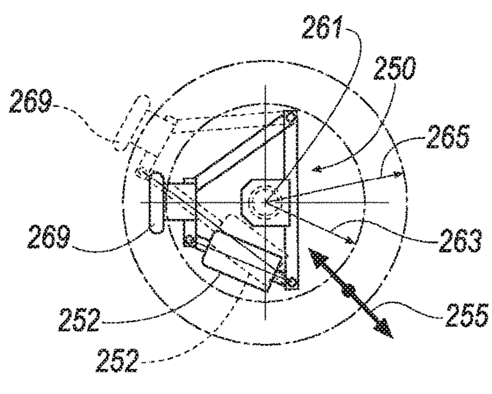
FIG. 19 is a top view of an exemplary radially adjustable working head used on the work station of FIG. 17.
Figure 18:
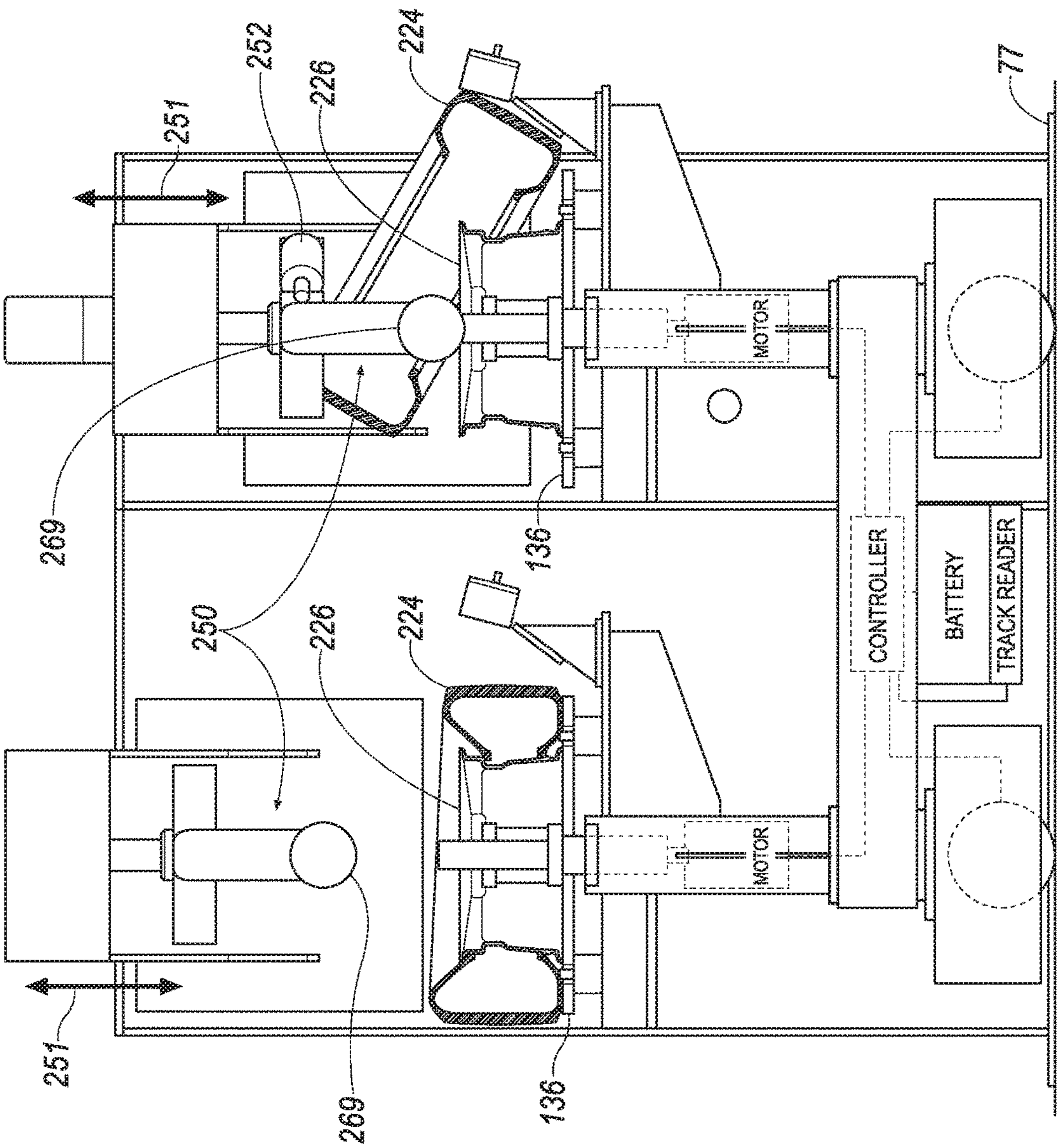
FIG. 18 is a side elevational view of FIG. 17.

Now referring to FIGS. 17-19, shaft 261 is coupled to working arm assembly 250. Working arm assembly 250 is fixed to and rotates 253 with shaft 261. Working arm assembly 250 includes at least one arm that is extendable by way of an extension cylinder 252. Extension cylinder 252 when it is in a minimum extended state is effective for extending a working end (e.g. roller member 269) to a first radial position 263. When extension cylinder 252 is extended to a maximum state, it is effective for positioning roller member 269 in a second radial position 265. Other radial positions intermediate first radial position 263 and second radial position 265 may be accomplished by activating extension cylinder 252 to a position intermediate the minimum and maximum states. The presence of extension cylinder 252 in conjunction with the other pivoting members which make up working arm assembly 250 allow wheel member 269 to be adjusted to any number of radial positions 255. This adjustability allows the roller member 269 to accommodate a plurality of wheel sizes simply by adjusting the extension or contraction state of extension cylinder 252. This adjustability of wheel member 269 to circumscribe any number of wheel diameters is important in tire/wheel mounting applications wherein wheel member 269 is the primary working member to effect the mounting of the tire to the wheel. Such mounting techniques are known in the art.

Figure 20:
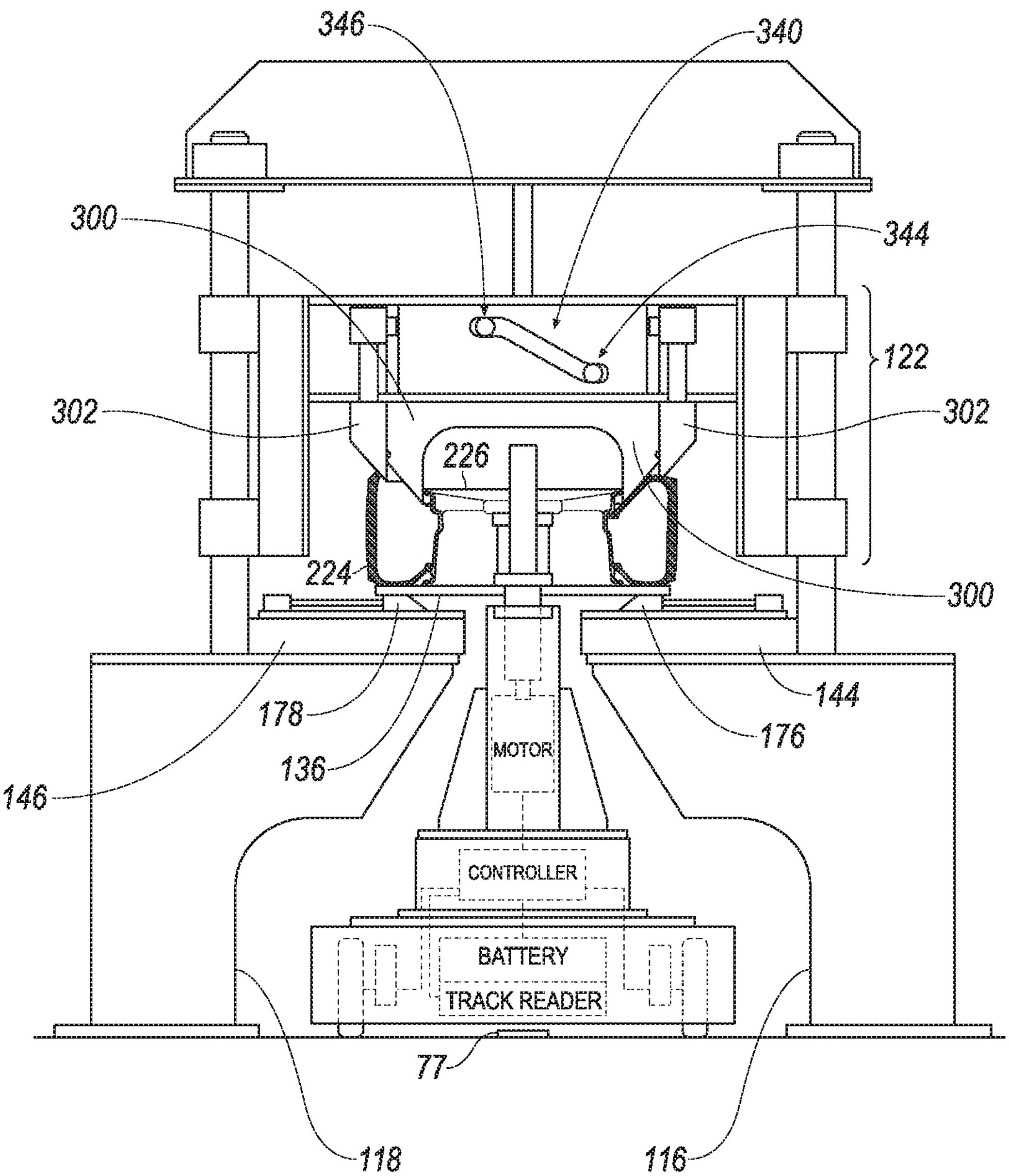
FIG. 20 is an exemplary work station fitted with a cam-operated working head.
Figure 21:
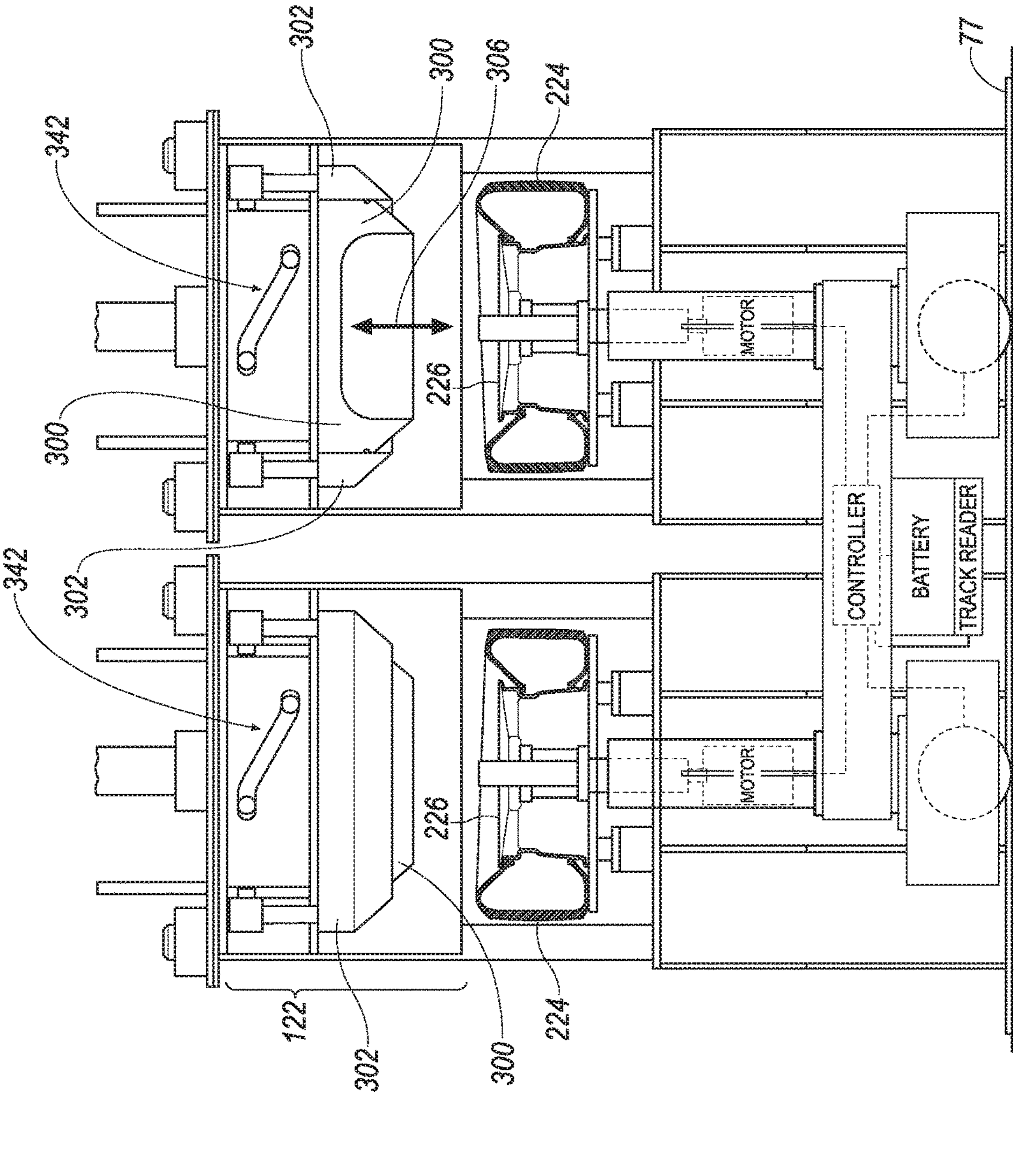
FIG. 21 is a side elevational view of FIG. 20.

FIG. 20 illustrates an exemplary implementation of a tire inflation work station having a working device 122 that includes a first inflation head 300 that is adapted to inflate tire/wheel assemblies of a first diameter. First inflation head 300 is telescopically nested within second inflation head 302 which is adapted to inflate tire/wheel assemblies of a second diameter. Heads 300, 302 can be carried by a common platform which is vertically displaceable. At least one of the inflation heads 300, 302 is adapted to be vertically manipulated 306 with respect to the other inflation head. This manipulation can be carried out by way of one or more cam lift mechanisms 340, 342 that are positionable between a first latch position 344 and a second latch position 346. When cam mechanism 340 is manipulated into the first latch position 344, first inflation head 300 is positioned in the extended position thereby enabling it to be placed in operational engagement with the tire/wheel assembly and allowing head 300 to be used to inflate the tire/wheel assembly. When cam mechanism is in the second latch position 346, first inflation head 300 is manipulated upwardly (i.e. in a retracted position) thereby exposing second inflation head 302 to extend beyond head 300. This places head 302 in a position to operatively engage the tire/wheel assembly to be inflated. The manipulation of cam members 340, 342 can be actuated manually or it can be done by way of automated means (such as by pneumatic, electric or hydraulic motors). Automated means as well as cam linkages in general are well known to those skilled in the art.

Figure 22B:
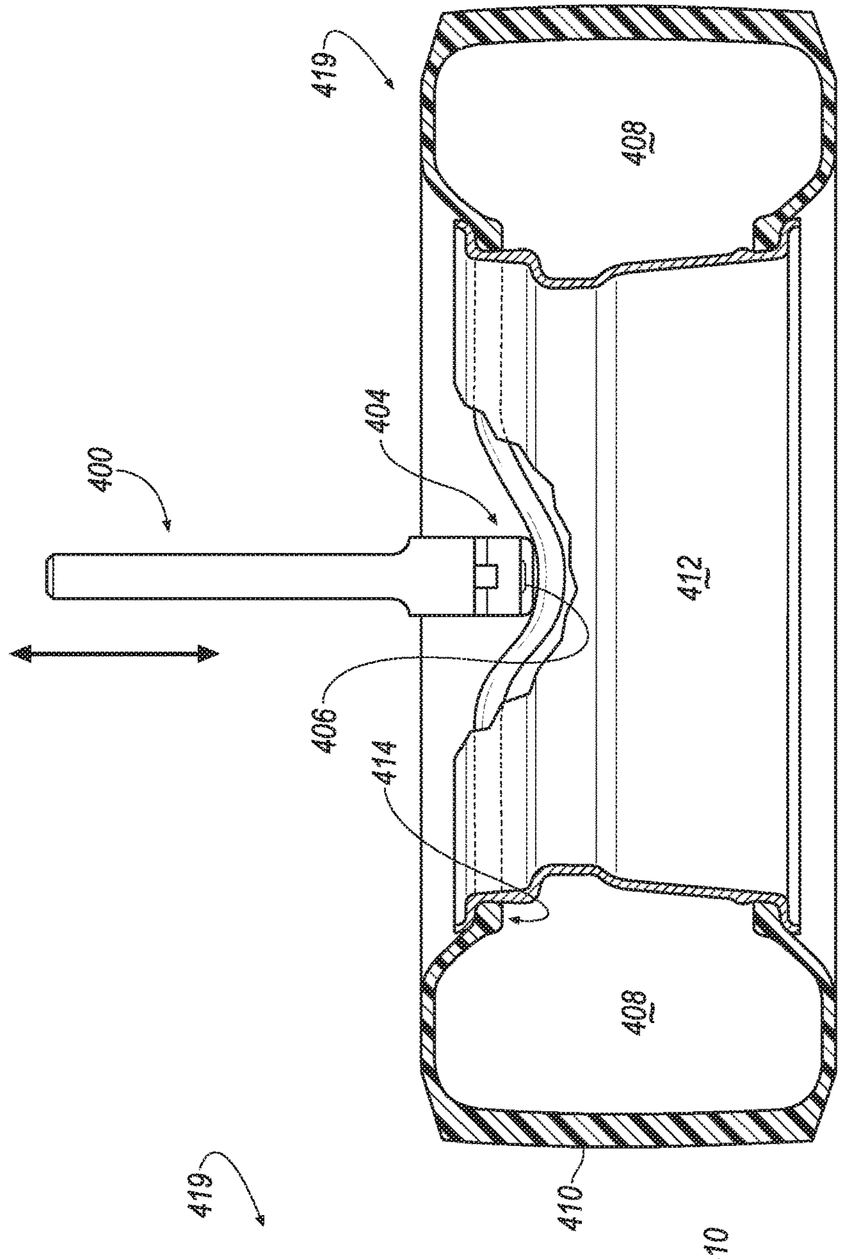
FIG. 22B is a side elevational view taken along lines 22B-22B of FIG. 22A.
Figure 22A:
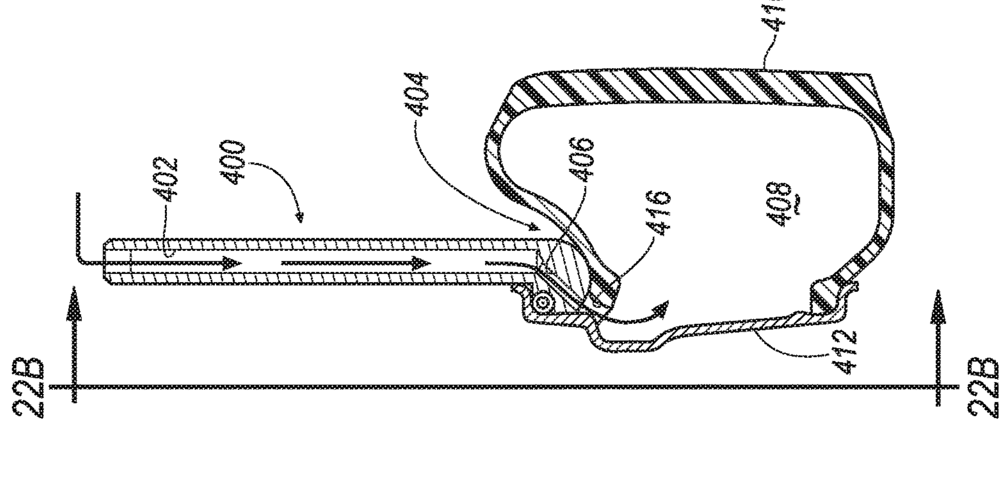
FIG. 22A is a front elevational view of an exemplary tire inflation apparatus.

Now referring to FIGS. 22A and 22B, an exemplary system for inflating a tire/wheel assembly includes an inflation probe 400 which can be attached to a working device 122 (not shown) of a work station (not shown). Inflation probe 400 can have a generally tubular body with an air passage conduit 402 formed within the body of the inflation probe 400. Inflation probe 400 can terminate into a head portion 404 that is formed to have an outer contour that generally matches the tire contour when the tire is depressed by the head portion 404 of inflation probe 400. The contour of head portion 404 may be specifically designed and contoured for a given tire design inasmuch as tire wall thicknesses and tire materials may differ in rigidity and stiffness. Head portion 404 is fitted with an internal secondary conduit 406. Secondary conduit 406 is connected to conduit 402 and is effective for delivering air into the inner portion 408 of tire/wheel assembly 419. The inflation probe 400 may include one or advantages over traditional ring style inflators. Firstly, traditional inflators may use a ring to introduce air 360 degrees around a gap 416 formed between the wheel 412 and the tire 410. During inflation, the tire 410 generates large upward forces against the ring. In order to resist these upward forces generated during inflation, the work station may be constructed from extremely heavy materials. Secondly, control timing of ring inflators may result in the generation of loud noises arising from a rush of escaping air if the ring is removed prematurely.

Using the inflation probe 400 simplifies the inflation process inasmuch as it is placed between the wheel 412 and the tire 410 proximate the wheel bead seat 414 and air is passed through conduits 402, 406. As air passes into chamber 408, the tire 410 begins to inflate and seal against the bead seat 414 of the wheel 412. Once sufficient air has passed into area 408, inflation probe 400 may be withdrawn from its position between the tire bead and the wheel bead seat 414 and the pressure within chamber 408 will properly seat any remaining portion of the bead of the tire 410 against the wheel bead seat 414 of the wheel 412.

Figure 23:
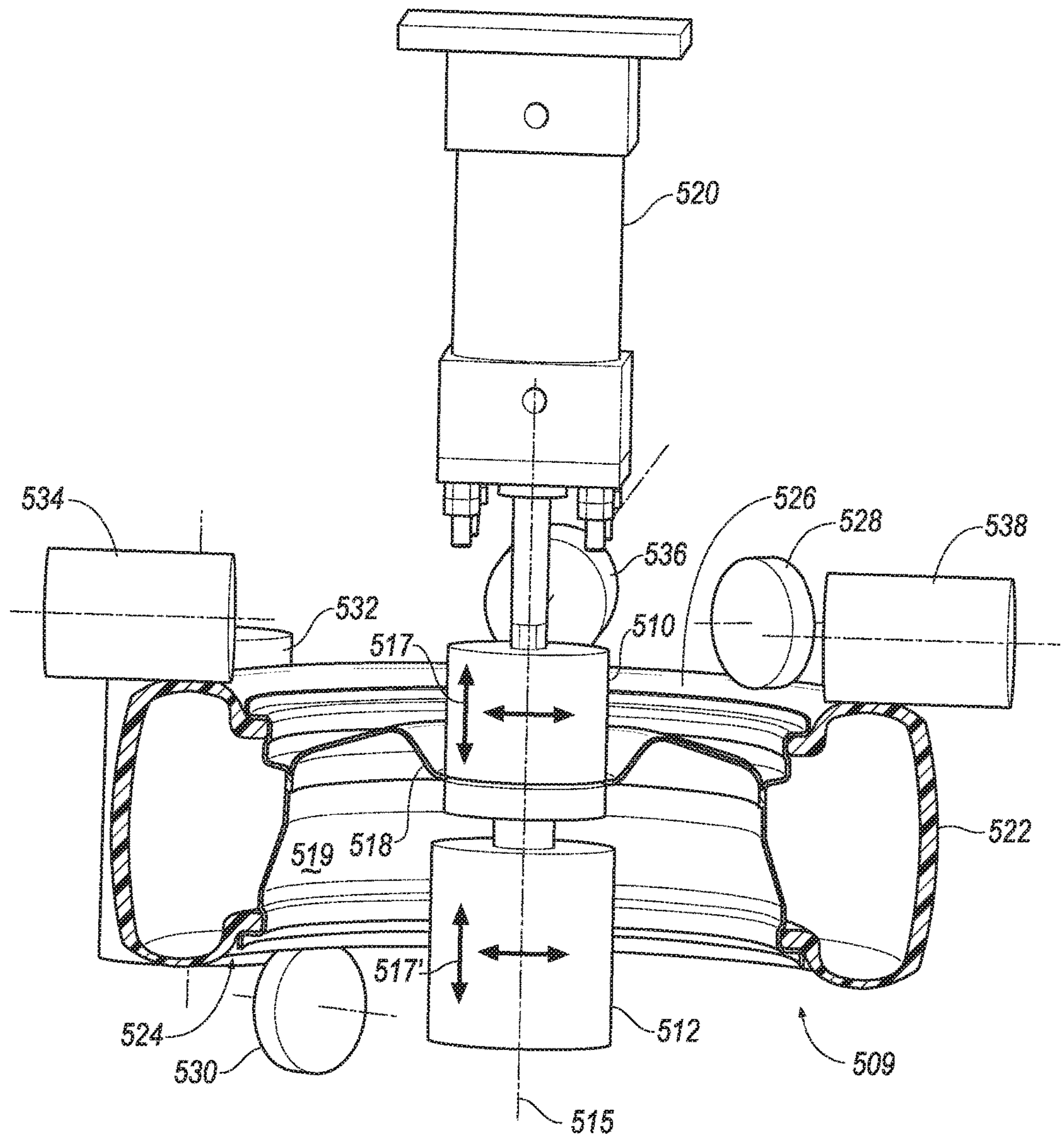
FIG. 23 is a partial cross sectional view of an exemplary tire bead seater.

FIG. 23 illustrates an exemplary implementation of a bead seater apparatus that includes an upper wheel clamp 510 and a lower wheel clamp 512. At least one of upper wheel clamp 510 or lower wheel clamp 512 is movable in parallel 517, 517' with the axis of rotation 515 of wheel and tire assembly 509. By being able to manipulate at least one of the upper wheel clamp or lower wheel clamp 510, 512 in parallel with axis of rotation 515, wheel clamp assembly 510, 512 is capable of opening a gap therebetween to accept a hub portion of a wheel 518 and (once the hub portion 518 is in proper location), closing upon hub portion 518 such that wheel clamps 510, 512 sandwich hub portion 518 of wheel 519 therebetween positively gripping assembly 509. Movement 517, 517' of clamps 510, 512 can be accomplished by way of overhead cylinder 520. In an some implementations (not shown), cylinder 520 can be placed below assembly 509. Cylinder 520 can accomplish its clamping stroke by way of any number of technologies well known to those skilled in the art including, electric, pneumatic, hydraulic actuators, or the like. Cylinder 520 can be attached to a working device 122 and be made part of a work station as has been discussed herein. Clamp 512 can be made part of a wheeled cart 42, 66 as disclosed herein.

Once clamps 510, 512 have been manipulated to sandwich hub 518 therebetween, the sidewalls 524, 526 of tire 522 are brought into contact with deforming rollers 528, 530. The function of deforming rollers 528, 530 is to temporarily deflect the sidewall of tire 522 inwardly (towards the air filled core of the tire) enough to deflect the bead portion of the tire away from the bead seating portion of wheel 519. In some implementations, the deforming rollers 528, 530 may engage the sidewall of tire 522 as close as possible to the interface portion between the tire sidewall and the bead seat portion of the wheel. It is advantageous for deforming rollers 528, 530 to deflect the bead seating portion of the tire in this vicinity because it is believed that by "flexing" the tire in this vicinity, it disturbs the equilibrium established between the tire bead and the wheel bead seat and this disturbance will cause an improperly seated tire to properly seat. It will also encourage the evacuation of any air bubbles that may be trapped between the tire bead and the wheel bead seat. Although FIG. 23 is shown with two deforming rollers 528, 530, it is contemplated that the present disclosure may employ, one, two or more than two deforming rollers. For example, it is contemplated that upper deforming roller 528 may have a counter part upper deforming roller spaced 180 degrees from it (180 degrees with respect to rotational axis 515) and, likewise, it is contemplated that lower deforming roller 530 might have a counterpart roller spaced 180 degrees from it (180 degrees relative to rotational axis 515).

Once deforming rollers 528, 530 are engaged against the sidewalls of tire 522, tire 522 is rotated about its axis of rotation 515. This rotational motion can be imparted to tire 522 in any number of ways including rotating roller 532 which is connected to a drive motor (not shown) and which contacts the tread portion of tire 522. Additional rotational mechanisms can be used such as one or more guide rollers 534, 536, 538. One or more of the guide rollers 534, 536, 538 can be connected to a rotational drive means (not shown) such as an electric motor, pneumatic motor, hydraulic motor or the like wherein the guide roller imparts rotational energy to the tire 522 by way of its sidewall portion 526. In some implementations, one or more the deforming rollers 528, 530 may be coupled to a drive motor or the like to impart rotational energy the side wall of the tire while they concurrently deform the side wall of the tire as explained above. It is contemplated that the rotational energy imparted to wheel and tire assembly 509 can be accomplished by way of a motor attached to cylinder 520 or to clamp 512.

It is contemplated that wheel and tire assembly can be carried on a wheeled cart 42, 66 (such as disclosed herein) from work station to work station and that the apparatus shown in FIG. 23 can be part of a tire bead seating station. Once the robotic cart is in proper location within the tire bead seating station, lower wheel clamp 512 (which is part of the permanent portion of the wheel bead seating station) moves upwardly engaging hub portion 518 thereby lifting wheels 68 (not shown) from the floor. It is contemplated that the upward movement imparted by lower wheel clamp 512 to wheel and tire assembly 9 can also be used to drive the upper side wall portion of tire 522 against guide rollers 534, 536, 538 if such guide rollers are used. These guide rollers, if used, can function to stabilize the tire during its rotation as described above. Once the tire 522 is manipulated against guide rollers 534, 536, 538, deforming rollers 528, 530 and roller 532 (if used) can be manipulated into place to accomplish the bead seating function described above.

Figure 24:
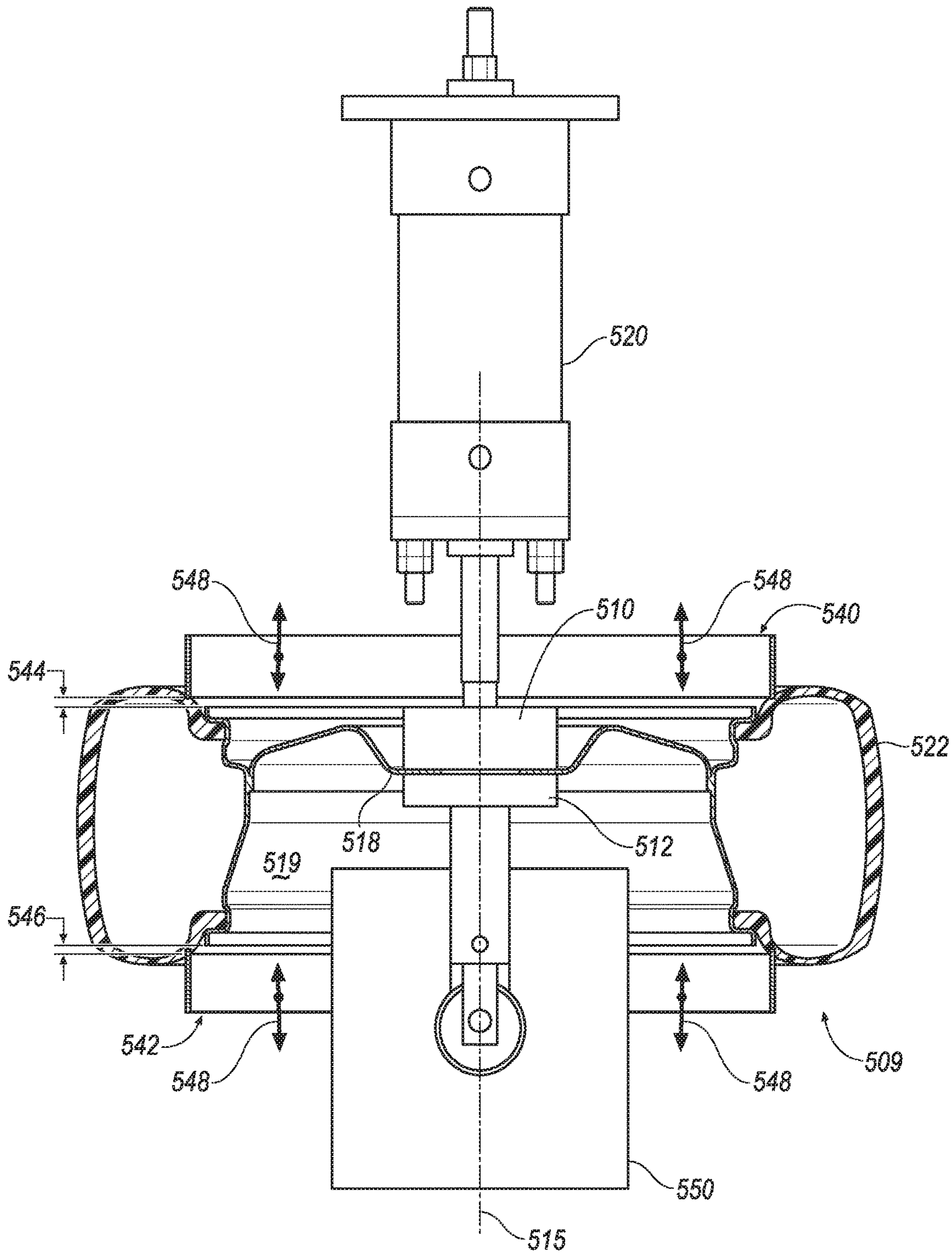
FIG. 24 is a partial cross sectional view of another exemplary tire bead seater.

FIG. 24 illustrates an exemplary implementation of an upper wheel clamp 510, a lower wheel clamp 512, and overhead cylinder 520 which function to clampingly retain the hub portion 518 of wheel 519 therebetween and with the addition of a lifting drive mechanism (not shown) are capable of lifting a wheeled cart 42, 66 off of the floor (wheeled cart not shown). The details of the interaction between upper wheel clamp 510, lower wheel clamp 512, overhead cylinder, and lifting mechanism are discussed above and will not be repeated here. Unlike the implementation illustrated in FIG. 23, the implementation illustrated in FIG. 24, does not use rotational movement about axis 515 in conjunction with deforming rollers 528, 530 to disturb the seating area between tire bead and wheel bead seat. Rather, the implementation illustrated in FIG. 24 may use two platens (upper platen 540 and lower platen 542) to squeeze against the respectively associated upper and lower side wall portions of tire 522 while still remaining spaced apart 544, 546 from the lateral edge of wheel 519. Once this sandwiching relationship between the side wall portions of tire 519 and upper and lower platens 540, 542 has been established, one or both platens 540, 542 are vibrated 548 against their respectively associated tire side wall portions such that the vibrational energy imparted to the tire bead portion of tire 522 causes the tire bead to lodge properly in the wheel bead seat. At no time does the platen actually contact the lateral sides of wheel 519 and thus all the vibrational energy imparted to the wheel and tire assembly 509 is imparted from platens 540, 542 to the side walls of tire 522 in the proximate area in which the wheel bead seat interfaces to the tire bead. Vibrational energy 548 can be imparted to the platens using any number of well known techniques such as eccentric cams rotated by electrical, hydraulic, or pneumatic energy or the like. In some implementations, after platens 540, 542 are manipulated against the side walls of tire 522 to sandwich the tire side walls therebetween, the platens 540, 542 can remain stationary and the hub portion 518 of wheel 519 can be upwardly and downwardly vibrated. This upward and downward vibration of wheel 519 can be accomplished either by way of a dual purpose overhead cylinder which can be located above the tire and wheel assembly 509 (shown in FIG. 24) or below tire and wheel assembly 509 (not shown in FIG. 24) or can be imparted by way of a separate vibrational mechanism shown schematically as 550 in FIG. 24. The wheel and tire assembly 509 may be held fixed, and, platens 540, 542 may be vibrated against tire 522, or, platens 540, 542 are held in a sandwich relationship against the side walls of tire 522 and wheel 519 is vibrated. An aspect of the present invention is that there be established a vibrational displacement of the tire bead seating portion of tire 522 in proximity of the bead seating portion of wheel 519.

Figure 25:
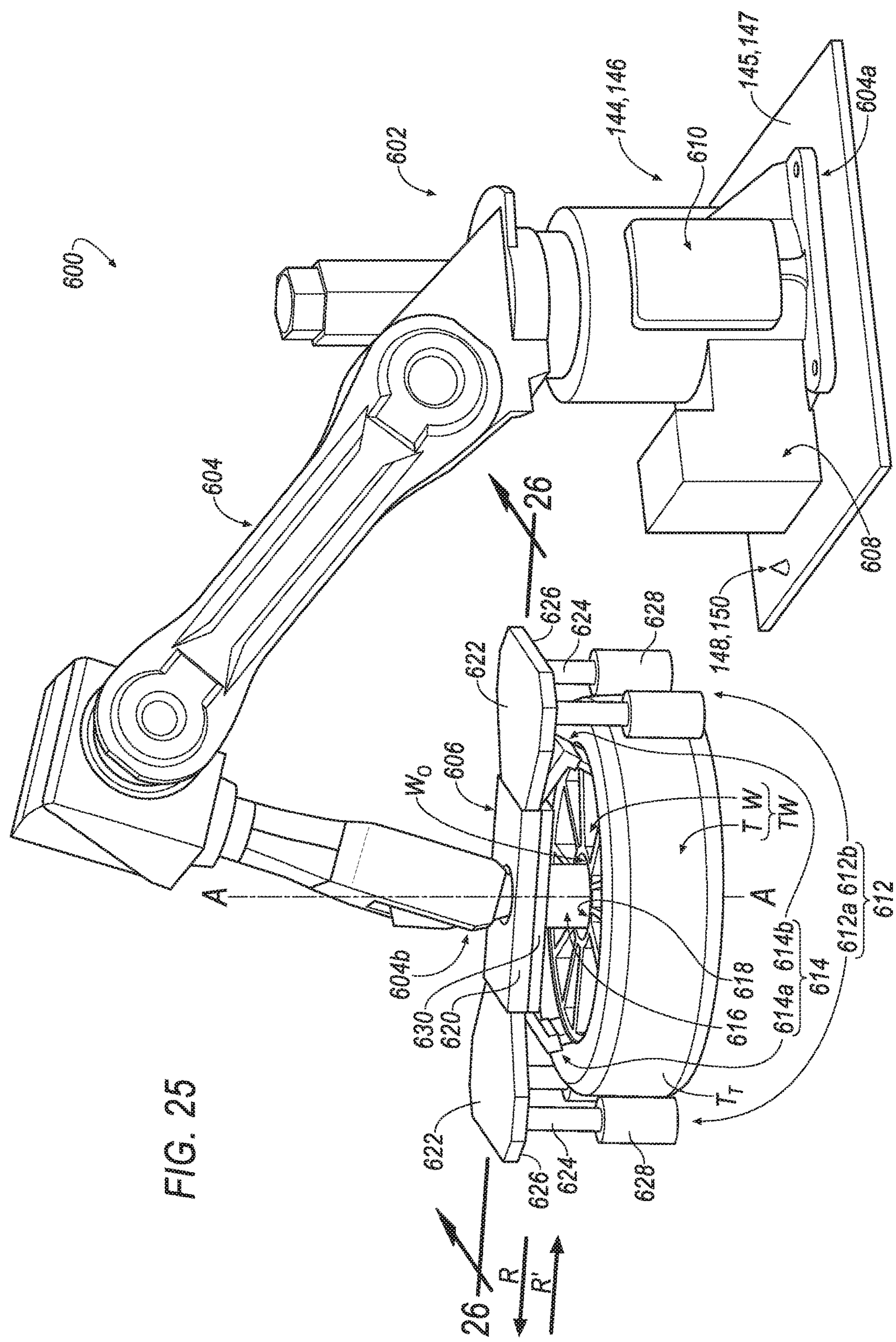
FIG. 25 is a perspective view of an exemplary inflation work station.

FIG. 25 illustrates an exemplary implementation of an inflation work station 600. The inflation work station 600 may be included in the exemplary plant layout 30 of FIG. 1. In an implementation, the inflation work station 600 may be included, for example, at the location of a tire inflator work station identified at reference numeral 52 of the plant layout 30 and may perform an inflation operation so as to inflate a tire-wheel assembly, TW, that includes a tire, T, that is positioned relative a wheel, W. An inflation operation for inflating the tire-wheel assembly, TW, may be a manual operation, a fully automatic operation, or a combination of a (i.e., a hybrid) manual-automatic operation.

Figure 26A:
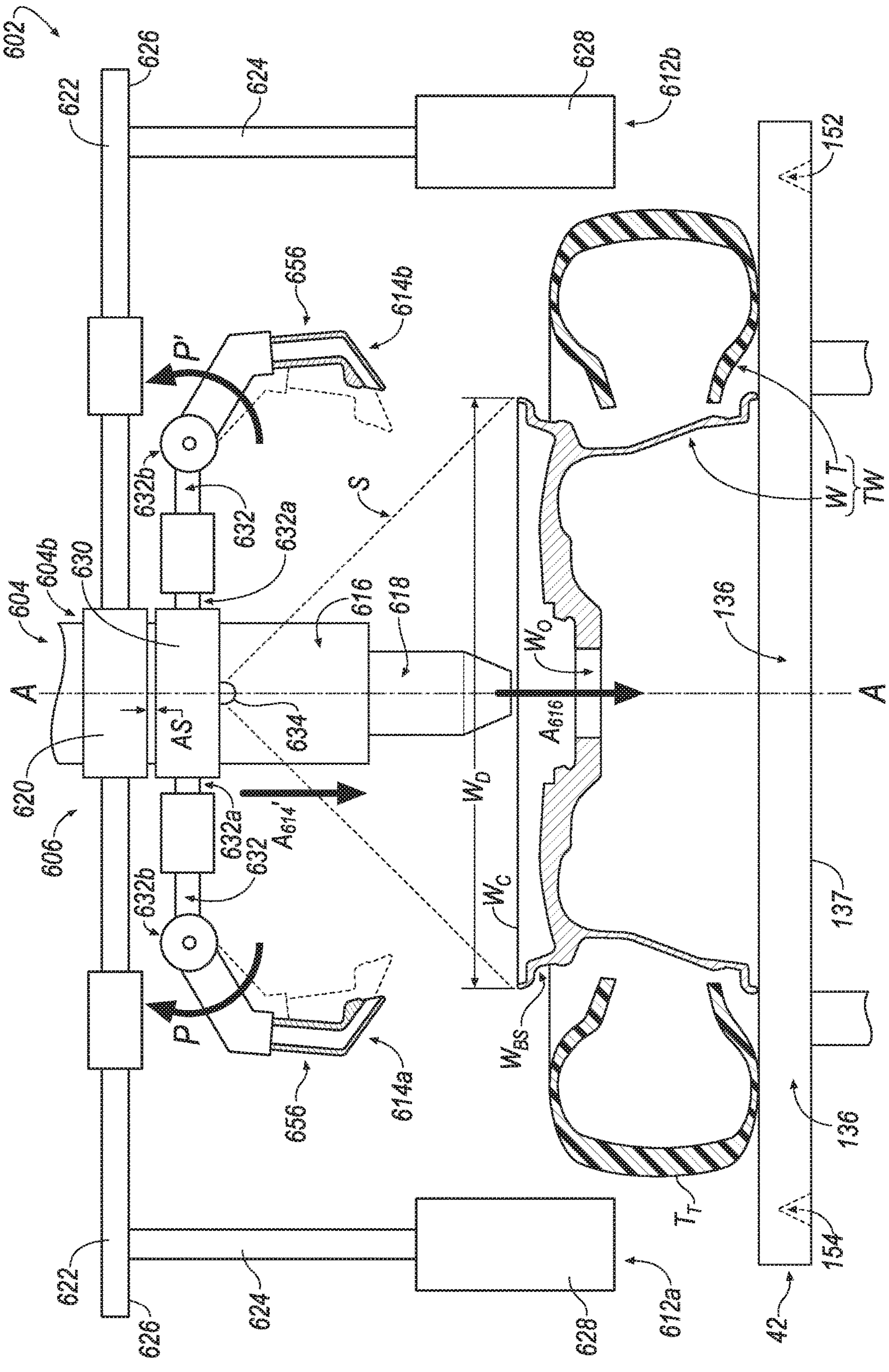
FIGS. 26A-26G illustrate a series of cross-sectional view of the inflation work station according to line 26-26 of FIG. 25.
Figure 26B:
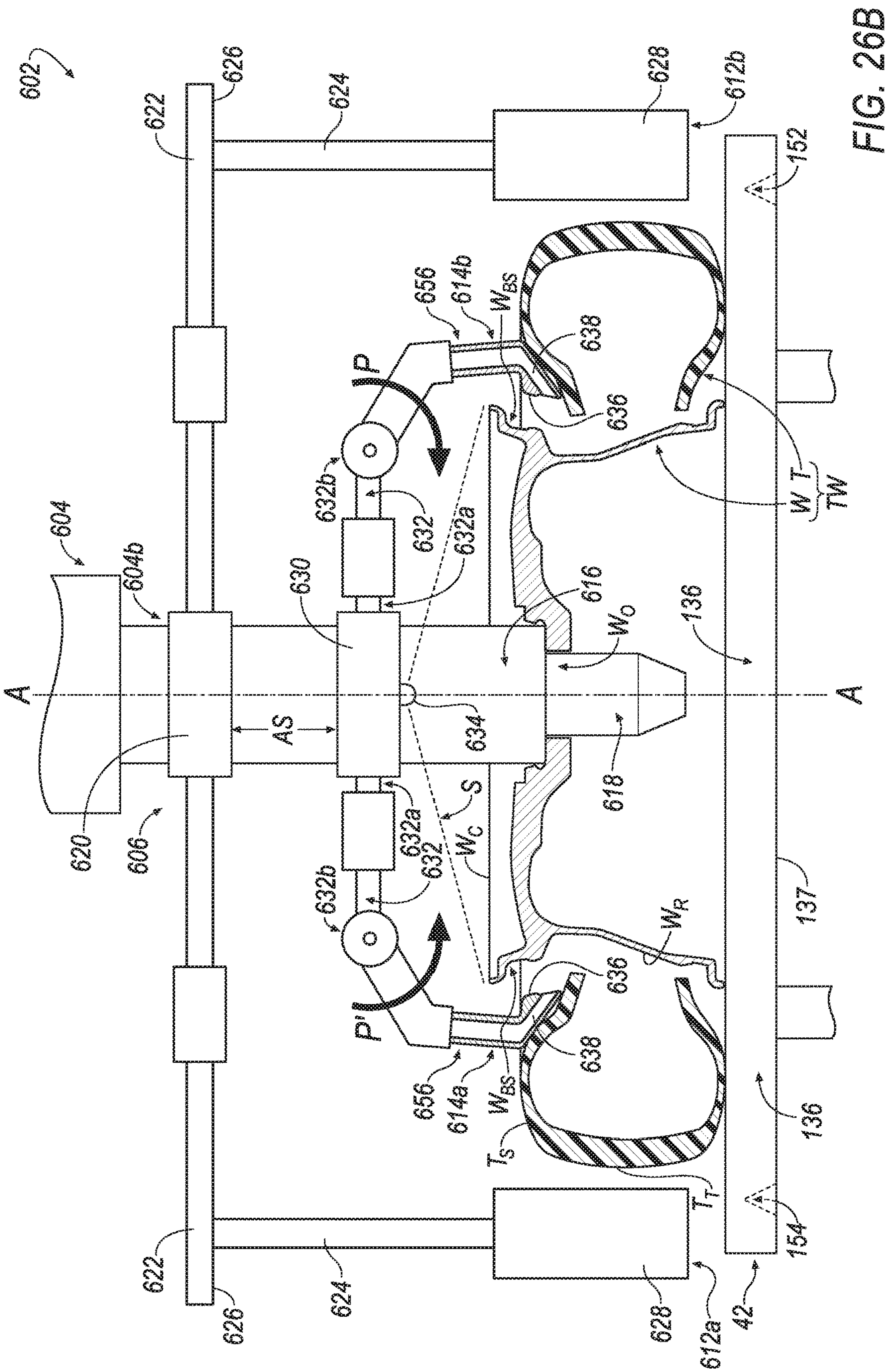
Figure 26C:
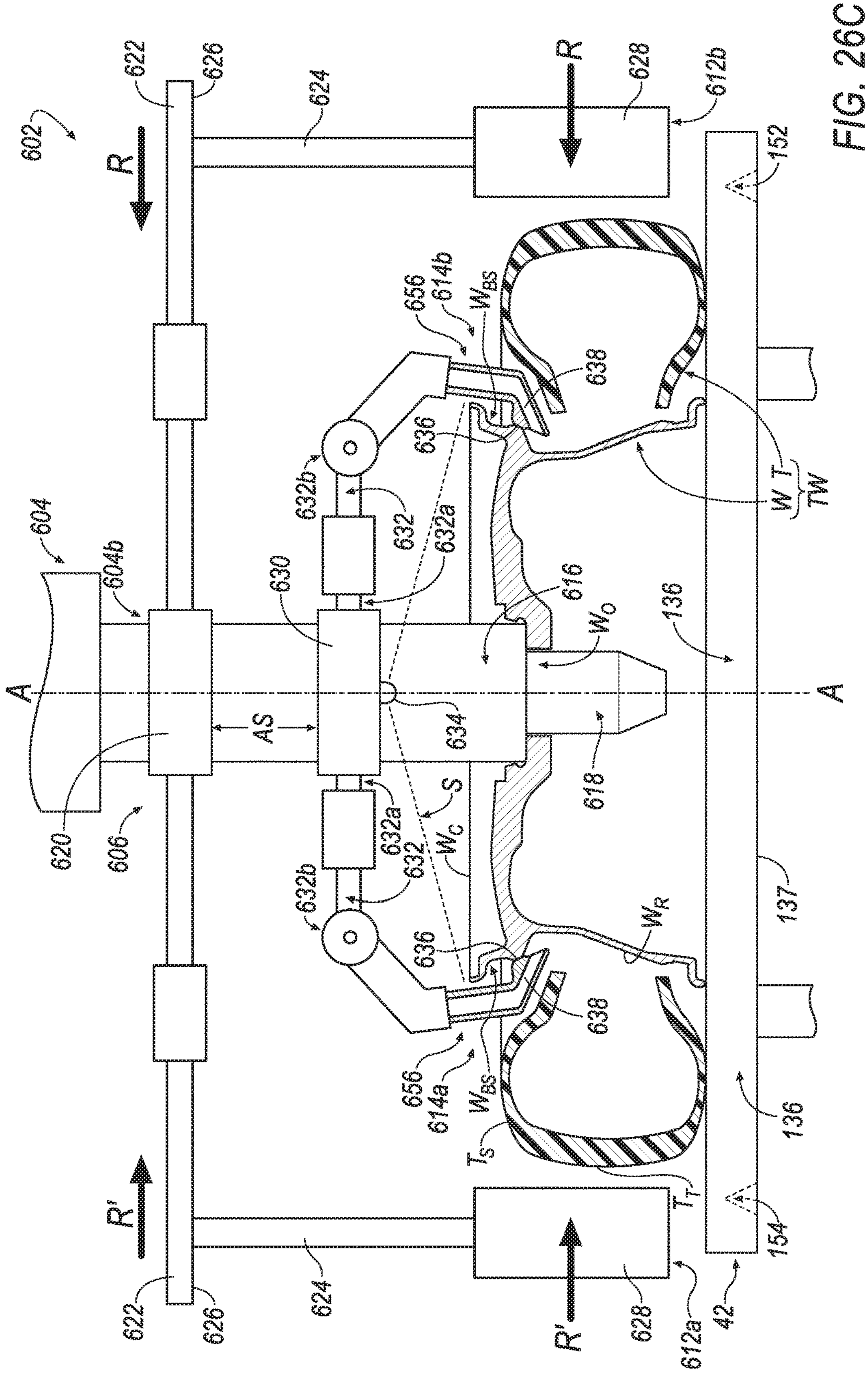

In some implementations, as seen, for example, in FIGS. 26A-26C, the tire-wheel assembly, TW, may be initially positioned upon a wheeled cart 42 that navigates a circuit 44 of the plant layout 30; the wheeled cart 42 may deliver the tire, T, and wheel, W, to the inflation work station 600 such that a portion of the inflation work station 600 may engage (see, e.g., FIGS. 26B-26C) one or more of the tire, T, and, wheel, W, then lift/remove (see, e.g., FIGS. 26D-26G) the tire, T, and wheel, W, from the wheeled cart 42. As described above, the circuit 44 may include a track 46 that forms one or more paths of travel available to the wheeled cart 42. In some implementations, the track 46 can be comprised of a track material, such as, for example, rails and the like, or, in some implementations, the track 46 may be comprised of any means (e.g., a track reader 75 and track member 77 seen, e.g., in FIGS. 7-10) that the wheeled cart 42 can use to guide its movement as it traverses circuit 44.

Referring to FIG. 25, in some implementations, the inflation work station 600 may include a working device 602. The working device 602 may extend from an upper surface 145, 147 of a load bearing member 144, 146 of the inflation work station 600. In some implementations, the wheeled cart 42 may be arranged relative the load bearing member 144, 146 in a substantially similar fashion as seen in FIGS. 7-10. Further, in some implementations, the upper surface 145, 147 of the load bearing member 144, 146 may also include an engagement member 148, 150 that may be interfaced with a respectively-associated mating engagement recess 152, 154 (see, e.g., FIGS. 26A-26C) formed in a lower surface 137 of a work surface member 136 of the wheeled cart 42.

As seen in FIG. 25, the working device 602 may be formed to include a robotic arm 604 having a first end 604*a* and a second end 604*b*. The first end 604*a* may be attached to the upper surface 145, 147 of the load bearing member 144, 146. The second end 604*b* terminates with/may include an end effecter 606 that may be selectively coupled to/selectively interfaced with the tire-wheel assembly, TW. The working device 602 may also be in communication with a motor 608 and a controller 610 for controlling movements of any portion of the working device 602 and/or an inflation operation performed by the working device 602 for inflating the tire-wheel assembly, TW.

In some implementations, the end effecter 606 may include a retaining apparatus 612 and an inflation apparatus 614. An orientation of one or more components comprising the retaining apparatus 612 may be spatially manipulated in order to selectively engage one or more of the tire, T, and wheel, W, for retaining the tire-wheel assembly, TW, to the robotic arm 604. The inflation apparatus 614 selectively engages one or more of the tire, T, and wheel, W, and supplies a fluid, F (see, e.g., FIGS. 26D-26E), such as, e.g., air, which may or may not be pressurized, to the tire-wheel assembly, TW, for inflating the tire-wheel assembly, TW.

The end effecter 606 may include a wheel-engaging plunger member 616. Each of the retaining apparatus 612 and the inflation apparatus 614 may be in/directly connected to and/or be movably-coupled relative to the wheel-engaging plunger member 616. The wheel-engaging plunger member 616 may include an axially-projecting portion 618 (see also, e.g., FIGS. 26A-26G). One or more of the wheel-engaging plunger member 616 and the axially-projecting portion 618 may be interfaceably-coupled to the wheel, W. As seen in FIGS. 26B-26G, in an implementation, the axially-projecting portion 618 may be arranged within an axial opening, $W_O$, of the wheel, W. To provide a frame of reference for axial and radial directions described in the following disclosure, an axis, A-A, is shown extending through the axial opening, $W_O$, of the wheel, W.

Referring to FIG. 25, in an implementation, the retaining apparatus 612 may include a first tire-engaging portion 612*a* and a second tire-engaging portion 612*b* each extending from a retaining apparatus base member 620. Each of the first and second tire-engaging portions 612*a*, 612*b* include a retaining apparatus radially-projecting portion 622 that may be movably-coupled to the retaining apparatus base member 620 in order to permit each of the first and second tire-engaging portions 612*a*, 612*b* to move radially outwardly or radially inwardly according to the direction of arrow R, R'.

Each of the first and second tire-engaging portions 612*a*, 612*b* may include one or more axially-projecting portions 624 that axially project away from a lower surface 626 of the retaining apparatus radially-projecting portion 622. Each of the axially-projecting portions 624 may include a head portion 628. In some implementations, the head portion 628 of each axially-projecting portion 624 may include a greater dimension (e.g., a greater diameter) than that of its corresponding axially-projecting portion 624. In some implementations, the head portion 628 may include rubber or a material having a degree of elasticity and/or a coefficient of friction that may be greater than that of the axially-projecting portion 624 in order to increase the likelihood of positively-retaining the tire-wheel assembly, TW, with the retaining apparatus 612. As will be described in the following disclosure, the one or more head portions 628 may come into contact with and engage a tread surface, $T_T$, of the tire, T.

In an implementation, the inflation apparatus 614 may include a first inflation probe 614*a* and a second inflation probe 614*b* each extending from an inflation apparatus base member 630. The inflation apparatus base member 630 may be movably-coupled relative to the wheel-engaging plunger member 616 (see, e.g., FIGS. 26A, 26D-26F) in order to permit the inflation apparatus 614 to be movably-disposed, in first or second axial directions $A_{614}$ (see, e.g., FIGS. 26D-26F)/$A_{614}'$ (see, e.g., FIG. 26A).

Each of the first and second inflation probes 614*a*, 614*b* may be connected to the inflation apparatus base member 630 by way of a probe radially-projecting portion 632 (see, e.g., FIGS. 26A-26G). The probe radially projecting portion 632 may include a first end 632*a* coupled to the inflation apparatus base member 630 and a second end 632*b* coupled to a distal end portion 656 (see, e.g., FIGS. 38-39) of the inflation probe 614*a*, 614*b*. In some implementations, the second end 632*b* may form a pivot joint that permits the distal end portion 656 of the inflation probe 614*a*, 614*b* to pivotably move relative the probe radially-projecting portion 632 in clockwise direction or counter-clockwise direction according to the direction of arrows, P, P' (see, e.g., FIGS. 26A-26B, 26D-26F).

FIGS. 26A-26G illustrate an exemplary series of movements of the end effecter 606 for retaining the tire-wheel assembly, TW, with the retaining apparatus 612 and subsequently inflating the tire-wheel assembly, TW, with the inflation apparatus 614. FIG. 26A generally illustrates the end effecter 606 in a disengaged orientation such that no portion of the end effecter 606 comes into contact with the tire-wheel assembly, TW. FIGS. 26B-26G illustrate the end effecter 606 arranged in at least a partially-engaged orientation with the tire-wheel assembly, TW. As described above, any portion of the working device 602 may be in communication with one or more of the motor 608 and the controller 610 in order to control movements (see, e.g., FIGS. 26A-26G) of any portion of the working device 602 and/or to control an inflation operation (see, e.g., FIGS. 26D-26E) performed by the working device 602 for inflating the tire-wheel assembly, TW. Accordingly, in an implementation, the controller 610 may include a program that causes actuation of the motor 608 for driving the end effecter 606 to move or actuate in a specified manner.

Referring initially to FIG. 26A, prior to arranging any portion of the end effecter 606 in at least a partially engaged orientation with the tire-wheel assembly, TW, the first and second inflation probes 614*a*, 614*b* may be initially arranged in an expanded orientation. If one or more of the first and second inflation probes 614*a*, 614*b* are initially arranged in at least a partially-retracted orientation (see, e.g., phantom outline of the first and second inflation probes 614*a*, 614*b* in FIG. 26A), one or more of the motor 608 and controller 610 may cause one or more of the first and second inflation probes 614*a*, 614*b* to pivot, P, P', from the at least partially retracted orientation to at least a partially expanded orientation. In an implementation, the at least partially expanded orientation may result in the first and second inflation probes 614*a*, 614*b* being arranged in an orientation that is spatially beyond a circumference, $W_C$, /diameter, $W_D$, of the wheel, W, such that any portion of the wheel, W, does not interfere with the first and second inflation probes 614*a*, 614*b* as the first and second inflation probes 614*a*, 614*b* are axially moved, $A_{614}$', $A_{616}$, proximate a bead seat, $W_{BS}$, of the wheel, W.

Although it has been explained above that the first and second inflation probes 614*a*, 614*b* may be initially arranged to be in an expanded orientation to alleviate potential interference of the wheel, W, with the first and second inflation probes 614*a*, 614*b*, in some circumstances, the first and second inflation probes 614*a*, 614*b* may be arranged in an orientation that may be significantly beyond the circumference, $W_C$, /diameter, $W_D$, of the wheel, W. Thus, although the first and second inflation probes 614*a*, 614*b* may be initially arranged in an initially expanded or initially retracted orientation, such "expanded" or "retracted" orientations may be relative in view of a size/geometry of the wheel, W. For example, some wheels, W, may be smaller, e.g., in diameter, $W_D$, than that of other wheels, W; accordingly, in some implementations, although the first and second inflation probes 614*a*, 614*b* may appear to be in at least a partially retracted orientation, if the wheel, W, is significantly small, e.g., in diameter, $W_D$, the first and second inflation probes 614*a*, 614*b* may not have to be further expanded from at least a partially retracted orientation.

In some implementations, the end effecter 606 may further include a sensor 634 that may sense, S, a geometry, such as, e.g., the diameter, $W_D$, of the wheel, W. The sensor 634 may be in communication with one or more of the motor 608 and controller 610 in order to cause one or more of the first and second inflation probes 614*a*, 614*b* to pivot, P, P', to/from retracted and expanded orientations. Accordingly, in some implementations, the sensor 634 may be utilized during the procedure for arranging the first and second inflation probes 614*a*, 614*b* in one of an expanded/retracted orientation in order to compensate for potentially different wheel geometries. By refining the expanded/retracted orientation of the first and second inflation probes 614*a*, 614*b* in response to sensing, S, the geometry of the wheel, W, manufacturing time may be saved by automatically arranging the first and second inflation probes 614*a*, 614*b* to be in an orientation that is, e.g., just beyond the sensed diameter, $W_D$, of the wheel, W, rather than manually arranging the first and second inflation probes 614*a*, 614*b* in an orientation to accommodate a particular geometry of a particular wheel, W.

Before, during or after any pivoting movement, P, P', of the first and second inflation probes 614*a*, 614*b* described above, axial movement, $A_{614}$', $A_{616}$, of one or more portions of the end effecter 606 may result in one or more of the wheel engaging plunger member 616 and axially-projecting portion 618 being located proximate the wheel, W, and/or the first and second inflation probes 614*a*, 614*b* being located proximate the bead seat, $W_{BS}$, of the wheel, W, in response to, for example, actuation of/instruction from one or more of the motor 608 and controller 610. As illustrated in FIG. 26A, an implement of the axial movement may include one or more axial components, which are shown generally at arrows $A_{614}$', $A_{616}$. In some implementations, a first axial component may include axial movement identified at arrow $A_{614}$' that is related to axial movement of the inflation apparatus base member 630 relative the wheel-engaging plunger member 616 of the end effecter 606 (see, e.g., a comparison of an axial spacing, AS, between, e.g., a fixed orientation of the retaining apparatus base member 620 and the non-fixed orientation of the inflation apparatus base member 630 in FIGS. 26A and 26B). In some implementations, a second axial component may include axial movement identified at reference sign $A_{616}$ that is related to axial movement of the wheel engaging plunger member 616 of the end effecter 606 that may arise from, for example, a change in orientation of the robotic arm 604 such that the second end 604*b* of the robotic arm 604 may be moved closer to the tire-wheel assembly, TW, in a plunging motion. As explained above, one or more of the motor 608 and controller 610 may cause one or more of the axial movements, $A_{614}$', $A_{616}$.

Referring to FIG. 26B, the axial movement $A_{616}$ may result in the axially-projecting portion 618 of the wheel engaging plunger member 616 being disposed through the axial opening, $W_O$, of the wheel, W. Further, one or more of the axial movement $A_{614}$', $A_{616}$ may result in the first and second inflation probes 614*a*, 614*b* being located in a spaced-apart, but proximate orientation relative to the bead seat, $W_{BS}$, of the wheel, W, while also locating the first and second inflation probes 614*a*, 614*b* substantially adjacent at least a portion of a sidewall, $T_S$, of the tire, T. The locating of the wheel engaging plunger member 616 within the axial opening, $W_O$, of the wheel, W, may also assist in arranging/positioning/anchoring the end effecter 606 in a pre-inflation orientation relative of the wheel, W. The locating of the first and second inflation probes 614*a*, 614*b* substantially adjacent at least a portion of the sidewall, $T_S$, of the tire, T, may serve to position the first and second inflation probes 614*a*, 614*b* in a pre-inflation "ready position" prior to at least partially engaging the wheel, W, as seen in FIG. 26C, which may be in response to pivoting movement, P, P', of the first and second inflations probes 614*a*, 614*b* from at least a partially expanded orientation (see, e.g., FIG. 26B) to at least a partially retracted orientation (see, e.g., FIG. 26C).

Referring to FIG. 26C, movement of the first and second inflation probes 614*a*, 614*b* to at least a partially retracted orientation results in an upper lip 636 of the distal end portion 656 of each of the first and second inflation probes 614*a*, 614*b* "kissing"/contacting a portion of the wheel, W, proximate the bead seat, $W_{BS}$, of the wheel, W, such that the distal end portion 656 of each of the first and second inflation probes 614*a*, 614*b* may be disposed/wedges between a portion of the bead, $T_B$, of the tire, T, and the bead seat, $W_{BS}$, of the wheel, W. As a result of the orientation of the first and second inflation probes 614*a*, 614*b*, which results in the "kissing"/contacting of the wheel, W, as described above, a probe fluid conduit 638 formed within the distal end portion 656 may be arranged in a substantially spaced-apart, opposing relationship with respect to a portion of a circumferential rim, $W_R$, of the wheel, W.

Figure 26D:
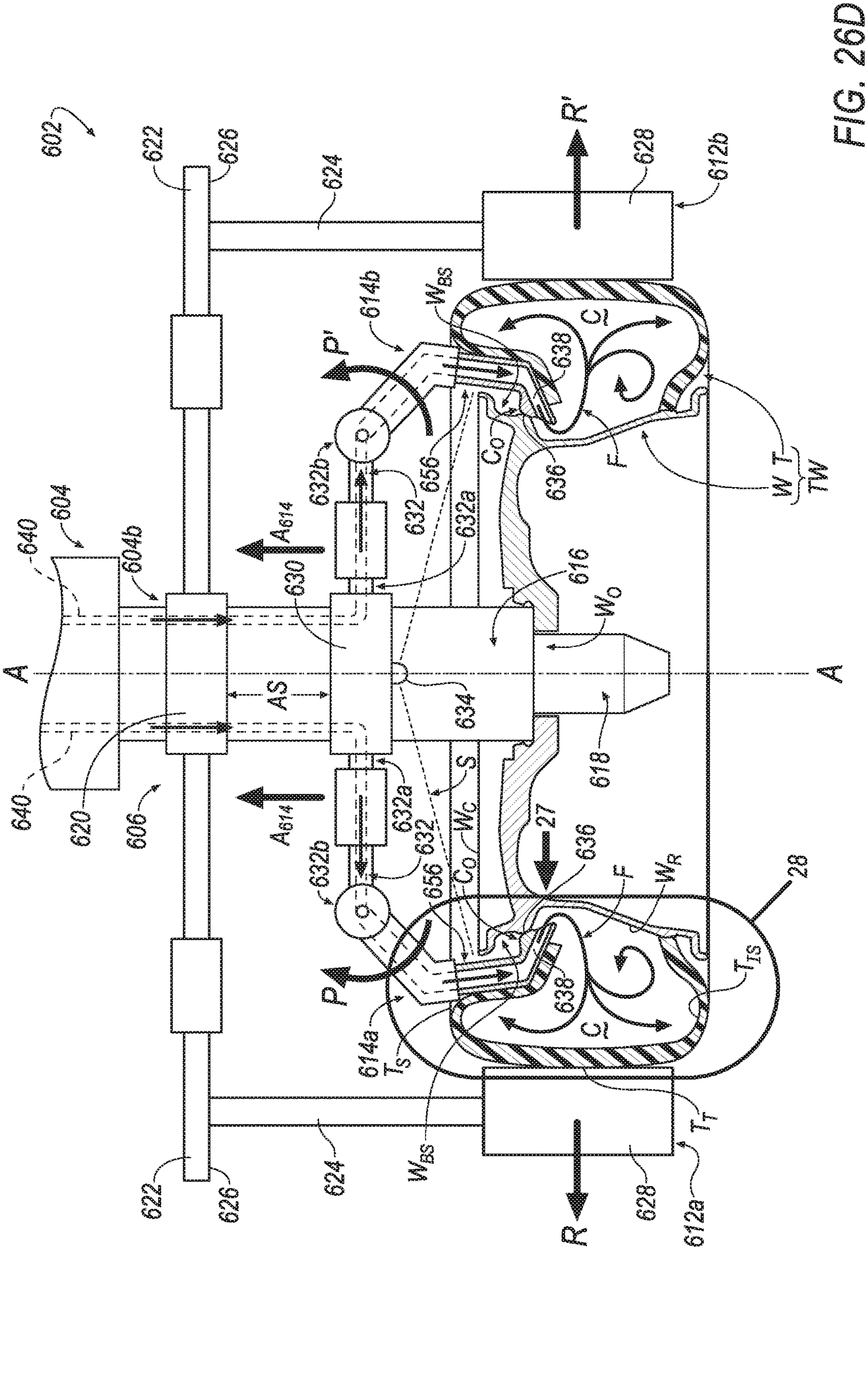

Further, as seen in FIG. 26C, prior to/during/after movement of the first and second inflation probes 614*a*, 614*b*, the retaining apparatus radially-projecting portions 622 may be radially-retracted inwardly into the retaining apparatus base member 620 according to the direction of the arrows, R, R', for causing corresponding radially-inward movement of the axially-projecting portions 624 and head portions 628 according to the direction of the arrows, R, R'; accordingly, movement of the retaining apparatus radially-projecting portions 622 may result in the head portions 628 coming into contact with and engaging the tread surface, $T_T$, of the tire, T (see, e.g., FIG. 26D).

As similarly described above, the sensor 634 may sense a geometry of the tire-wheel assembly, TW, such as, for example, an outer diameter of the tire, T. Accordingly, the sensor 634 may cause one or more of the motor 608 and controller 610 to provide the radial movement, R, R', of the retaining apparatus radially-projecting portions 622, the axially-projecting portions 624 and the head portions 628 in order to engage differently-sized tires, T. As such, the radial movement, R, R', may result in the retaining apparatus 612 being arranged in one of an expanded and retracted orientation in order to arrange the retaining apparatus in a pre-engagement orientation relative to the tire, T, and an engaged orientation with the tire, T.

Referring to FIG. 26D, one or more primary fluid conduits 640 may extend through one or more of: the wheel-engaging plunger member 616, the inflation apparatus base member 630 and the probe radially-projecting portions 632. The one or more primary fluid conduits 640 may be in fluid communication with the probe fluid conduit 638. Although the one or more primary fluid conduits 640 are shown in phantom in order to allude that the conduits 640 may be arranged within one or more of the above-identified structure, the conduits 640 may alternatively be located exterior to the structure and may be formed by, e.g., hoses (not shown) that are located exterior to one or more of the above-identified structure.

Once the first and second inflation probes 614*a*, 614*b* and head portions 628 are positioned relative the wheel, W, and tire, T, as shown, for example, in FIG. 26C, fluid, F (see, e.g., FIG. 26D), which may or may not be pressurized, may be provided through the primary fluid conduit 640 and then into the probe fluid conduit 638 such that the fluid, F, may ultimately be evacuated out of the probe fluid conduit 638 and into the tire-wheel assembly, TW. The fluid, F, may be provided from a fluid source (not shown), or, alternatively, the fluid, F, may be pumped from atmosphere. In an implementation, the circumferential rim, $W_R$, of the wheel, W, and an inner surface, $T_{IS}$, of the tire, T, may form the tire-wheel assembly, TW, to include a fluid cavity, C, that receives the fluid, F, from the fluid conduits 638, 640 of the end effecter 606. As will be described in the following disclosure at FIGS. 27-37, the first and second inflation probes 614*a*, 614*b* may or may not include structure that assists in obscuring/blocking-off/at least partially sealing access openings, $C_O$, to the cavity, C, that is/are formed by the orientation of the first and second inflation probes 614*a*, 614*b* relative one or more of the wheel, W, and tire, T, during the inflation process.

Figure 26E:
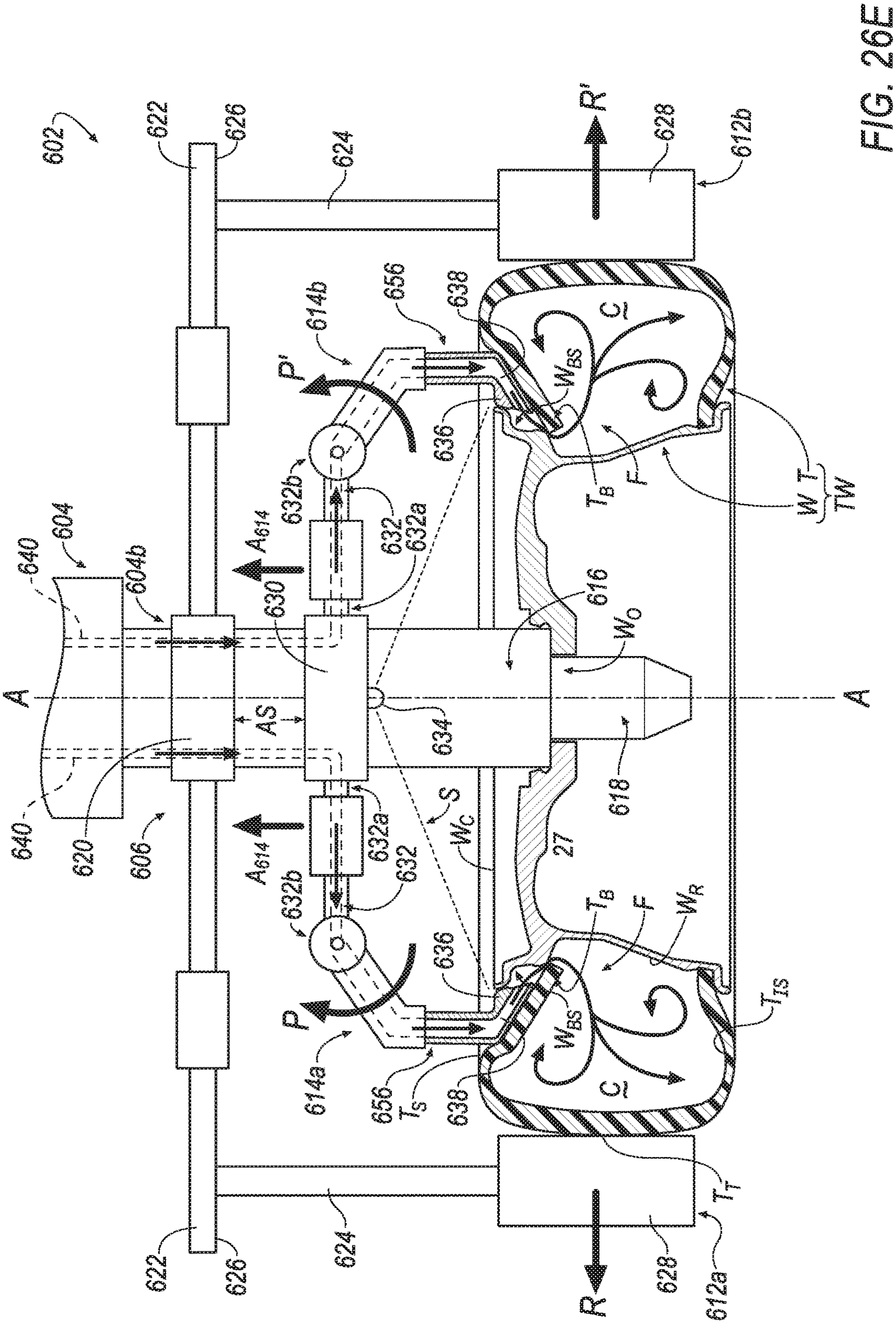

Referring to FIGS. 26D-26E, as the fluid, F, is filling the cavity, C, the tire, T, may be said to be inflated or expanded such that at least a portion of the sidewall, $T_S$, of the tire, T, may expandably-conform to an outer surface profile of one or more of the distal end portions 656 of the first and second inflation probes 614*a*, 614*b*. Further, as the fluid, F, is filling the cavity, C, the tread surface, $T_T$, of the tire, T, may be expanded outwardly, pushing the head portions 628 away from the tire-wheel assembly, TW, according to the direction of the arrows, R, R', which may correspondingly cause the axially-projecting portions 624 and the retaining apparatus radially-projecting portions 622 to be expanded or moved radially-outwardly according to the direction of the arrows, R, R'. Further, as a result of the fluid, F, being evacuated from the conduit 638 of the first and second inflation probes 614*a*, 614*b*, the fluid, F, if pressurized, may cause the first and second inflation probes 614*a*, 614*b* to "take off" or pivot away from the tire-wheel assembly, TW, according to the direction of the arrows, P, P', such that the first and second inflation probes 614*a*, 614*b* may be said to be moved from the at least partially retracted orientation to at least a partially expanded orientation; however, in the absence of the fluid, F, being pressurized, or, in addition to the fluid being pressurized, one or more of the motor 608 and controller 610 may cause the first and second inflation probes 614*a*, 614*b* to pivot, P, P', and/or the inflation apparatus base member 630 to raise the first and second inflation probes 614*a*, 614*b* away from the tire-wheel assembly, TW, according to the direction of the axial arrow, $A_{614}$, such that the axial spacing, AS, between the retaining apparatus base member 620 and the inflation apparatus base member 630 may be reduced.

Figure 26F:
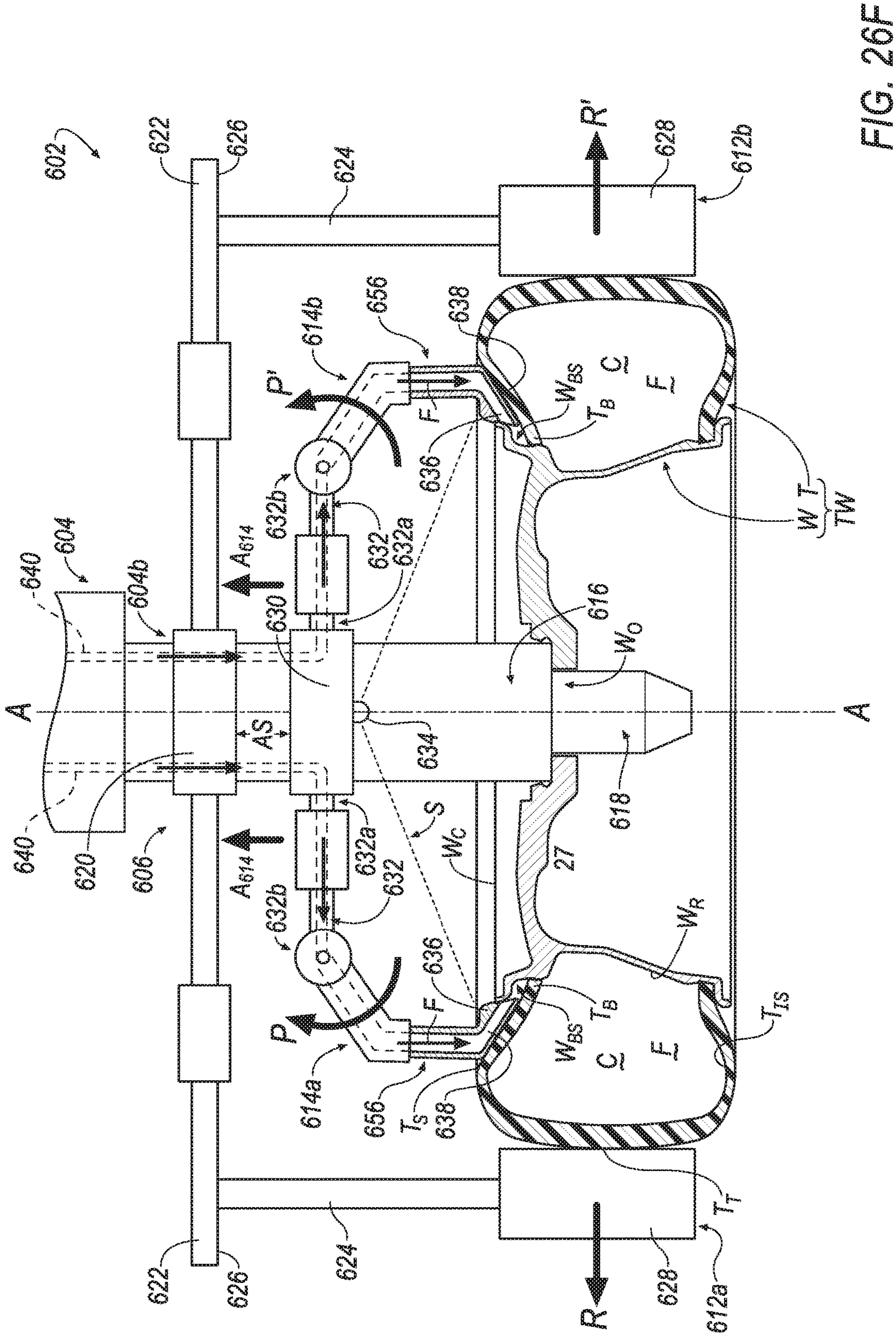

Referring to FIG. 26F, as a result of the fluid, F, filling the cavity, C, the tire-wheel assembly, TW, becomes pressurized and results in a bead, $T_B$, of the tire, T, being moved by the fluid, F, such that the bead, $T_B$, of the tire, T, may be located proximate the bead seat, $W_{BS}$, of the wheel, W. As illustrated, the bead, $T_B$, of the tire, T, may be located proximate the bead seat, $W_{BS}$, of the wheel, W, in a sealing relationship such that the fluid, F, may be trapped within the cavity, C, causing the tire, T, to be inflatably-pressurized relative the wheel, W. However, as seen in FIG. 26F, although the bead, $T_B$, of the tire, T, is located proximate the bead seat, $W_{BS}$, of the wheel, W, a portion of the distal end portion 656 of the first and second inflation probes 614*a*, 614*b* may still be located adjacent at least a portion of the sidewall, $T_S$, of the tire, T, such that the bead, $T_B$, of the tire, T, may not be entirely disposed adjacent/within the bead seat, $W_{BS}$, of the wheel, W. Further, as seen in FIG. 26F, because the fluid, F, has further filled the cavity, C, in comparison to the previous views illustrated in FIGS. 26D-26E, the tread surface, $T_T$, of the tire, T, may be further expanded outwardly according to the direction of arrows, R, R', pushing the head portions 628 further away from the tire-wheel assembly, TW, which may correspondingly cause the axially-projecting portions 624 and the retaining apparatus radially-projecting portions 622 to be further expanded or moved radially-outwardly according to the direction of the arrows, R, R'. Even further, as a result of the fluid, F, still being evacuated from the conduit 638 of the first and second inflation probes 614*a*, 614*b*, the first and second inflation probes 614*a*, 614*b* may further "take off" or pivot away from the tire-wheel assembly, TW, according to the direction of the arrows, P, P', and/or, as described above, one or more of the motor 608 and controller 610 may cause the first and second inflation probes 614*a*, 614*b* to further pivot, P, P', from at least a partially retracted orientation to the at least a partially expanded orientation. Further, one or more of the motor 608 and controller 610 may cause the axial spacing, AS, between the retaining apparatus base member 620 and the inflation apparatus base member 630 to be reduced by retracting the apparatus base member 620 toward the inflation apparatus base member 630.

Figure 26G:
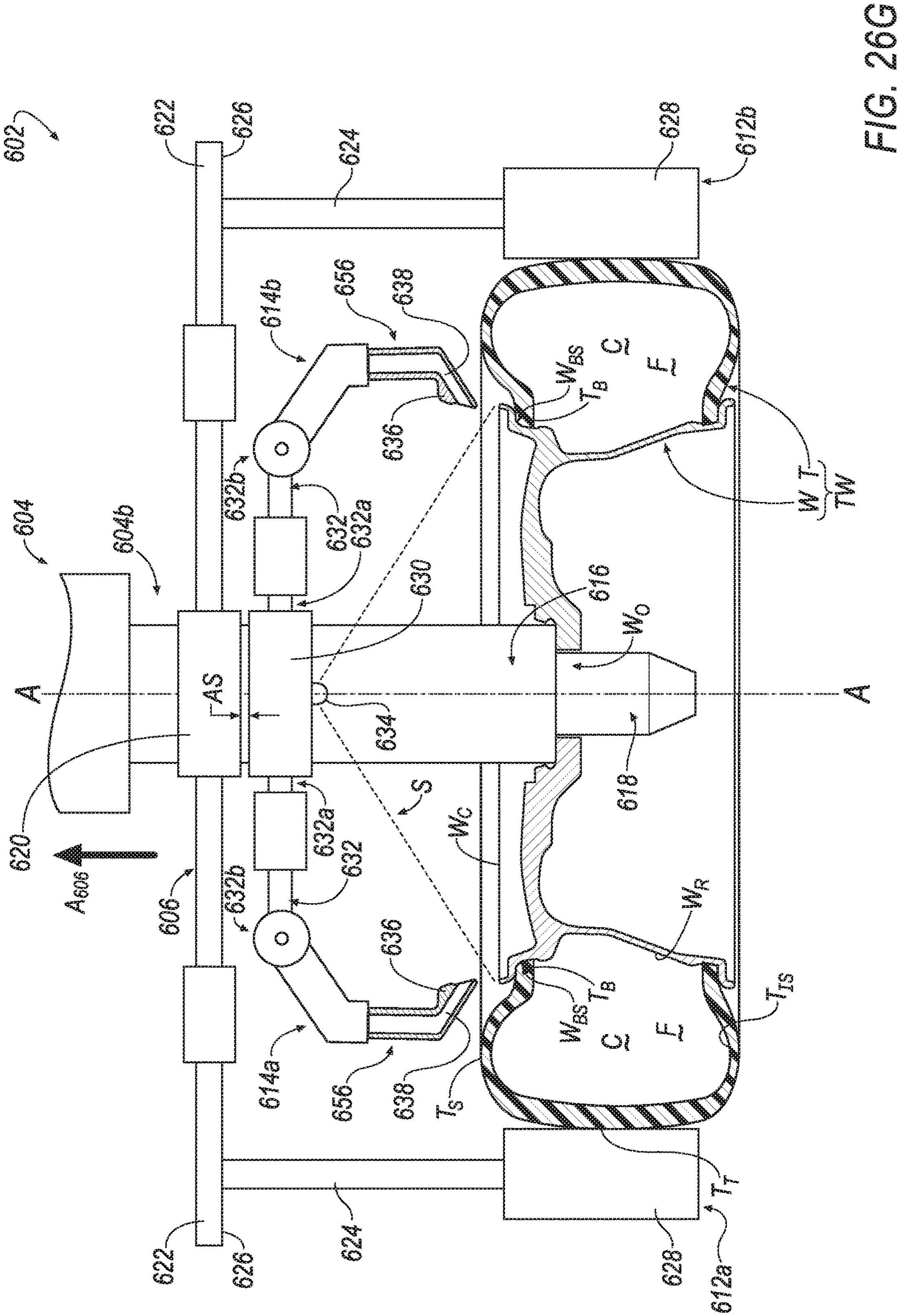

Referring to FIG. 26G, movement of the fluid, F, through the conduits 638, 640 may be ceased. Further, as a result of the reduction of the axial spacing, AS, between the retaining apparatus base member 620 and the inflation apparatus base member 630 by retracting the inflation apparatus base member 630 toward the retaining apparatus base member 620, the distal end portion 656 of the first and second inflation probes 614*a*, 614*b* may no longer be located adjacent/proximate at least a portion of the sidewall, $T_S$, of the tire, T, such that the bead, $T_B$, of the tire, T, may be permitted to be located adjacent/become seated within the bead seat, $W_{BS}$, of the wheel, W; accordingly, it may be said that the tire-wheel assembly, TW, shown in FIG. 26G is inflated. Once the tire-wheel assembly, TW, has been inflated, one or more of the motor 608 and controller 610 may cause the robotic arm 604 to withdrawal the end effecter 606 according to the direction of the arrow, $A_{606}$, such that the end effecter 606 may, for example, transport the tire-wheel assembly, TW, to another processing station associated with the plant layout 30.

Figure 28:
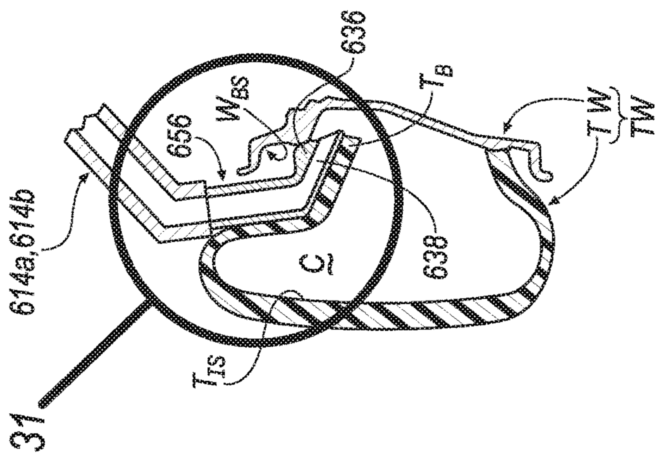
FIG. 28 is an enlarged cross-sectional view according to line 28 of FIG. 26D.
Figure 27:
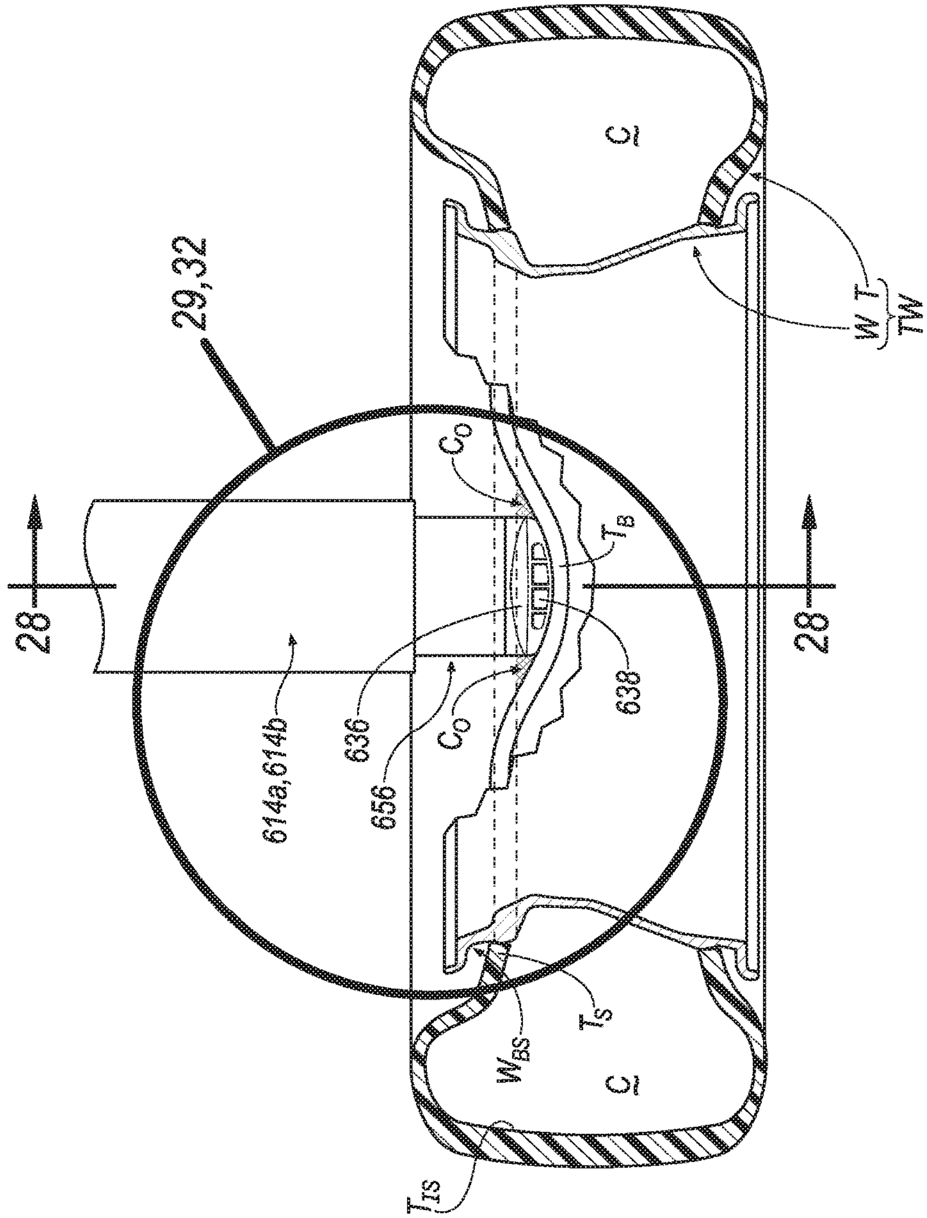
FIG. 27 is a partial cross-sectional view according to arrow 27 of FIG. 26D.

Referring to FIG. 27, a side elevational view referenced from arrow 27 of FIG. 26D is shown according to an implementation. Referring to FIG. 28, a partial, enlarged cross-sectional view of FIG. 26D is shown in reference to line 28 of FIG. 26D and cross-sectional line 28-28 of FIG. 27.

As seen in FIGS. 26D and 28, it would appear (in view of the illustrated cross-sectional views) that the upper lip 636 of each of the first and second inflation probes 614*a*, 614*b* sealingly-contact a portion of the wheel, W, proximate the bead seat, $W_{BS}$; however, as seen in the view of FIG. 27, the arrangement of the distal end portion 656 of the first and second inflation probes 614*a*, 614*b* relative the tire, T, and wheel, W, may result in a pair of access openings, $C_O$, to the cavity, C. Accordingly, in view of the structural configuration/geometry of the distal end portion 656 of the first and second inflation probes 614*a*, 614*b*, it may be said that the upper lip 636 may not entirely seal-off the cavity, C, from atmosphere. Thus, as a result of the pair of access openings, $C_O$, to the cavity, C, the fluid, F, may be permitted to escape from the cavity, C, during the inflation operation; if the fluid, F, is permitted to escape as described above, a period of time to fill the cavity, C, may be undesirably increased and/or the cavity, C, may not be adequately filled with fluid, F, as a result of some of the fluid, F, escaping the cavity, C.

Figure 30:
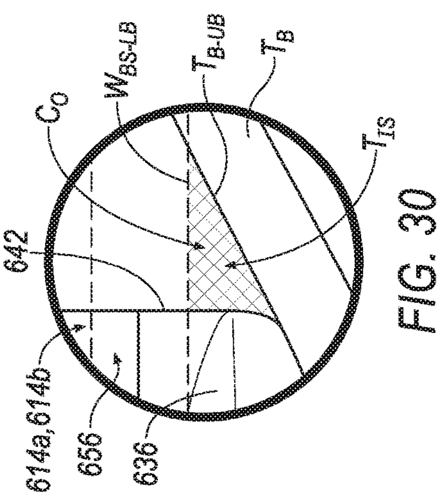
FIG. 30 is an enlarged view according to line 30 of FIG. 29.
Figure 29:
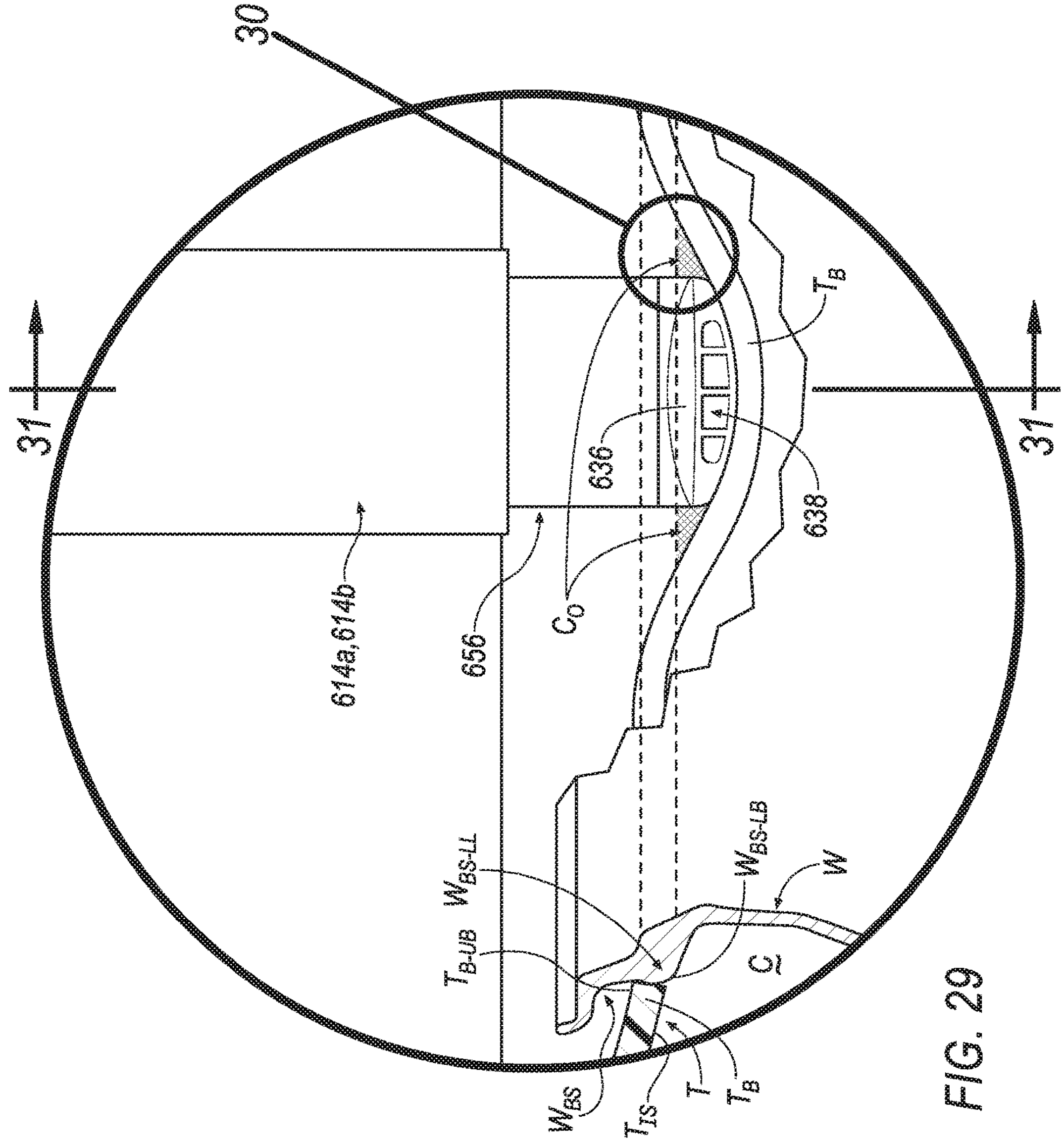
FIG. 29 is an exemplary enlarged partial cross-sectional view according line 29 of FIG. 27.

Referring to FIG. 29, an enlarged view referenced from line 29, 32 of FIG. 27 is shown. Referring to FIG. 30, an enlarged view of a portion of FIG. 29 is shown that focuses on one of the access openings, $C_O$, to the cavity, C.

As seen in FIGS. 29-30, the access opening, $C_O$, generally appears to be illustrated to include a hashed or "checkerboard" pattern; however, the hashed or checkerboard pattern is not in reference to a cross-sectional view, but, rather, is in reference to a view of a portion of the inner surface, $T_{IS}$, of the tire, T, opposite that of the tread surface, $T_T$, so as to differentiate an example of a geometry of the access opening, $C_O$, formed by/relative to the tire, T, and wheel, W. Referring to FIG. 30, the access opening, $C_O$, may be generally formed by a side surface 642 of the distal end portion 656 of the inflation probe 614*a*, 614*b*, a lower body surface portion, $W_{BS\text{-}LB}$, of a lower lip, $W_{BS\text{-}LL}$, forming the bead seat, $W_{BS}$, and an upper body surface portion, $T_{B\text{-}UB}$, of the bead, $T_B$, of the tire, T.

Figure 31:
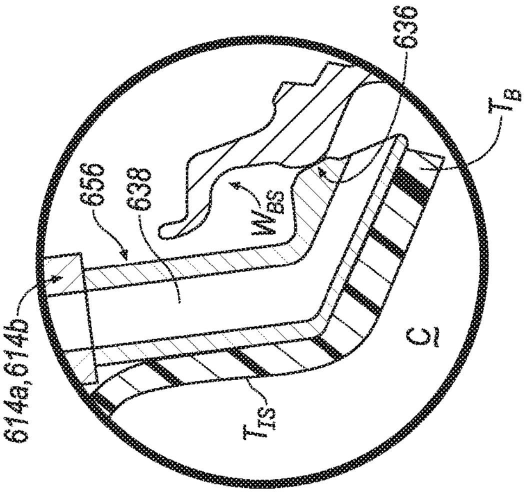
FIG. 31 is an enlarged cross-sectional view according to line 31 of FIG. 28 and line 31-31 of FIG. 29.
Figures 32, 33, 34:
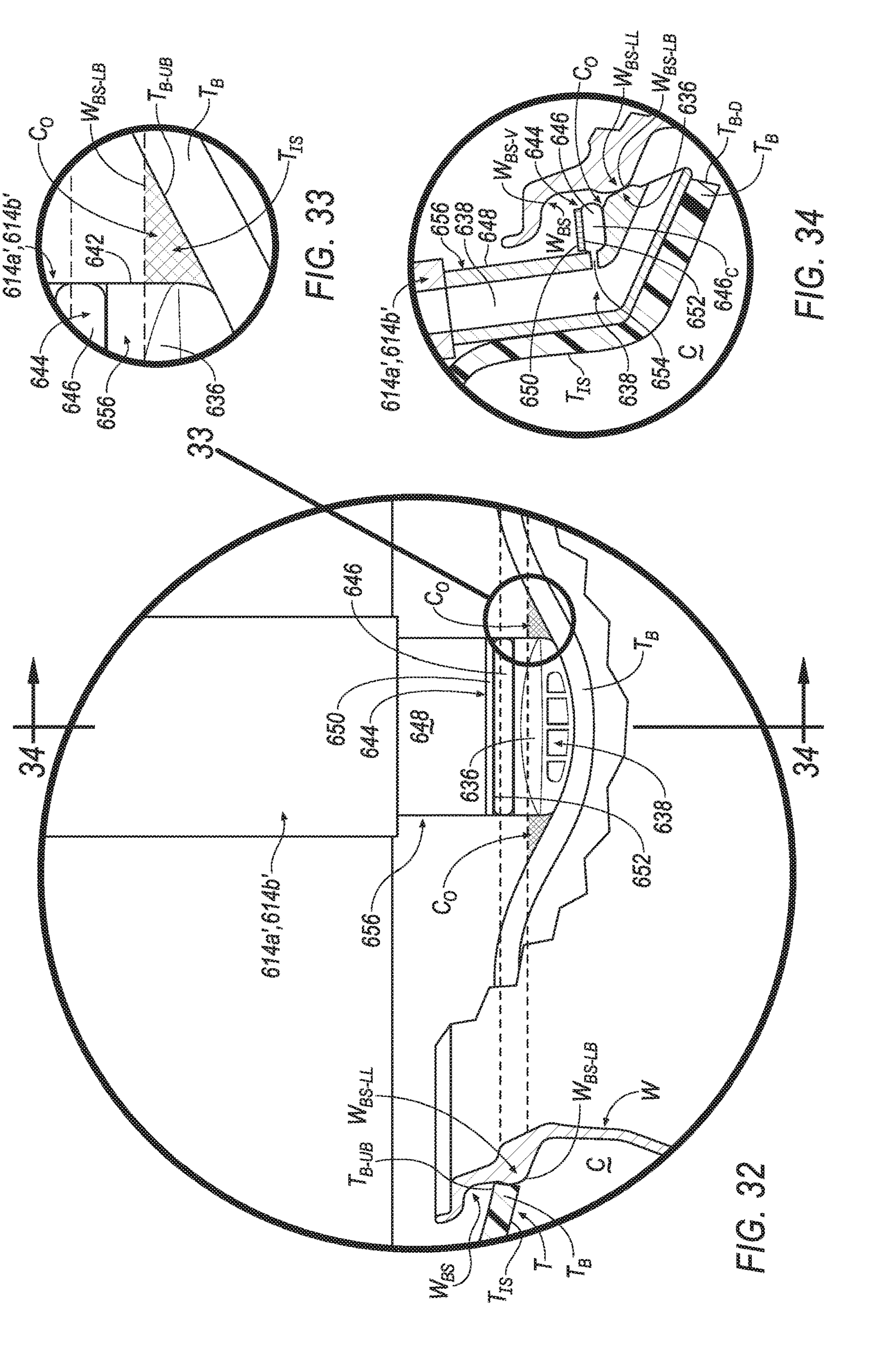
FIG. 32 is an alternative, enlarged partial cross-sectional view referenced from line 32 of FIG. 27.
FIG. 33 is an enlarged view according to line 33 of FIG. 32.
FIG. 34 is an enlarged cross-sectional view according to line 34-34 of FIG. 32.
Figure 35:
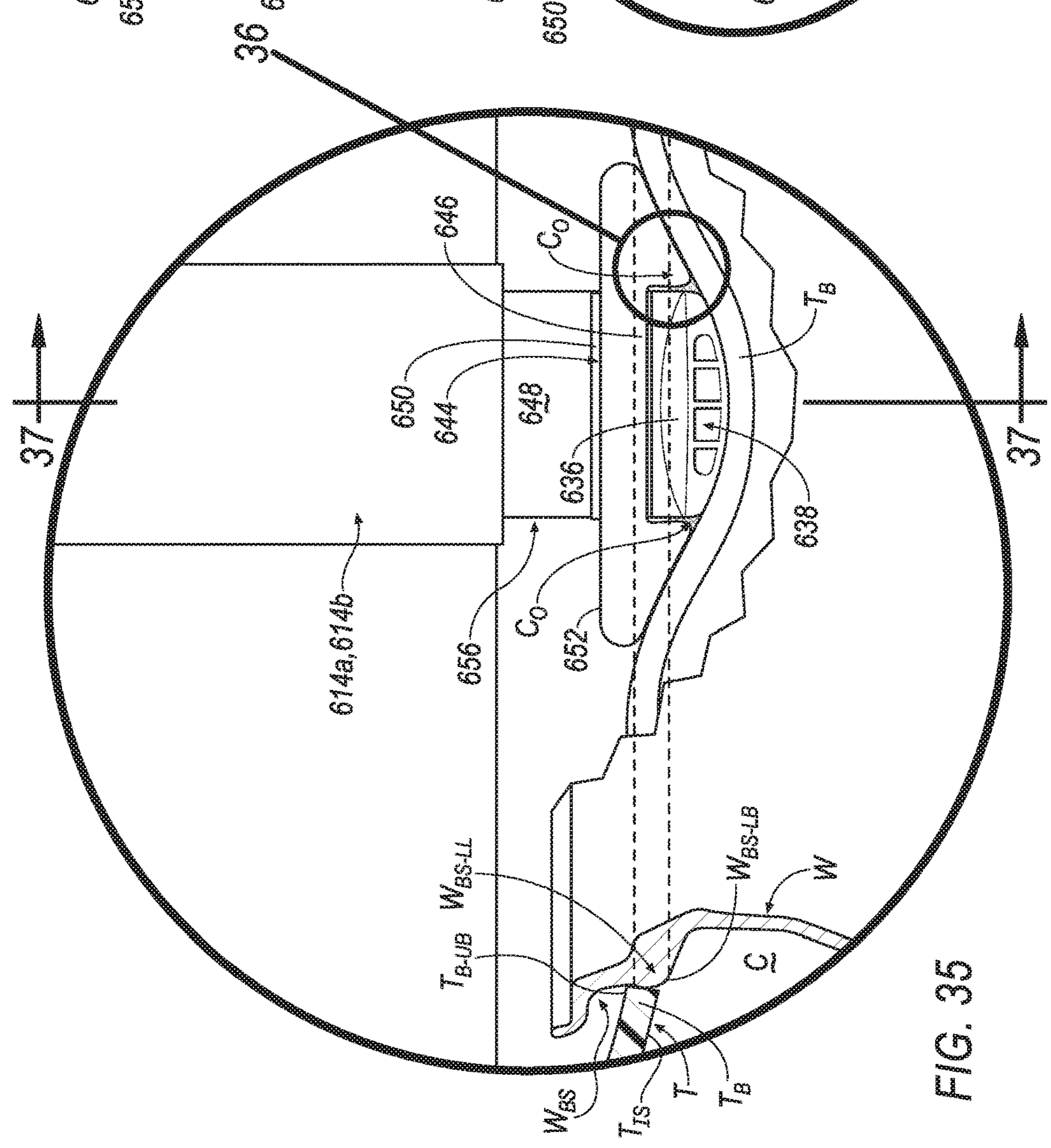
FIG. 35 is another exemplary enlarged partial cross-sectional view according line 32 of FIG. 27.

Referring to FIGS. 32-34, an alternative embodiment of a structural configuration/geometry of the distal end portion 656 of the first and second inflation probes 614*a*, 614*b* of FIGS. 29-31 is shown generally at 614*a*', 614*b*' according to an implementation. The first and second inflation probes 614*a*', 614*b*' are substantially similar to the first and second inflation probes 614*a*, 614*b* with the exception that the distal end portion 656 of the first and second inflation probes 614*a*', 614*b*' of FIGS. 32-34 include an access opening close-out device 644. The access opening close-out device 644 is also shown in FIGS. 35-37; however, the access opening close-out device 644 is shown in a stowed orientation in FIGS. 32-34 whereas the access opening close-out device 644 is shown in a deployed orientation in FIGS. 35-37.

Figure 36:
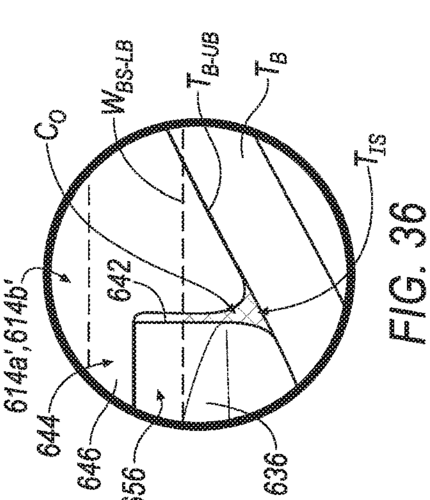
FIG. 36 is an enlarged view according to line 36 of FIG. 35.
Figure 37:
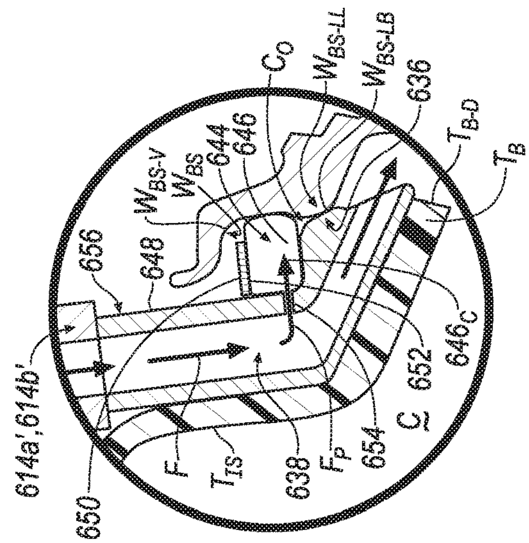
FIG. 37 is an enlarged cross-sectional view according to line 37-37 of FIG. 35.

As seen in FIGS. 32-37, the access opening close-out device 644 generally includes an inflatable bladder 646 that is connected to the distal end portion 656 of the inflation probe 614*a*', 614*b*'. When the inflatable bladder 646 is in a stowed orientation (see, e.g., FIG. 34), the access opening, $C_O$, may remain un-obscured (see, e.g., FIG. 33), and, conversely, when the inflatable bladder 646 is in a deployed orientation (see, e.g., FIG. 37), the access opening, $C_O$, may be at least partially obscured or at least partially "closed-out" (see, e.g., FIG. 36) by the inflatable bladder 646 such that the inflatable bladder 646 may be disposed proximate or substantially adjacent one or more of the side surface 642, the lower body surface portion, $W_{BS\text{-}LB}$, and the upper body surface portion, $T_{B\text{-}UB}$, in order to at least partially seal/close-out/obscure the access opening, $C_O$, in order to inhibit or prevent the fluid, F, to escape to atmosphere. In some implementations, when the inflatable bladder 646 is arranged in a deployed orientation, approximately 100% of the access opening, $C_O$, may be sealed-off; however, in some implementations, as seen in FIG. 36, for example, more than 0% of the access opening, $C_O$, may be obscured or at least partially sealed-off (e.g., the illustrated implementation of FIG. 36 shows the inflatable bladder 646 obscuring approximately 65% of the access opening, $C_O$).

In an implementation, the inflatable bladder 646 may be arranged upon an exterior surface 648 of the distal end portion 656 of the inflation probe 614*a*', 614*b*'. In some implementations, the inflatable bladder 646 may be disposed upon a portion of the exterior surface 648 that forms at least a portion of the upper lip 636 of the inflation probe 614*a*', 614*b*'.

The inflatable bladder 646 may be arranged upon the upper lip 636 of the inflation probe 614*a*' 614*b*' such that when the inflation probe 614*a*', 614*b*' is arranged in a substantially similar orientation as seen, for example, in FIG. 26D, the inflation bladder 646 may be located in an orientation that is proximate and/or substantially opposite a portion of the bead seat, $W_{BS}$, of the wheel, W, such as, for example, the lower lip, $W_{BS\text{-}LL}$, of the bead seat, $W_{BS}$. Accordingly, when the inflatable bladder 646 is arranged to be in the deployed orientation, at least a portion of the inflatable bladder 646 may be disposed adjacent at least a portion of the lower lip, $W_{BS\text{-}LL}$, of the bead seat, $W_{BS}$.

In some implementations, the access opening close-out device 644 may include a substantially rigid guide flange 650. The substantially rigid guide flange 650 may be connected to or located proximate/adjacent a portion of an exterior surface 652 of the inflatable bladder 646. The substantially rigid guide flange 650 may assist in directing the inflatable bladder 646 (e.g., in a substantially radial direction) toward one or more of the lower body surface portion $W_{BS\text{-}LB}$, and the upper body surface portion, $T_{B\text{-}UB}$. By directing the inflatable bladder 646 toward one or more of the lower body surface portion, $W_{BS\text{-}LB}$, and the upper body surface portion, $T_{B\text{-}UB}$, the substantially rigid guide flange 650 may preferably inhibit the inflatable bladder 646 from being undesirably-projecting toward a valley portion, $W_{BS\text{-}V}$ (see, e.g., FIGS. 34, 37), of the bead seat, $W_{BS}$, that receives a distal end, $T_{B\text{-}D}$ (see, e.g., FIGS. 34, 37), of the bead, $T_B$, of the tire, T; rather, the substantially rigid guide flange 650 preferably directs the inflatable bladder 646 toward the lower body portion, $W_{BS-LB}$, of the bead seat, $W_{BS}$, in order to maintain the desired affect of at least partially sealing-off the access opening, $C_O$.

The inflatable bladder 646 may be arranged in the expanded orientation via any desirable methodology. For example, referring to FIGS. 34 and 37, in some implementations, a cavity $646_C$ of the inflatable bladder 646 may be in fluid communication with the probe fluid conduit 638 by way of a probe fluid channel 654; accordingly, upon commencement of the inflation operation, a portion, $F_P$ (see, e.g., FIG. 37), of the fluid, F, may be diverted to the cavity $646_C$ of the inflatable bladder 646 by way of the probe fluid channel 654. Although some implementations may include the above structure/methodology for expanding the inflatable bladder 646, the inflatable bladder 646 may be expanded independently of the fluid, F, such as, for example, by way of a hose or other independent conduit (not shown) that is in fluid communication with the cavity $646_C$ of the inflatable bladder 646.

Figure 39:
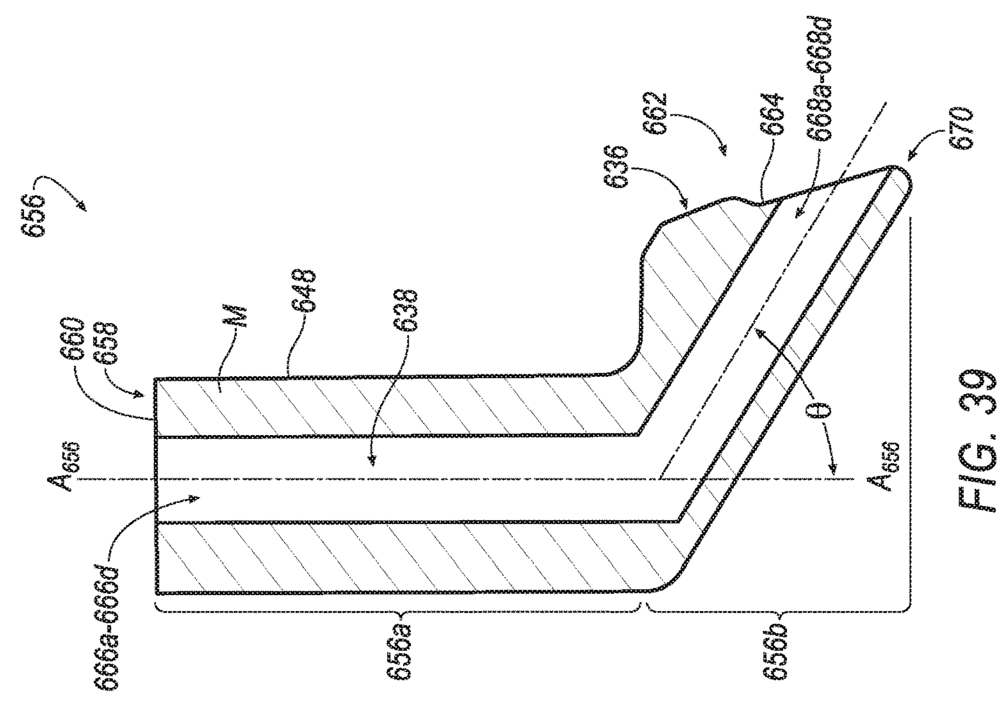
FIG. 39 is a cross-sectional view of the distal end portion according to line 39-39 of FIG. 38.
Figure 38:
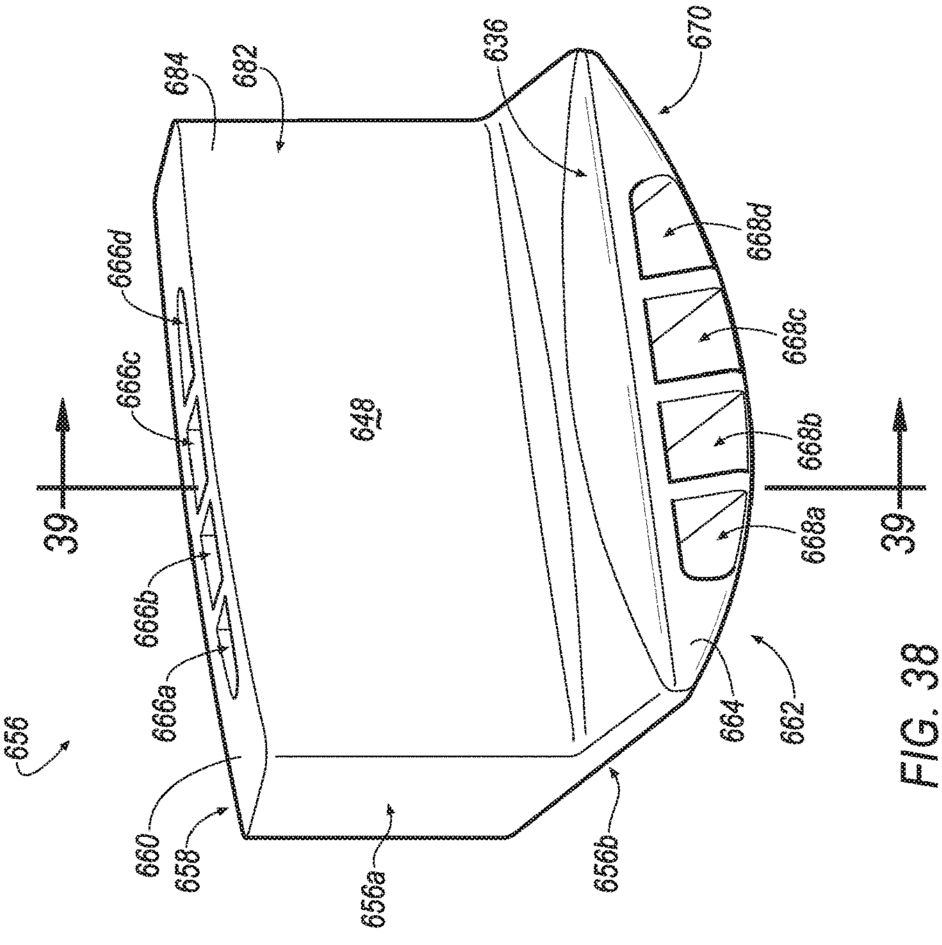
FIG. 38 is a perspective view of an exemplary distal end portion of an inflation probe.

Referring to FIGS. 38-39, the distal end portion 656 of the inflation probe 614*a*, 614*b*, 614*a*', 614*b*' is shown according to an implementation. The distal end portion 656 may be formed from any desirable material, M, such as, for example, a plastic resin, metal or the like. In an implementation, the distal end portion 656 is formed from one material, M, such as for example, urethane resin.

The distal end portion 656 generally includes a first body portion 656*a* and a second body portion 656*b*. The first body portion 656*a* may be referred to as an axial body portion, extending along an axis $A_{656}$-$A_{656}$, and, the second body portion 656*b* may be referred to as an angular body portion that angularly deviates from the first body portion 656*a* at an angle, θ.

The first body portion 656*a* may form a fluid inlet end 658 having formed by a first end surface 660 and a fluid outlet end 662 formed by a second end surface 664. The fluid, F, may flow from the primary fluid conduit 640 and into the probe fluid conduit 638 by way of one or more fluid inlet openings 666*a*-666*d* formed in the first end surface 660, and, the fluid, F, may flow out of the probe fluid conduit 638 by way of one or more fluid outlet openings 668*a*-668*d* formed in second end surface 664. In some implementations, the probe fluid conduit 638 may form one conduit that is in fluid communication with each of the inlet and outlet openings 666*a*-666*d*, 668*a*-668*d*. Alternatively, in some implementations, the probe fluid conduit 638 may form more than one conduit that are each respectively associated with a corresponding pair of inlet and outlet openings 666*a*-666*d*, 668*a*-668*d*; for example, the probe fluid conduit 638 may include four probe fluid conduits 638 that are each correspondingly associated with the inlet and outlet opening pairs 666*a*/668*a*, 666*b*/668*b*, 666*c*/668*c* and 666*d*/668*d*.

Figure 41:
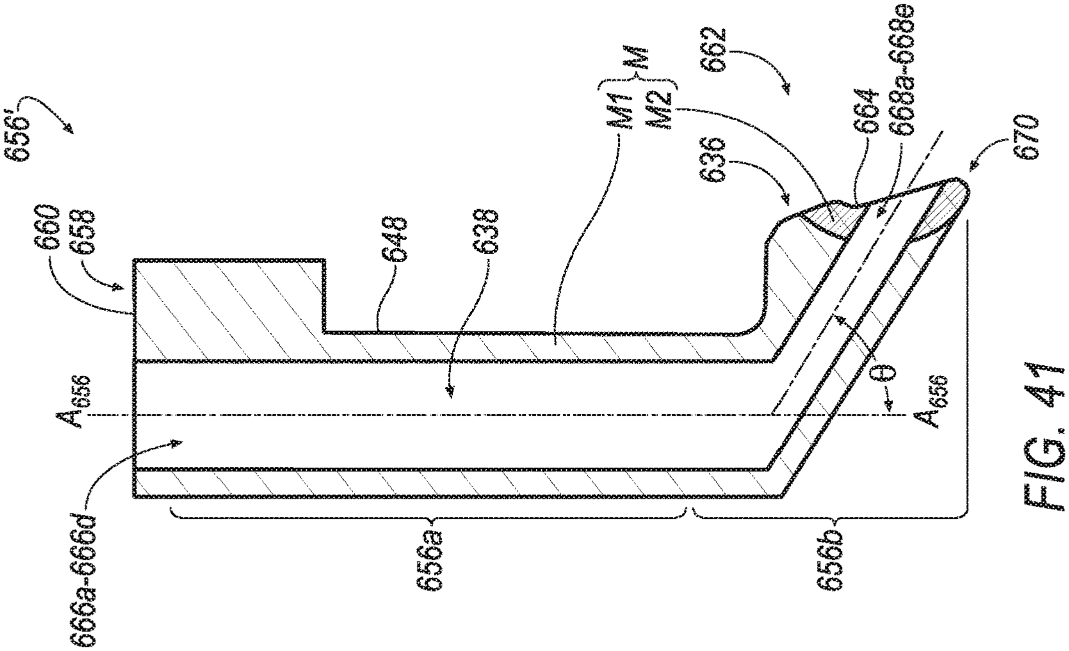
FIG. 41 is a cross-sectional view of the distal end portion according to line 41-41 of FIG. 40.
Figure 40:
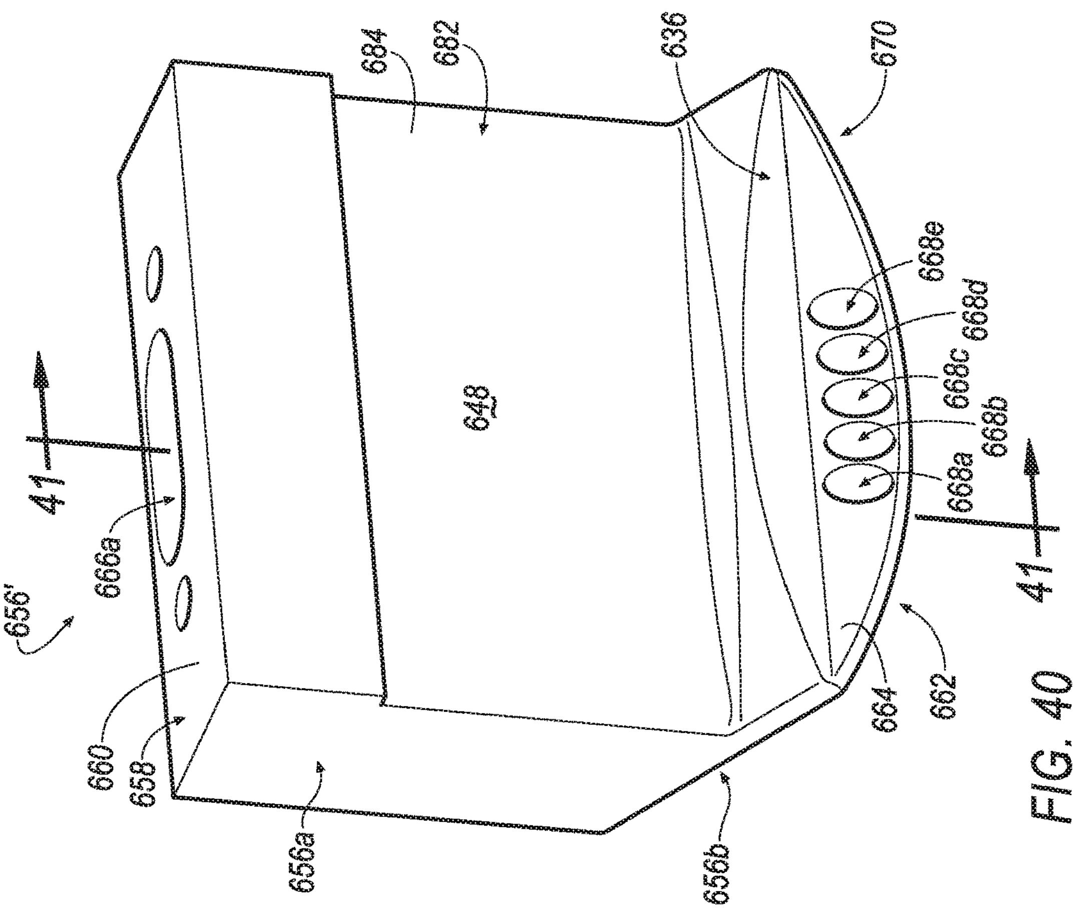
FIG. 40 is a perspective view of an exemplary distal end portion of an inflation probe.

Referring to FIGS. 40-41, an alternative distal end portion 656' of the inflation probe 614*a*, 614*b*, 614*a*', 614*b*' is shown according to an implementation. The distal end portion 656' may be formed from any desirable material such as, for example, a plastic resin, metal or the like. Because the distal end portion 656' is substantially similar to the distal end portion 656, reference numerals are repeated in FIGS. 40-41 and not described in further detail here for the purposes of reducing redundancies. Structurally, however, it is recognized that the implementation of the distal end portion 656' includes one inlet opening 666*a* rather than four inlet openings 666*a*-666*d*, and, the distal end portion 656' includes five outlet openings 668*a*-668*e* rather than four outlet openings 668*a*-668*d*.

In an implementation, the distal end portion 656' may be further distinguished from the distal end portion 656 in that the distal end portion 656' is formed from more than one material, M, such as, for example, a first material, M1, and a second material, M2. In an implementation, the first material, M1, may include a first type of urethane resin whereas the second material, M2, may include a second type of urethane resin. Because the distal end portion 656' may be formed from two different types of material, M1, M2, the distal end portion 656' may be formed, for example, in a "two shot" injection molding operation; alternatively, the materials, M1, M2, may be formed separately and later attached to one another.

In an implementation, the first material, M1, may include a first hardness characteristic whereas the second material, M2, may include a second hardness characteristic. The hardness characteristics may be described in units, such as, for example, hardness units (e.g., a "Shore durometer," which may alternative be referred to as a "durometer"). A durometer unit may be classified in one of two scales that are commonly referred to as a "type A" scale (e.g., a soft plastic) and a "type D" scale (e.g., a hard plastic). Although two durometer scales are mentioned here, it is known that other durometer scales also exist and many include, for example, the following scales: A, B, C, D, DO, E, M, O, OO, OOO, OOO-S and R. Further, each scale may include a value ranging between "0" and "100" with higher values corresponding to a harder characteristic.

In an implementation, the first material, M1, may include, for example, a durometer hardness of approximately D-60 whereas the second material, M2, may include, for example, a durometer hardness of approximately A-60. Accordingly, in an implementation, the first material, M1, may include a harder characteristic than that of the second material, M2 (i.e., the second material, M2, may have a hardness characteristic that is less than that of the first material, M1, /the second material, M2, may be said to be "softer" than that of the first material, M1).

Referring to FIG. 41, the softer second material, M2, may comprise at least a portion of the second end surface 664. The second end surface 664 may form the upper lip 636 and a lower lip 670; in combination, the upper lip 636 and the lower lip 670 may form a "mouth" that may be defined by the one or more outlet openings 668*a*-668*e*; in some implementations, the second material, M2, may compose a portion of the upper lip 636 and a portion of the lower lip 670 such that the second material, M2, forms the mouth that creates the one or more outlet openings 668*a*-668*e* to increase the sealability of the distal end portion 656' over that of the distal end portion 656. In some implementations, as seen in FIG. 41, for example, the second material, M2, may form at least a portion of each of the upper lip 636 and the lower lip 670 such that the second material, M2, may form substantially all of the lower lip 670 while forming approximately half of the upper lip 636.

The second material, M2, may serve one or more purposes in association with the operation of the inflation probe 614*a*, 614*b*, 614*a*', 614*b*'. For example, because the second material, M2, is relatively soft, the second material, M2, may be dynamically shaped in a manner so as to conform to anything that the second end surface 664 may come into contact with such as, for example, one or more of the wheel, W, and tire, T; by being able to conform to a portion of one or more of the wheel, W, and the tire, T, the second material, M2, may promote an increased sealability of the distal end portion 656' over that of the distal end portion 656. Further, because the second material, M2, may be soft, the second material, M2, may be inhibited from imparting damage to, for example, the lower body portion, $W_{BS-LB}$, of the bead seat, $W_{BS}$, of the wheel, W, whereas a relatively harder material that may form the distal end portion 656 may otherwise more easily impart damage to the lower body portion, $W_{BS-LB}$, of the bead seat, $W_{BS}$, of the wheel, W.

Figure 42:
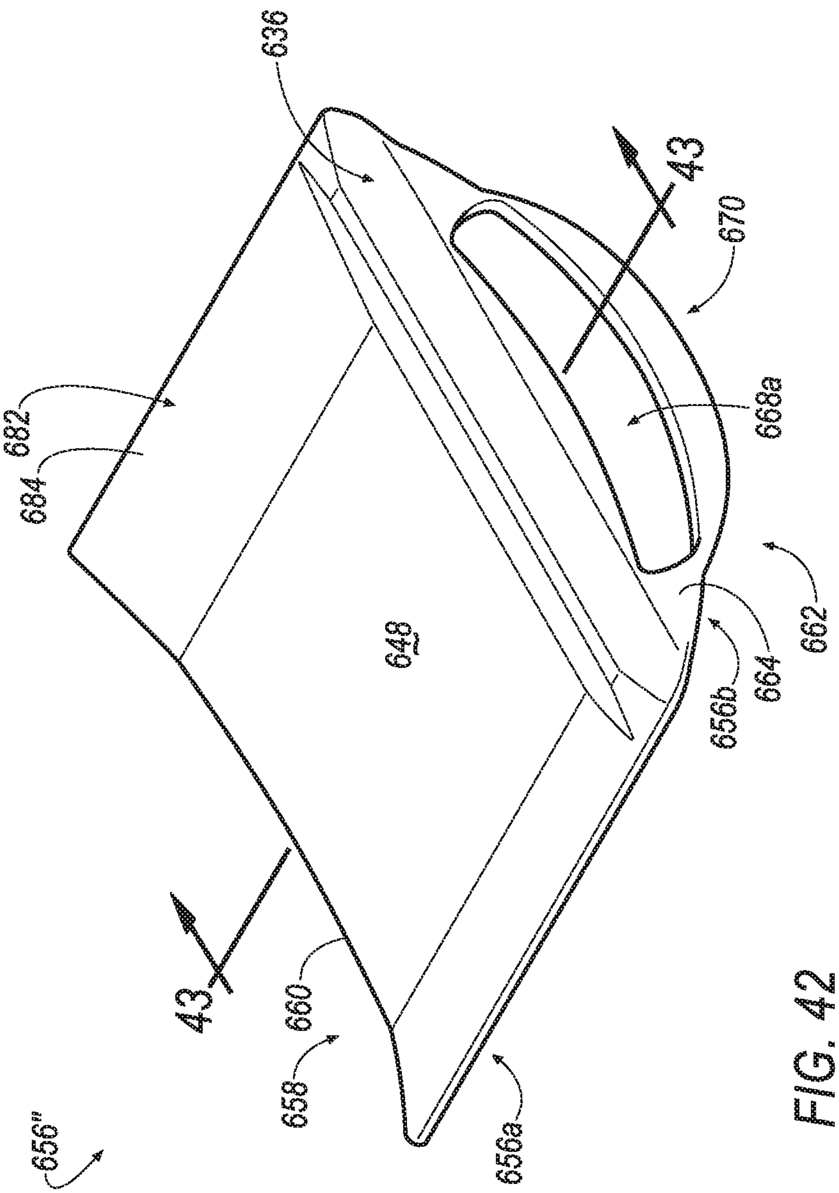
FIG. 42 is a perspective view of an exemplary distal end portion of an inflation probe.
Figure 43B:
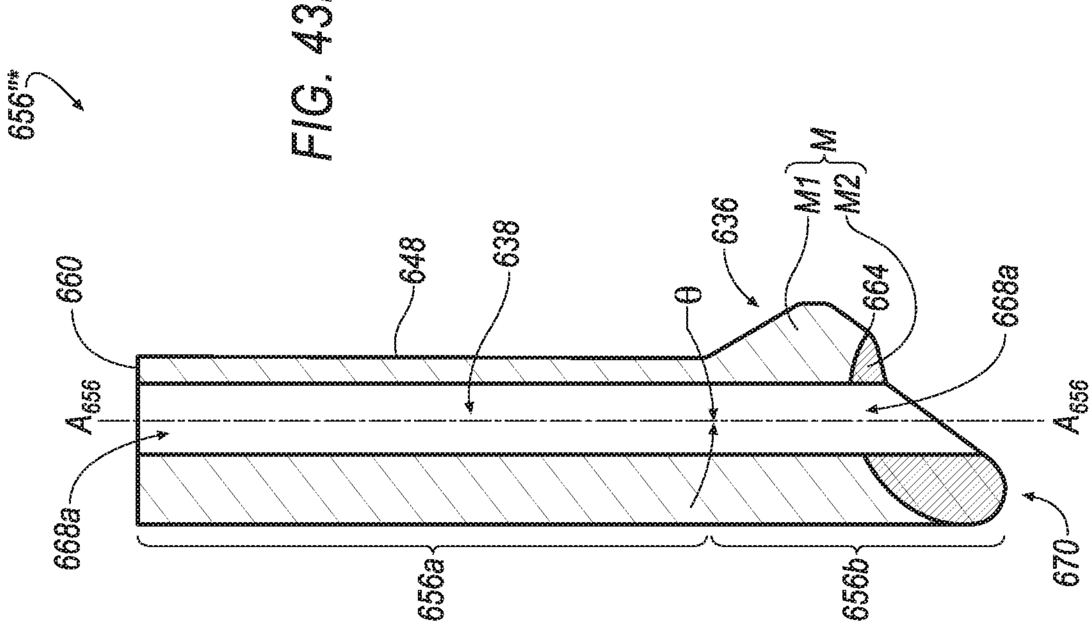
FIG. 43B is an exemplary cross-sectional view of the distal end portion according to line 43-43 of FIG. 42.
Figure 43A:
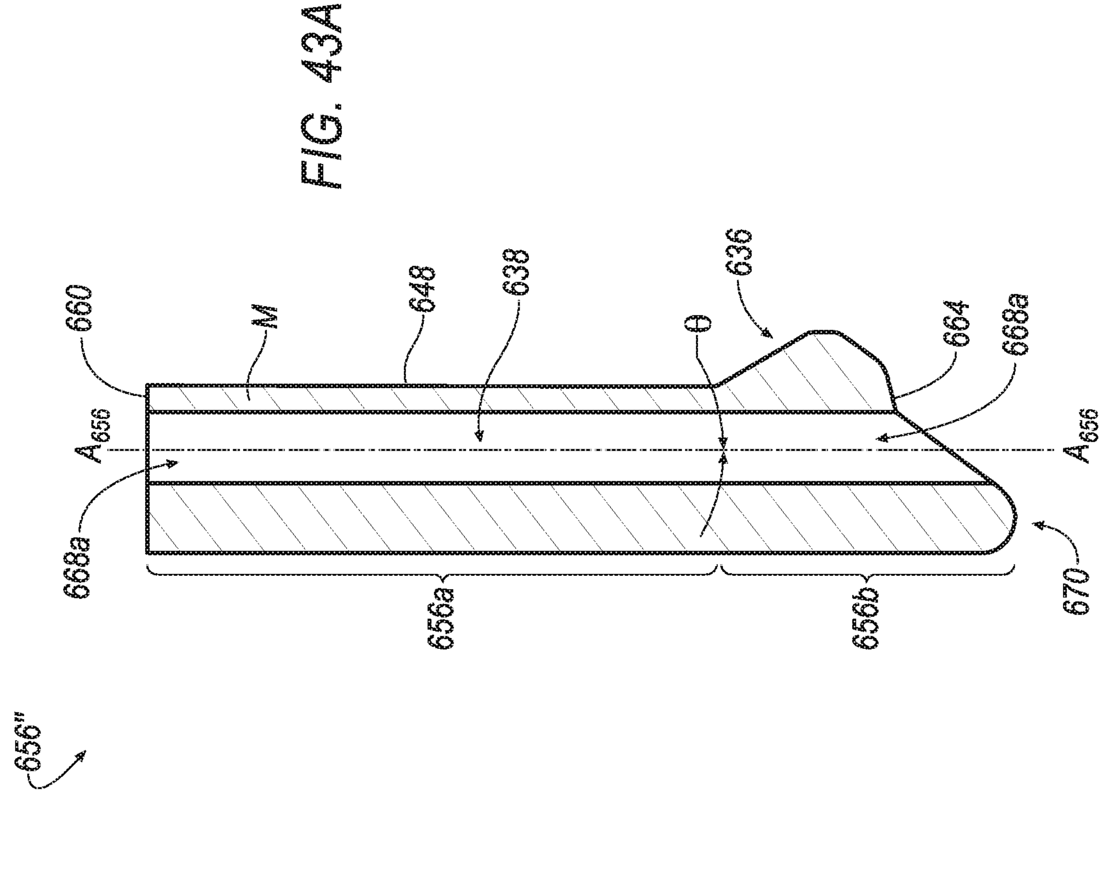
FIG. 43A is an exemplary cross-sectional view of the distal end portion according to line 43-43 of FIG. 42.

Referring to FIGS. 42-43A, an alternative distal end portion 656" of the inflation probe 614*a*, 614*b*, 614*a'*, 614*b'* is shown according to an implementation. The distal end portion 656" may be formed from any desirable material such as, for example, a plastic resin, metal or the like. Because the distal end portion 656" is substantially similar to the distal end portion 656, reference numerals are repeated in FIGS. 42-43A and not described in further detail here for the purposes of reducing redundancies. Structurally, however, it is recognized that the implementation of the distal end portion 656" includes one inlet opening 666*a* rather than four inlet openings 666*a*-666*d*, and, the distal end portion 656" includes one outlet opening 668*a* rather than four outlet openings 668*a*-668*d*.

Further, referring to FIG. 43A, the second body portion 656*b* may not be referred to as an "angular" second body portion because the second body portion 656*b* does not angularly deviate from the first body portion 656*a*; accordingly, for illustrative purposes, the angle, θ, is represented for illustrative purposes only in order to show that the angle, θ, is approximately $0^0$. In an alternative implement as seen in FIG. 43B, a distal end portion 656"* is substantially similar to that of the distal end portion 656" with the exception that the distal end portion 6565"* is further distinguished in a manner that includes more than one material, M, such as, for example, a first material, M1, and a second material, M2. The inclusion of the first and second materials, M1, M2 serves the same purposes as described above and are not described in further detail here for the purpose of reducing redundancies.

Figure 44:
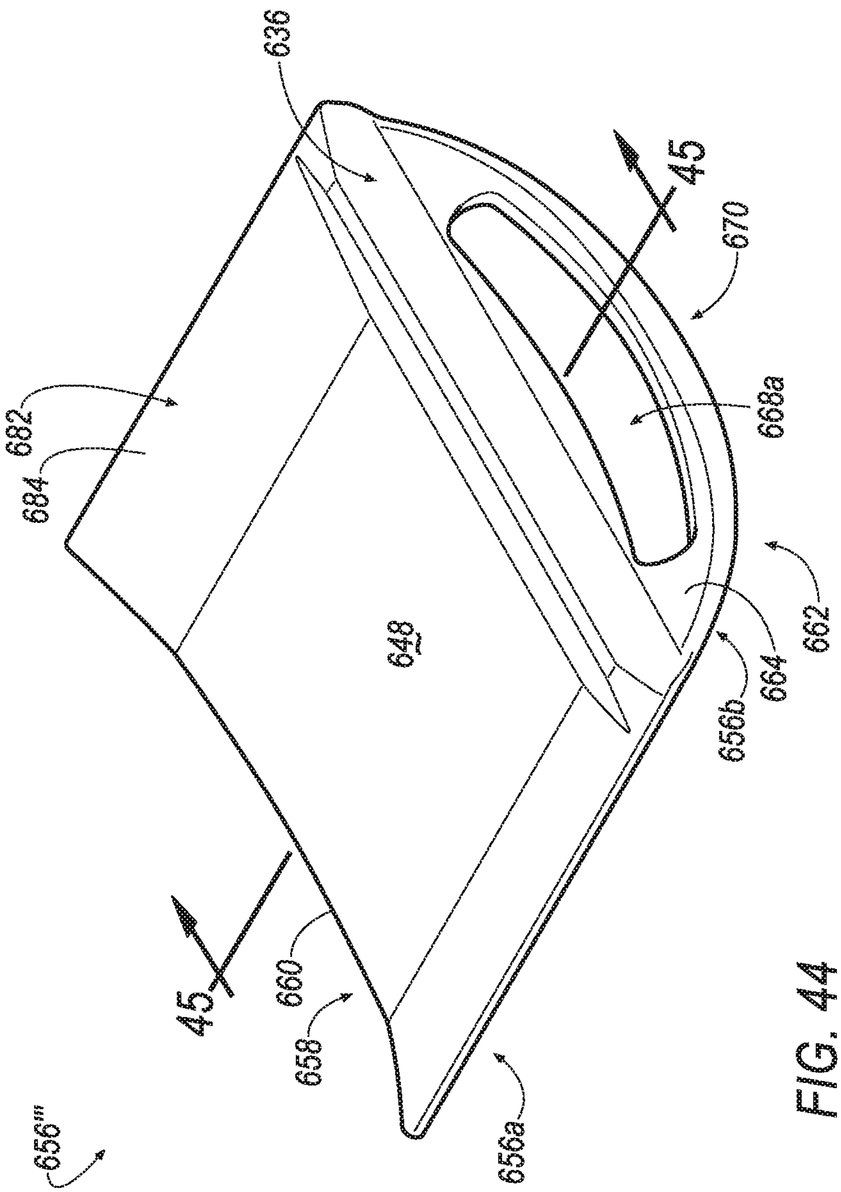
FIG. 44 is a perspective view of an exemplary distal end portion of an inflation probe.
Figure 45B:
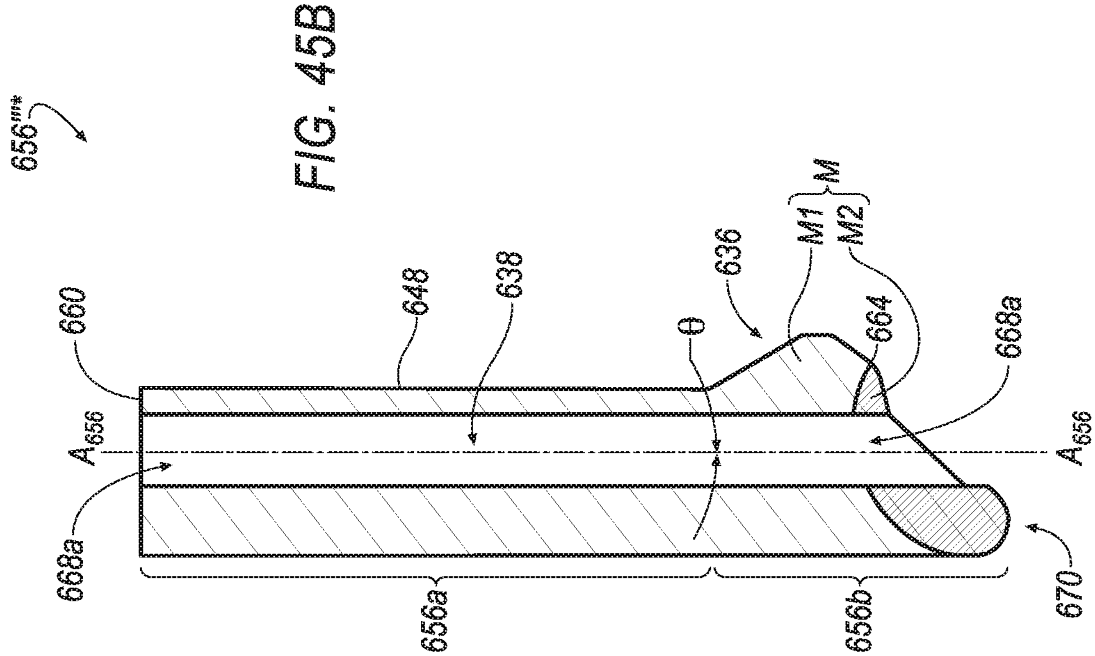
FIG. 45B is an exemplary cross-sectional view of the distal end portion according to line 45-45 of FIG. 44.
Figure 45A:
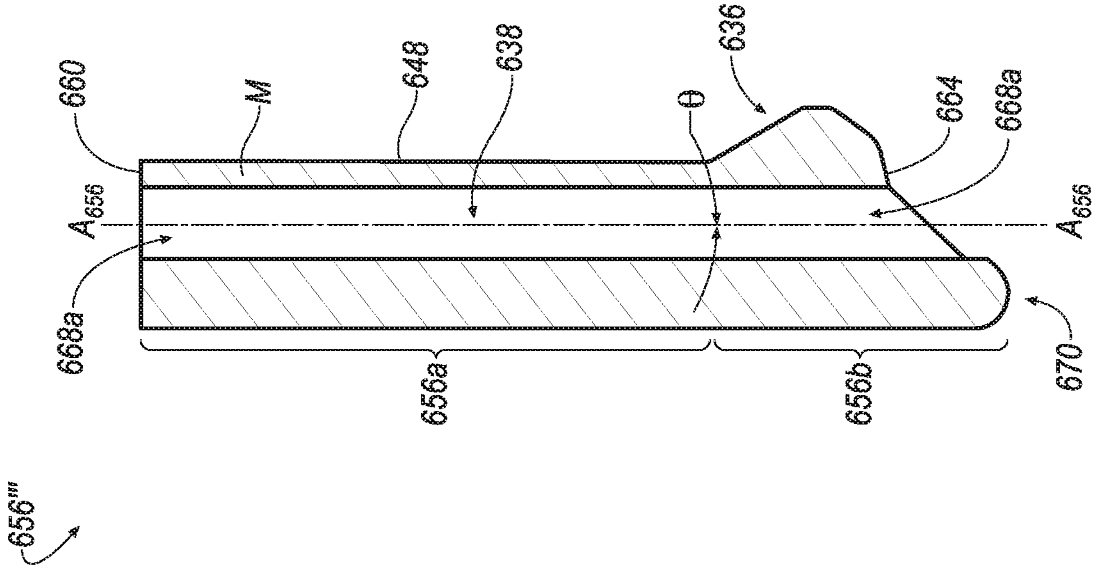
FIG. 45A is an exemplary cross-sectional view of the distal end portion according to line 45-45 of FIG. 44.

Referring to FIGS. 44-45A, an alternative distal end portion 656'" of the inflation probe 614*a*, 614*b*, 614*a'*, 614*b'* is shown according to an implementation. The distal end portion 656'" may be formed from any desirable material such as, for example, a plastic resin, metal or the like. Because the distal end portion 656'" is substantially similar to the distal end portion 656", reference numerals are repeated in FIGS. 44-45A and not described in further detail here for the purposes of reducing redundancies. Structurally, however, it is recognized that the implementation of the distal end portion 656'" is different than that of the distal end portion 656" in that the lower lip 670 of the distal end portion 656'" extends axially beyond that of the lower lip 670 of the distal end portion 656" (see, comparatively, FIGS. 43A and 45A). In an alternative implement as seen in FIG. 45B, a distal end portion 656'"* is substantially similar to that of the distal end portion 656'" with the exception that the distal end portion 6565'"* is further distinguished in a manner that includes more than one material, M, such as, for example, a first material, M1, and a second material, M2. The inclusion of the first and second materials, M1, M2 serves the same purposes as described above and are not described in further detail here for the purpose of reducing redundancies.

Figure 46:
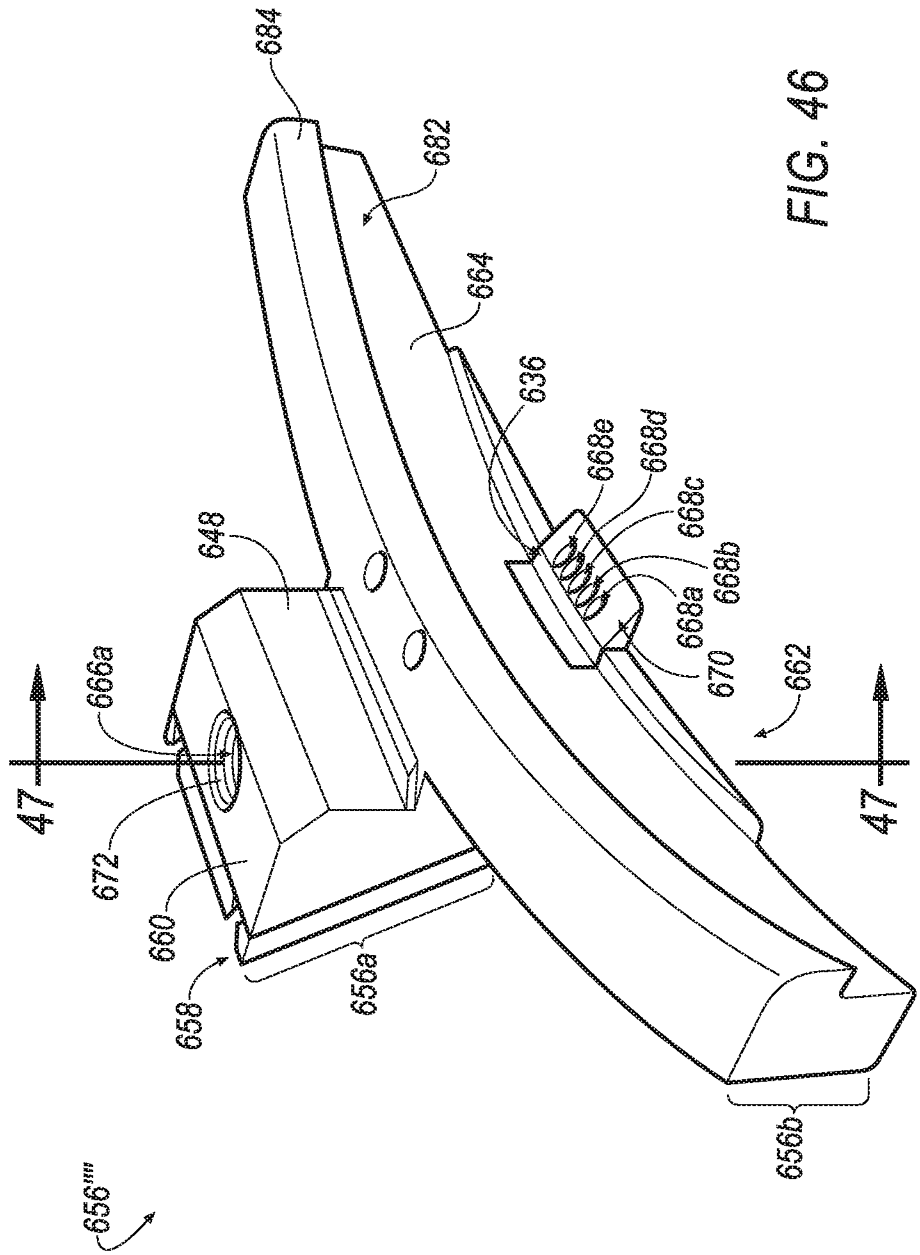
FIG. 46 is a perspective view of an exemplary distal end portion of an inflation probe.
Figure 47B:
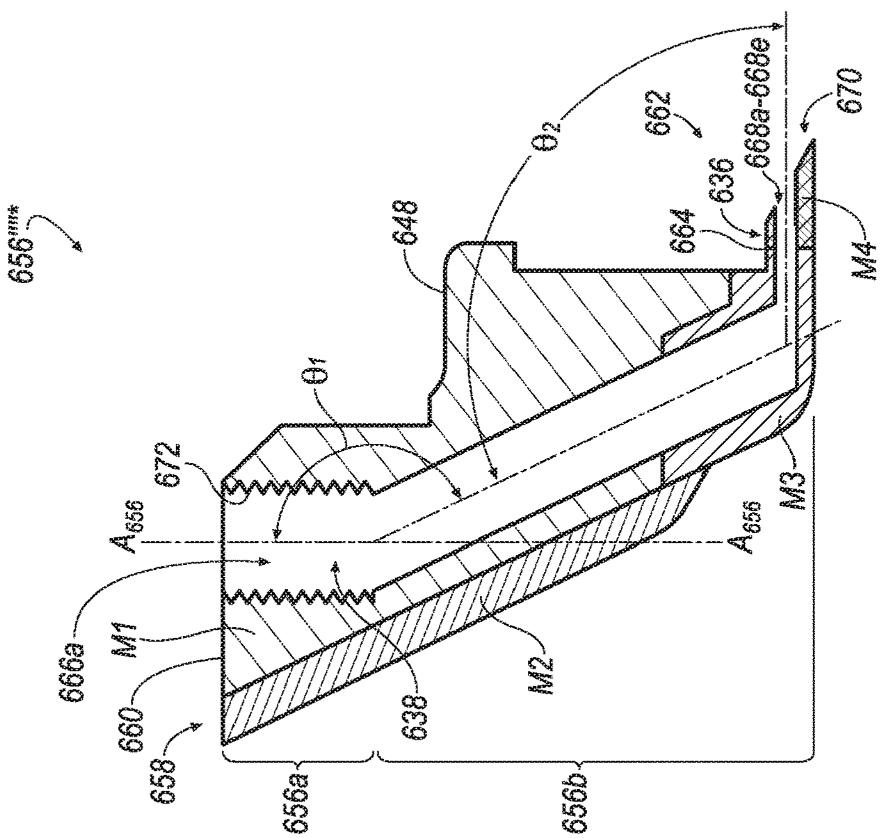
FIG. 47B is an exemplary cross-sectional view of the distal end portion according to line 47-47 of FIG. 46.
Figure 47A:
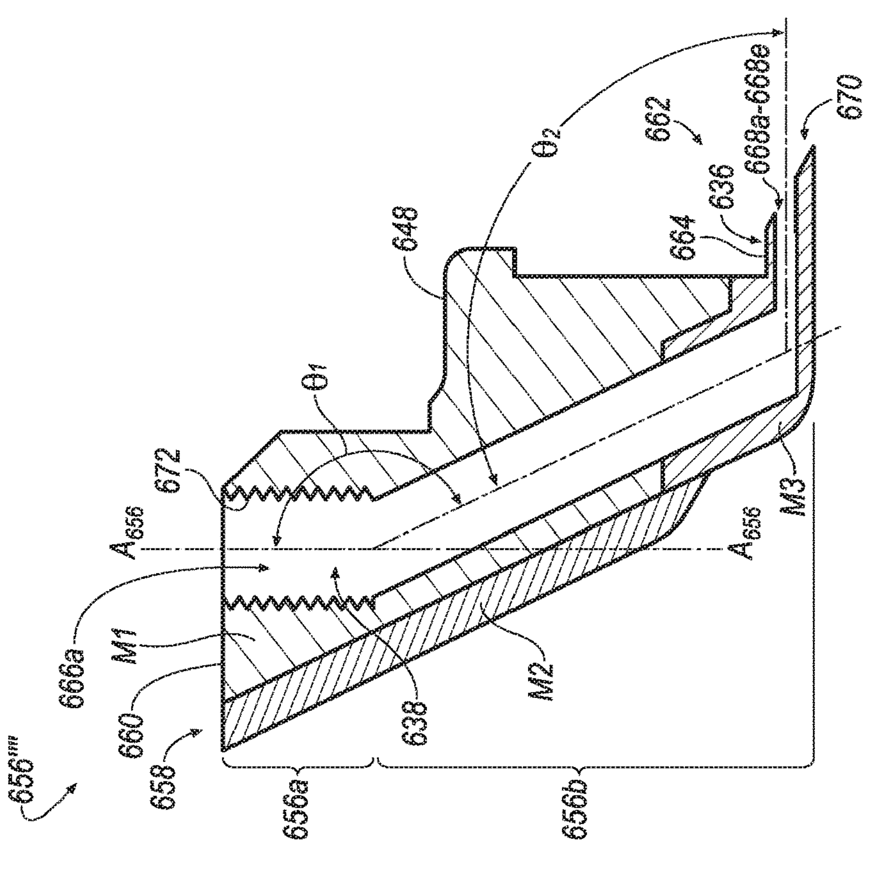
FIG. 47A is an exemplary cross-sectional view of the distal end portion according to line 47-47 of FIG. 46.

Referring to FIGS. 46-47A, an alternative distal end portion 656"" of the inflation probe 614*a*, 614*b*, 614*a'*, 614*b'* is shown according to an implementation. The distal end portion 656"" may be formed from any desirable material such as, for example, a plastic resin, metal or the like. Because the distal end portion 656"" is substantially similar to the distal end portion 656, reference numerals are repeated in FIGS. 46-47A and not described in further detail here for the purposes of reducing redundancies. Structurally, however, it is recognized that the implementation of the distal end portion 656"" is different than that of the distal end portion 656 in that the second body portion 656*b* may be referred to as an angular body portion that angularly deviates from the first body portion 656*a* at first angle, $\theta_1$, and, further, at a second angle, $\theta_2$ (see, e.g., FIG. 47A).

Further, a portion of the probe fluid conduit 638 formed by the first body portion 656*a*, which may be referred to as an axial body portion, that is proximate the fluid inlet end 658 may be formed by an inner threaded surface portion 672. The threaded surface portion 672 may permit a threaded end (not shown) of, for example, a hose (not shown) to be connected to the distal end portion 656"" for supplying the fluid, F, to the distal end portion 656"".

Further, the distal end portion 656"" may be formed from more than one material, such as, for example, a first material, M1, a second material, M2, and a third material, M3. In an implementation, each of the three materials, M1-M3, may include a rigid, metallic material. In an alternative implement as seen in FIG. 47B, a distal end portion 656""* is substantially similar to that of the distal end portions 656"" with the exception that the distal end portion 6565""* is further distinguished in a manner that includes a fourth, non-metallic material, M4, that is similar to the second material, M2, of the distal end portions 656', 656"*, 656'"*. The inclusion of the fourth material, M4, that is similar to the second material, M2, of the distal end portions 656', 656"*, 656'"* serves the same purposes as described above and is not described in further detail here for the purpose of reducing redundancies.

Figure 48:
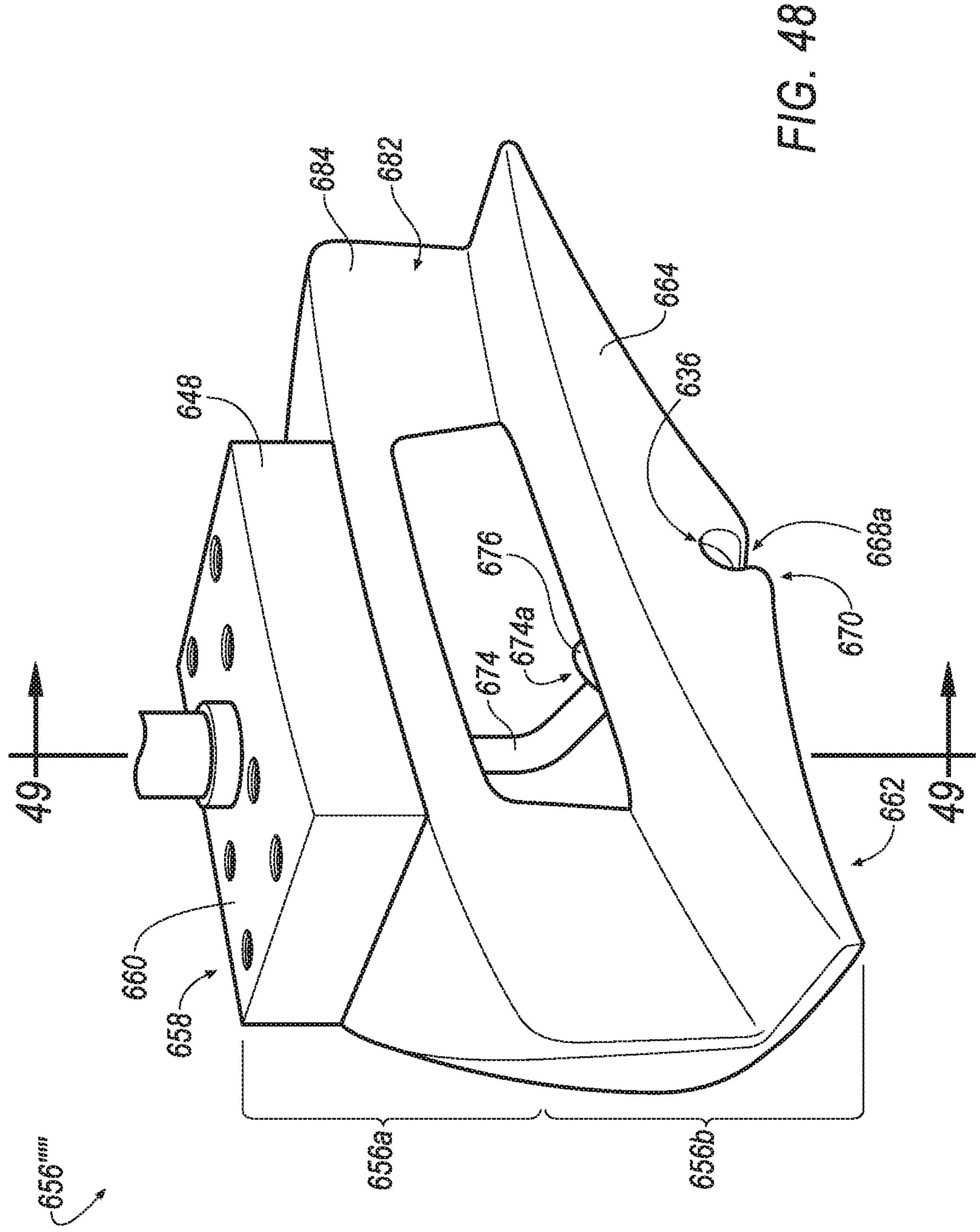
FIG. 48 is a perspective view of an exemplary distal end portion of an inflation probe.
Figure 49B:
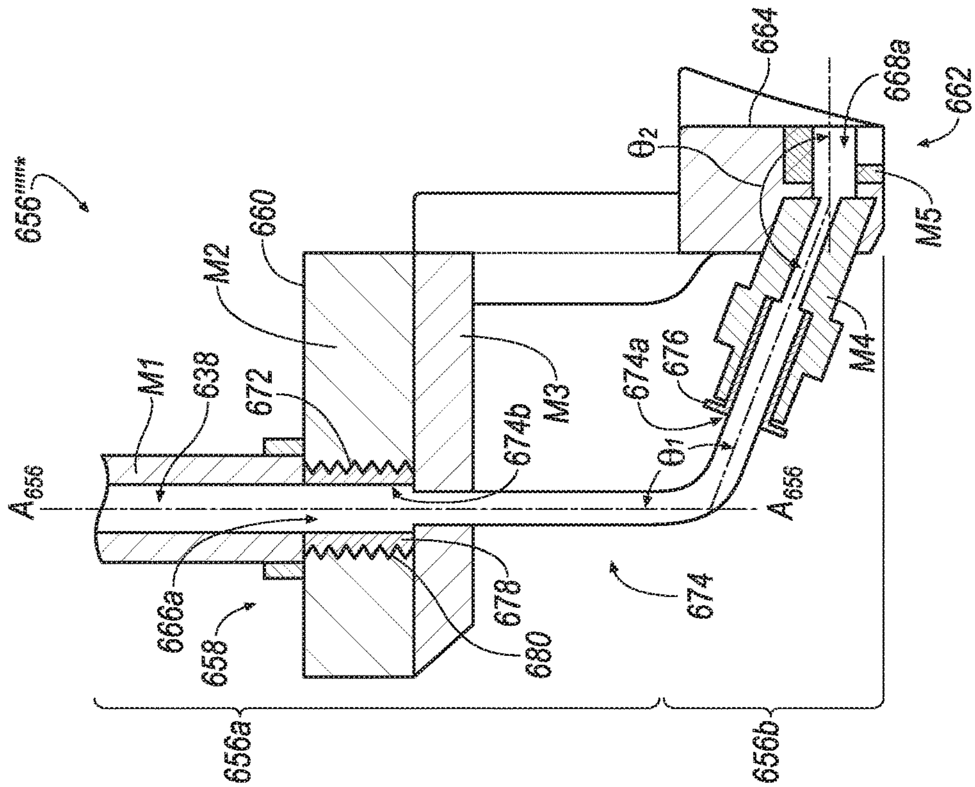
FIG. 49B is an exemplary cross-sectional view of the distal end portion according to line 49-49 of FIG. 48.
Figure 49A:
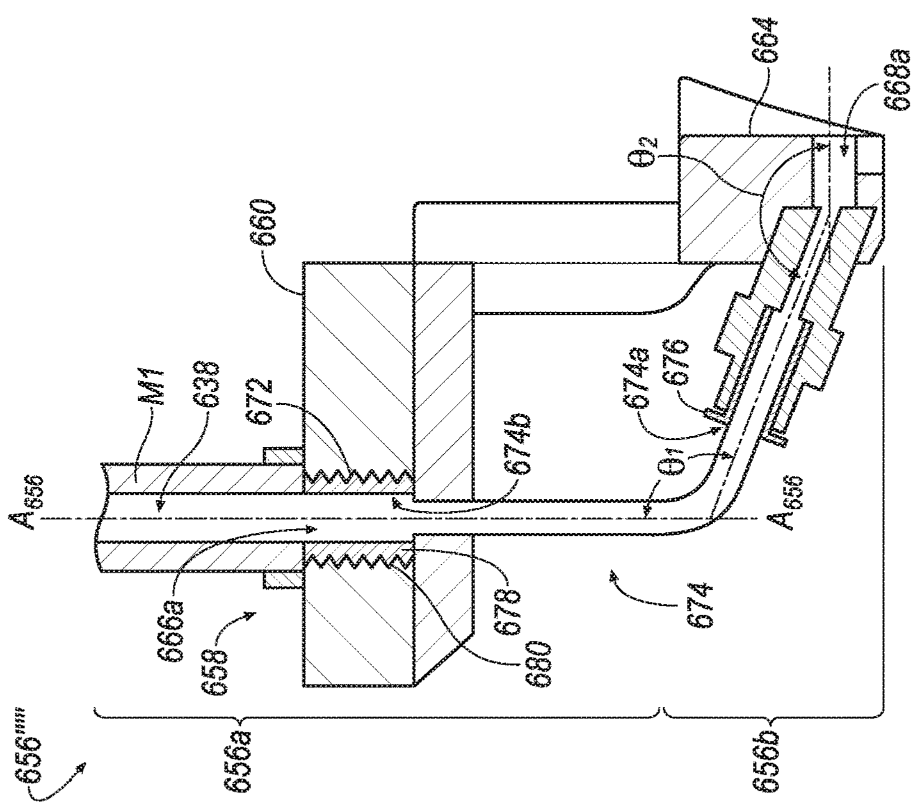
FIG. 49A is an exemplary cross-sectional view of the distal end portion according to line 49-49 of FIG. 48.

Referring to FIGS. 48-49A, an alternative distal end portion 656'"" of the inflation probe 614*a*, 614*b*, 614*a'*, 614*b'* is shown according to an implementation. The distal end portion 656'"" may be formed from any desirable material such as, for example, a plastic resin, metal or the like. Because the distal end portion 656'"" is substantially similar to the distal end portion 656"", reference numerals are repeated in FIGS. 48-49A and not described in further detail here for the purposes of reducing redundancies. Structurally, the implementation of the distal end portion 656'"" is shown to include a hose 674 that fluidly-couples the first and second body portions 656*a*, 656*b*. A first end 674*a* of the hose 674 may be located within a fitting 676 of the second body portion 656*b*, and, an intermediate portion 674*b* of the hose 674 may include a carrier member 678 (see, e.g., FIG. 49A) having an outer threaded surface 680 that is threadingly-coupled to the inner threaded surface portion 672 of the probe fluid conduit 638.

In an alternative implement as seen in FIG. 49B, a distal end portion 656'""* is substantially similar to that of the distal end portions 656'"" with the exception that the distal end portion 6565'""* is further distinguished in a manner that includes a fifth, non-metallic material, M5, that is similar to the second material, M2, of the distal end portions 656', 656"*, 656'"*. The inclusion of the fifth material, M5, that is similar to the second material, M2, of the distal end portions 656', 656"*, 656'"* serves the same purposes as described above and is not described in further detail here for the purpose of reducing redundancies.

Referring to FIGS. 38, 40, 42, 44, 46 and 48, each of the distal end portions 656-656'"" include an intermediate portion 682 extending between the fluid inlet end 658 and the fluid outlet end 662. At least a portion of an outer surface 684 of the intermediate portion 682 forms an arcuate geometry. The arcuate geometry assists in conforming to the outer surface profile of the wheel, W, when the distal end portions 656-656''''' is moved to an orientation that is adjacent the wheel, W.

Figure 50A:
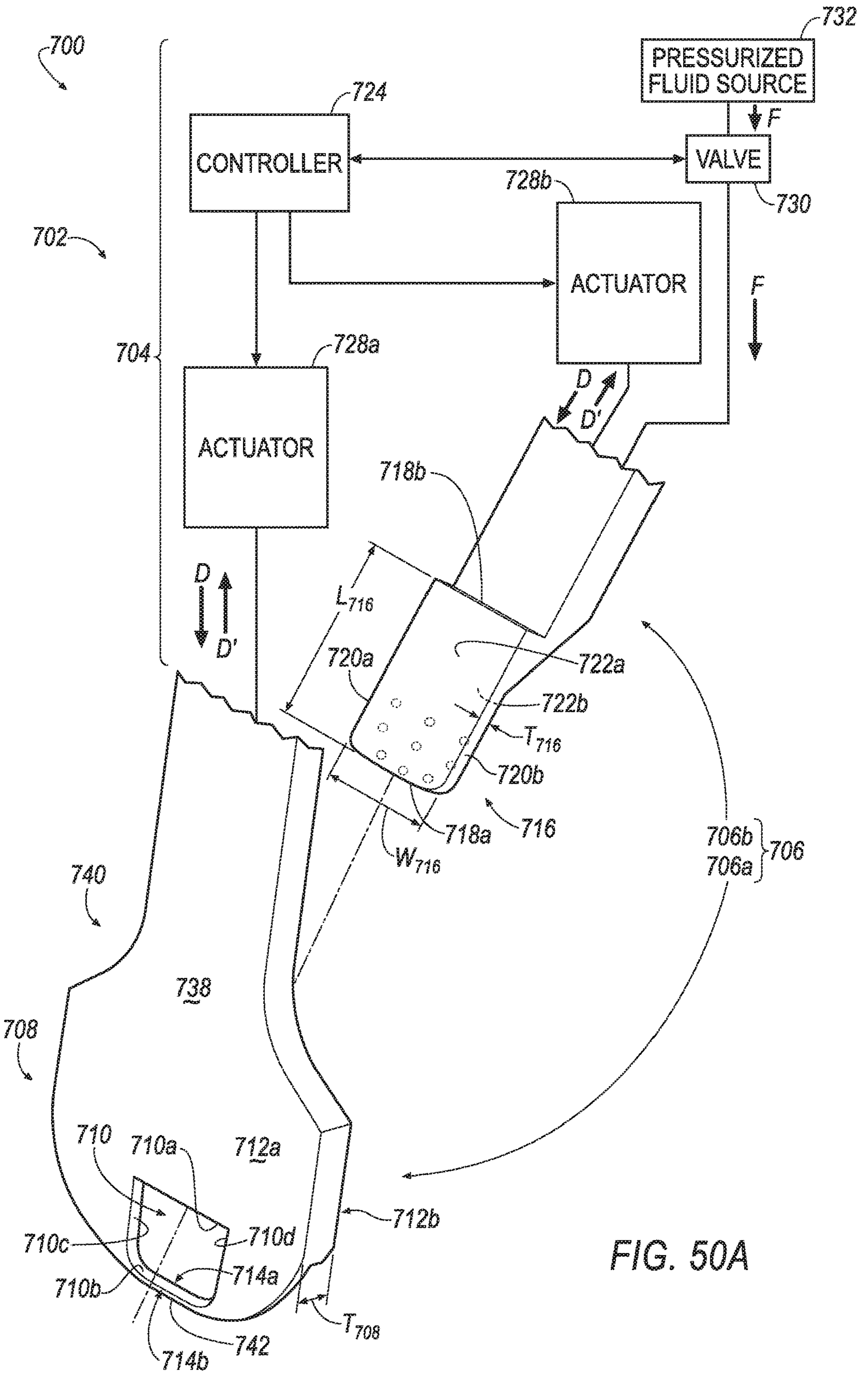
FIGS. 50A-50B illustrate a view of an exemplary inflation work station.
Figure 50B:
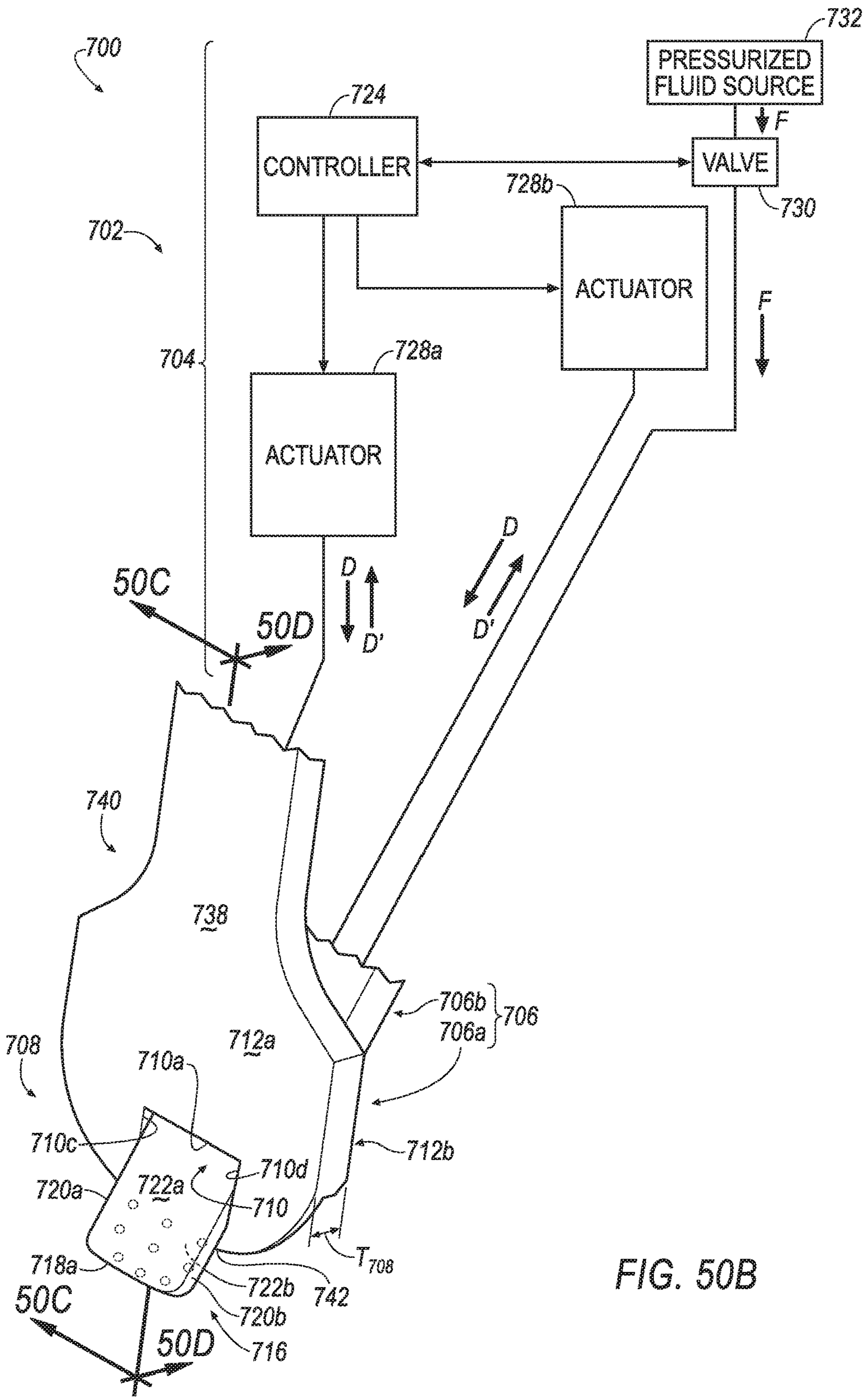

Referring to FIGS. 50A and 50B, a representative view of an exemplary inflation work station 700 is shown. The inflation work station 700 includes a system 702 for inflating a tire/wheel assembly.

The system 702 includes a working device 704. An inflation probe 706 may be included as a component of the working device 704, or, alternatively, the inflation probe 706 may be described as a component that is attached to/in communication with the working device 704. The inflation probe 706 includes a first member 706*a* and a second member 706*b*.

The first member 706*a* includes a distal end 708 that forms a passage 710 that extends through a thickness, $T_{708}$, of the distal end 708 of the first member 706*a*. The passage 710 includes a substantially square-shape-tubular dimension that is formed by an upper passage surface 710*a*, a lower passage surface 710*b*, a left side passage surface 710*c* and a right side passage surface 710*d*.

The thickness, $T_{708}$, is bound by a front surface 712*a* of the distal end 708 of the first member 706*a* and a rear surface 712*b* of the distal end 708 of the first member 706*a*. Access to the passage 710 is permitted by an entrance opening 714*a* formed by the rear surface 712*b* of the distal end 708 of the first member 706*a* and an exit opening 714*b* formed by the front surface 712*a* of the distal end 708 of the first member 706*a*.

The second member 706*b* includes a distal end 716 formed by a length, $L_{716}$, width, $W_{716}$, and thickness, $T_{716}$. The length, $L_{716}$, is bound by a leading edge 718*a* of the distal end 716 of the second member 706*b* and a trailing edge 718*b* of the distal end 716 of the second member 706*b*. The width, $W_{716}$, is bound by a left side surface 720*a* of the distal end 716 of the second member 706*b* and a right side surface 720*b* of the distal end 716 of the second member 706*b*. The thickness, $T_{716}$, is bound by a front surface 722*a* of the distal end 716 of the second member 706*b* and a rear surface 722*b* of the distal end 716 of the second member 706*b*.

Figure 50D:
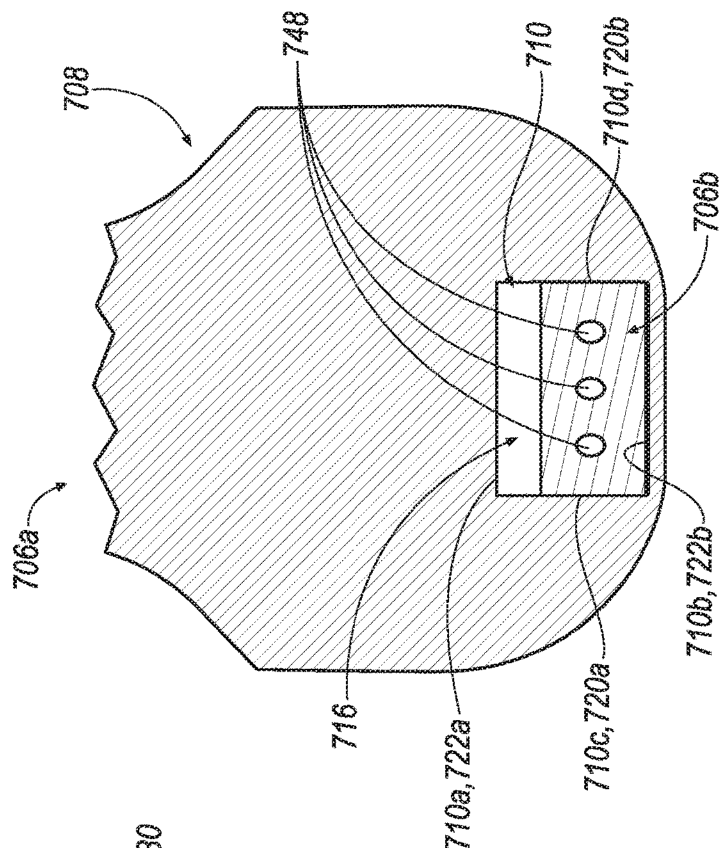
FIG. 50D illustrates a cross-sectional view of the inflation work station according to line 50D-50D of FIG. 50B.
Figure 50C:
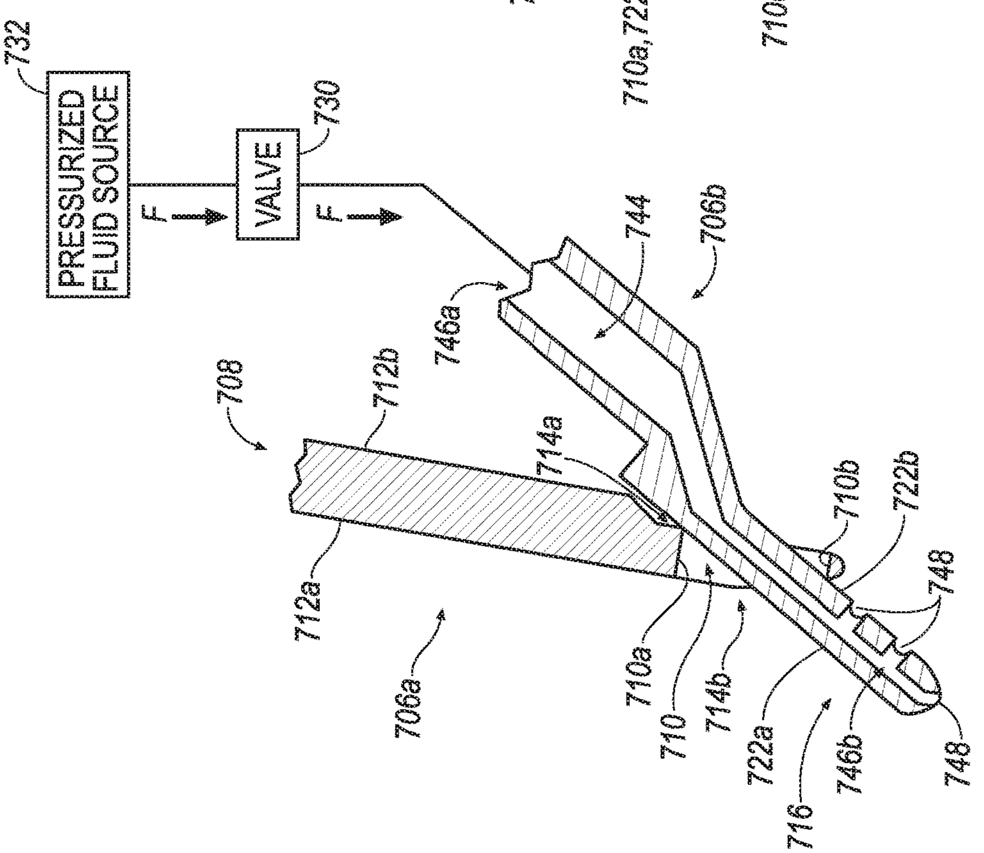
FIG. 50C illustrates a cross-sectional view of the inflation work station according to line 50C-50C of FIG. 50B.

Referring to FIGS. 50B-50D, the distal end 716 of the second member 706*b* is shown arranged within and extending through the passage 710 formed by the distal end 708 of the first member 706*a*; by virtue of the arrangement of the distal end 716 of the second member 706*b* and the distal end 708 of the first member 706*a*, the first member 706*a* may be hereinafter referred to as a "female portion" of the inflation probe 706, and, the second member 706*b* may be hereinafter referred to as a "male portion" of the inflation probe 706.

As will be described in the following disclosure at FIGS. 51A-51F, the male portion 706*b* may be permitted to reciprocate to/from backwardly position (see, e.g., FIG. 50A) and forwardly position (see, e.g., FIGS. 50B-50D) with respect to the female portion 706*a* such that inflation probe 706 may be said to be arranged in one of a "non-inflation"/"offline" orientation (see, e.g., FIG. 50A) and an "inflation"/"online" orientation (see, e.g., FIGS. 50B-50D). For example, when the inflation probe 706 is said to be arranged in the "non-inflation"/"offline" orientation, the male portion 706*b* may be said to be arranged in a "de-coupled"/"non-mated" orientation (see, e.g., FIG. 50A) with respect to the female portion 706*a*; alternatively, when the inflation probe 706 is said to be arranged in the "inflation"/"online" orientation, the male portion 706*b* may be said to be arranged in a "coupled"/"mated" orientation (see, e.g., FIGS. 50B-50D) with respect to the female portion 706*a*.

Referring to FIGS. 50B-50D, when the male portion 706*b* is arranged in the "coupled"/"mated" orientation with respect to the female portion 706*a*, the male portion 706*b* may be said to fluidly-seal the passage 710 formed by the distal end 708 of the female portion 706*a* of the inflation probe 706. The sealing of the passage 710 may be accomplished by, for example, directly contacting: (1) the front surface 722*a* of the distal end 716 of the second member 706*b* with the upper passage surface 710*a* of the passage 710 proximate the entrance opening 714*a* formed by the rear surface 712*b* of the distal end 708 of the first member 706*a* (as seen in, e.g., FIGS. 50C, 50D), (2) the rear surface 722*b* of the distal end 716 of the second member 706*b* with the lower passage surface 710*b* of the passage 710 proximate the exit opening 714*b* formed by the front surface 712*a* of the distal end 708 of the first member 706*a* (as seen in, e.g., FIGS. 50C, 50D), (3) the left side 720*a* of the distal end 716 of the second member 706*b* with the left side passage surface 710*c* of the passage 710 (as seen in, e.g., FIG. 50D) and (4) the right side 720*b* of the distal end 716 of the second member 706*b* with the right side passage surface 710*d* of the passage 710 (as seen in, e.g., FIG. 50D).

Referring to FIGS. 50A and 50B, in some implementations, the working device 704 may include a controller 724. The controller 724 may include hardware (e.g., memory, a processor and the like) and software that operably-communicates with one or more components of the working device 704; the one or more components may include, for example: a female portion movement actuator 728*a*, a male portion movement actuator 728*b* and a valve 730. The valve 730 is connected to a pressurized fluid source 732. The pressurized fluid source 732 may also be considered to be included as a component of the working device 704.

As seen in FIGS. 50A and 50B, the female portion movement actuator 728*a* is connected to the female portion 706*a* of the inflation probe 706, and, the male portion movement actuator 728*b* is connected to the male portion 706*b* of the inflation probe 706. The pressurized fluid source 732 is also connected to the male portion 706*b* of the inflation probe 706 by way of the valve 730.

The female and male portion movement actuators 728*a*, 728*b* may include any device that causes at least bi-directional movement (see, e.g., arrows D, D'). Accordingly, in an embodiment, the female and male portion movement actuators 728*a*, 728*b* may include, for example, a hydraulic arm, piston or the like that imparts that bi-directional movement, D, D'.

Although shown in abstract form in FIGS. 50A and 50B, the working device 704 may be connected to and extend from an upper surface of a load bearing member (such as, e.g., a substantially similar load bearing member 144, 146 shown in FIG. 7). In some implementations, the working device 704 may cause the inflation probe 706 to be moved from the "non-inflation"/"offline" orientation away from a tire-wheel assembly support member such as, for example, a wheeled cart (such as, e.g., a substantially similar wheel cart 42, 66 shown in FIG. 7 and also in, e.g., FIG. 51A-51F) to the "inflation"/"online" orientation proximate the tire-wheel assembly support member 42, 66. As seen in FIGS. 51A-51F, the tire-wheel assembly support member 42, 66 supports a tire, T, and a wheel, W, which may be collectively referred to as a tire-wheel assembly, TW.

Further, in some implementations, the upper surface of the load bearing member 144, 146 may also include an engagement member (such as, e.g., a substantially similar engagement member 148, 150 shown in FIG. 8) that may be interfaced with a respectively-associated mating engagement recess (such as, e.g., a substantially similar engagement recess 152, 154 shown in FIG. 8 and also in, e.g., FIG. 51A-51F) formed in a lower surface (such as, e.g., a substantially similar lower surface 137 shown in FIG. 51A-51F) of the wheeled cart 42, 66.

With continued reference to FIGS. 51A-51F, in some implementations, the inflation work station 700 may include a robotic arm 734 having a first end 734*a* and a second end 734*b*. The first end 734*a* of the robotic arm 734 may be attached to and extend from the upper surface 145, 147 of the load bearing member 144, 146. The second end 734*b* of the robotic arm 734 may terminate with/may include an end effecter or head portion 736 that may be selectively coupled to/selectively interfaced with the tire-wheel assembly, TW. An intermediate portion 734*c* of the robotic arm 734 may be connected to and support one or more of the working device 704 and the inflation probe 706.

Figure 51A:
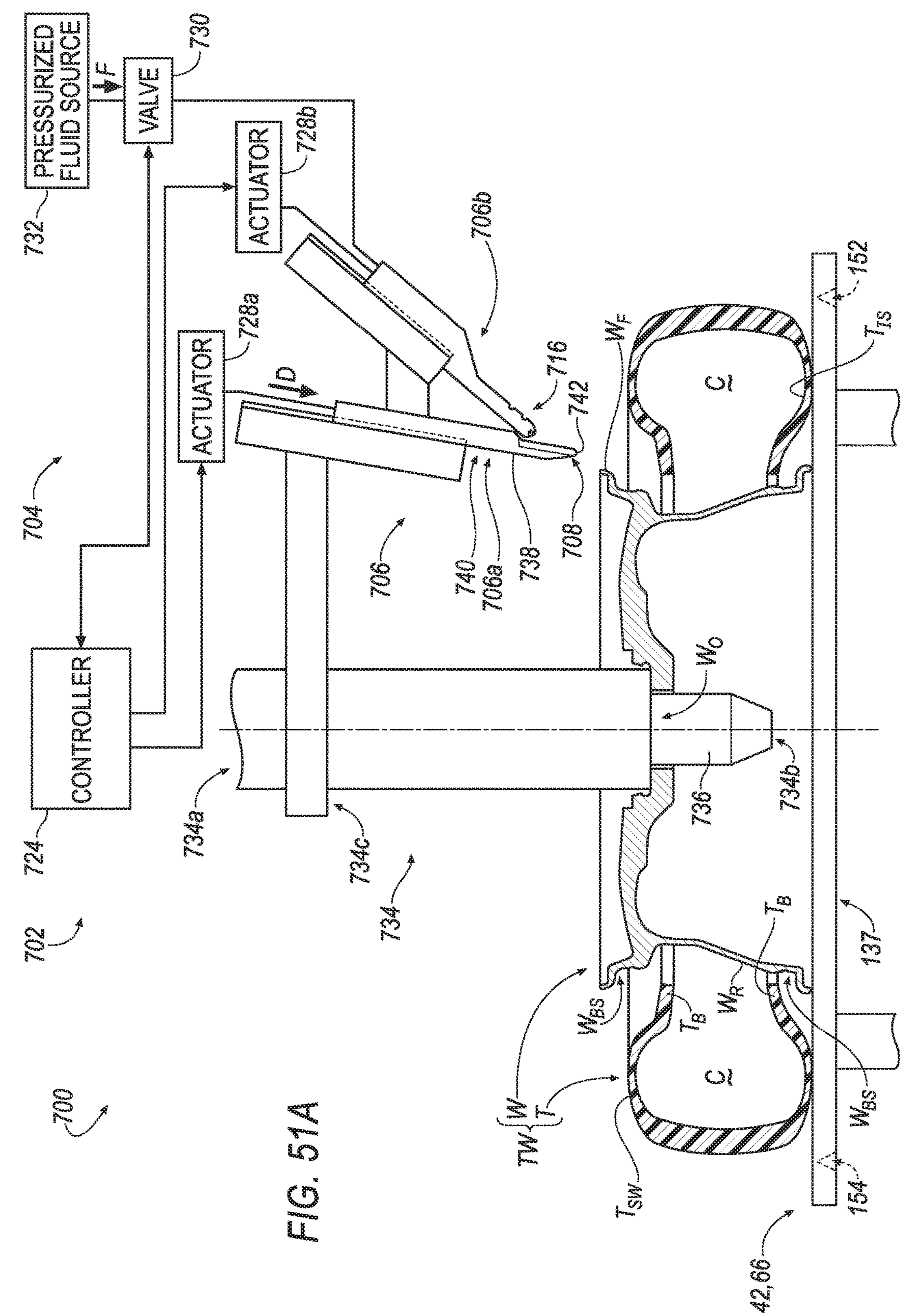
FIGS. 51A-51F illustrate a side view of the inflation work station of FIGS. 50A-50B.

Referring to FIG. 51A, the robotic arm 734 may be moved to an engaged position with respect to the tire-wheel assembly, TW, such that the head portion 736 may be inserted into an axial opening, $W_O$, formed by the wheel, W, such that the head portion 736 may directly engage the wheel, W. Movement of the robotic arm 734 to the engaged position may be conducted by, for example, a prime mover (not shown) connected to the robotic arm 734.

Figure 51B:
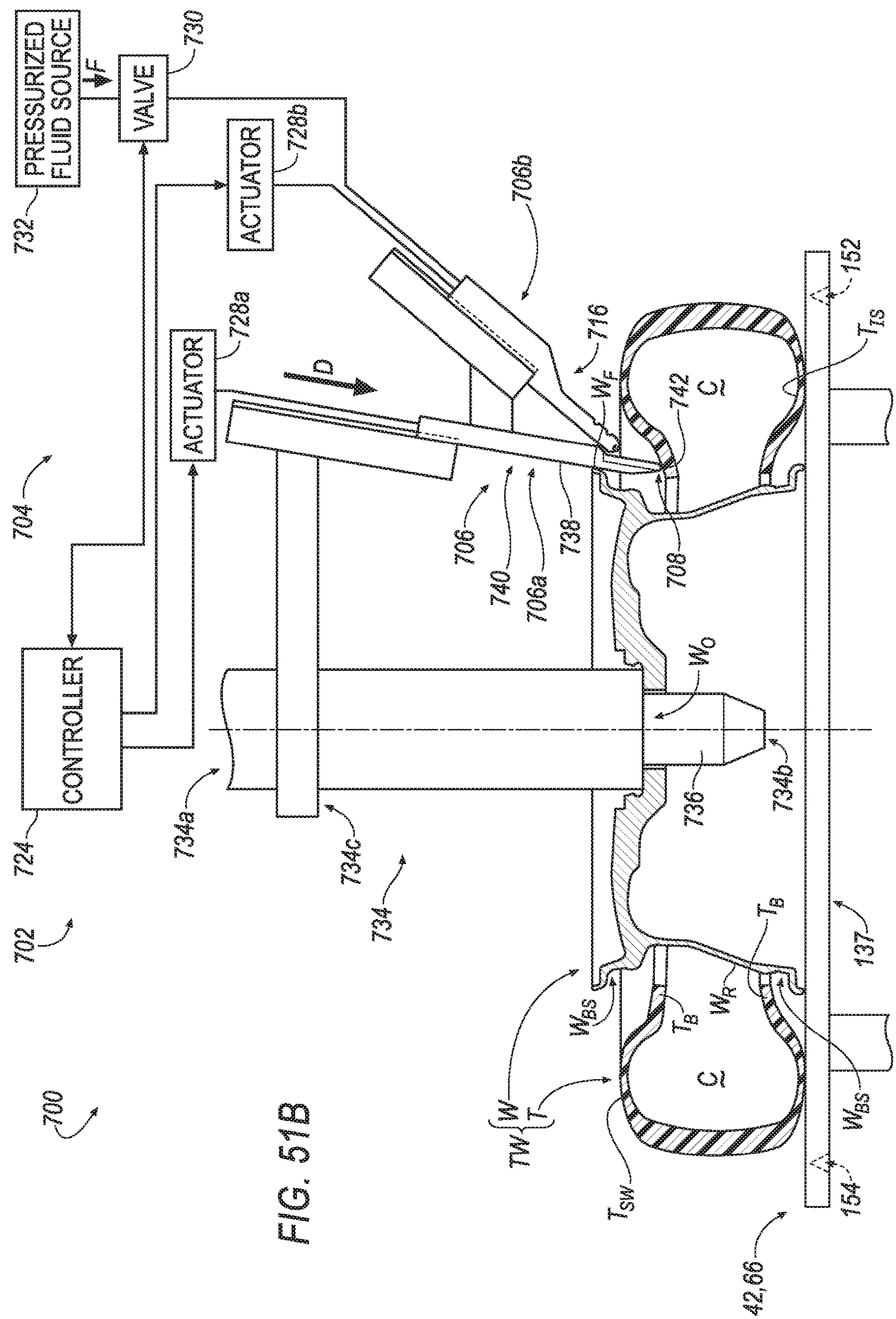
Figure 51C:
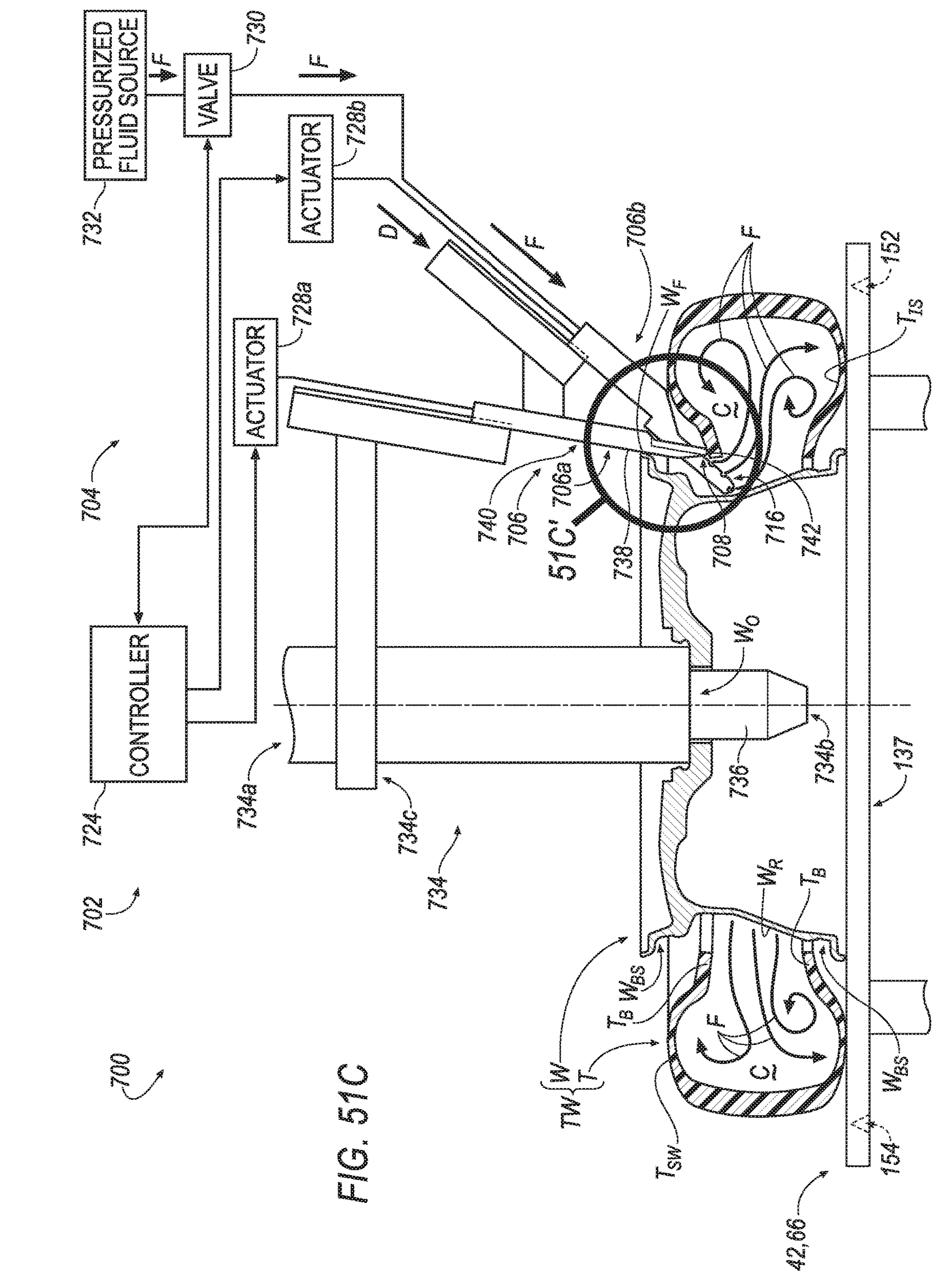
Figure 51C:
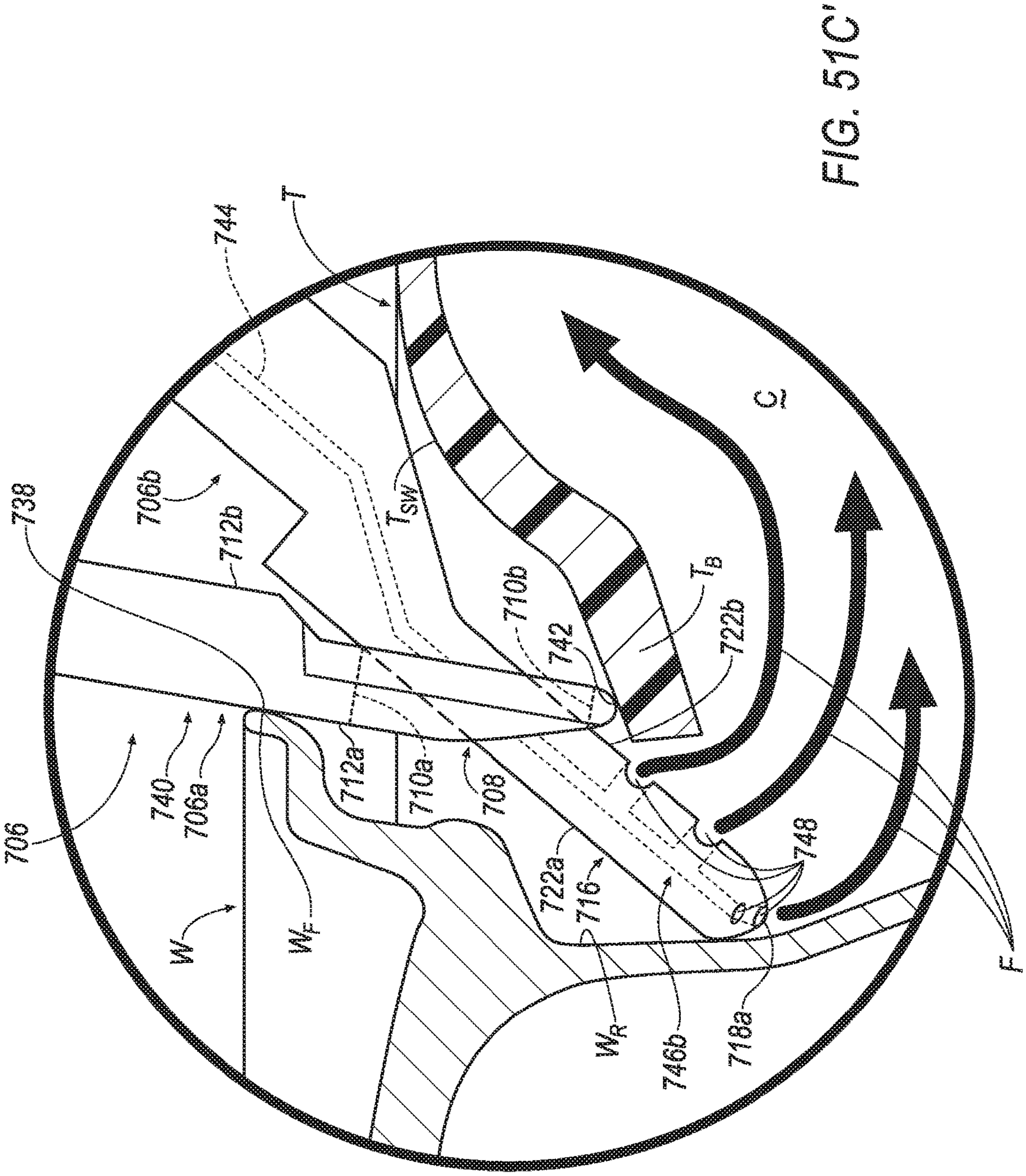

Once the robotic arm 734 is engaged with the wheel, W, the working device 704 may cause movement of the inflation probe 706 from a first orientation (e.g., away from) the tire-wheel assembly, TW (as seen in, e.g., FIG. 51A), to a second orientation (e.g., toward/closer-to/at least partially engaging) the tire-wheel assembly, TW (as seen in, e.g., FIG. 51B). Referring to FIGS. 51B and 51C', the second orientation may be defined as a portion (e.g., the female portion 706*a*) of the inflation probe 706 directly engaging both of a portion of the tire, T, and a portion of the wheel, W, of the tire-wheel assembly, TW; in an embodiment, a front surface 738 of a proximal end 740 of the female portion 706*a* directly engages a flange surface, $W_F$, of the wheel, W, while a leading edge 742 of the distal end 708 of the female portion 706*a* directly engages a sidewall surface, $T_{SW}$, of the tire, T. In the second orientation, as seen in FIG. 51B, the male portion 706*b* of the inflation probe 706 may, in an implementation, not engage any of: (1) the female portion 706*a* of the inflation probe 706, (2) the tire, T, and (3) the wheel, W.

Movement of the inflation probe 706 from the first orientation shown in FIG. 51A to the second orientation shown in FIG. 51B may be conducted by the controller 724. Accordingly, in an implementation, the controller 724 may cause: (1) the female portion movement actuator 728*a* to cause movement of the female portion 706*a* of the inflation probe 706 according to the direction of the arrow, D (as seen in FIG. 51B), and (2) the male portion movement actuator 728*b* may not yet be actuated in order to cause movement of the male portion 706*b* in order to subsequently "mate" the male portion 706*b* with the female portion 706*a* according to the direction of the arrow, D (as seen in FIG. 51C).

Further movement of the inflation probe 706 from the second orientation (as seen in, e.g., FIG. 51B) to a third orientation (as seen in, e.g., FIG. 51C) may be conducted by the controller 724. Accordingly, in an implementation, the controller 724 may cause: (3) the male portion movement actuator 728*b* to cause further movement of the male portion 706*b* according to the direction of the arrow, D (as seen in, FIG. 51C), while (4) the female portion 706*a* of the inflation probe 706 remains in a fixed orientation directly engaging the flange surface, $W_F$, of the wheel, W, and the sidewall surface, $T_{SW}$, of the tire, T. Accordingly, it may be said that the male portion 706*b* is arranged in the "de-coupled"/"non-mated" orientation with respect to the female portion 706*a* in FIGS. 51A-51B (i.e., the inflation probe 706 is said to be arranged in the "non-inflation"/"offline" orientation in FIGS. 51A-51B) whereas the male portion 706*b* is arranged in the "coupled"/"mated" orientation with respect to the female portion 706*a* in FIGS. 51C and 51C' (i.e., the inflation probe 706 is said to be arranged in the "inflation"/"online" orientation in FIG. 51C).

Referring back to FIG. 50C, the male portion 706*b* includes a fluid channel 744. The fluid channel 744 includes a first end 746*a* that is in fluid communication with the pressurized fluid source 732 and a second end 746*b* that terminates with one or more fluid channel openings 748 (see, e.g., FIGS. 50C and 50D) formed in the rear surface 722*b* of the distal end 716 of the male portion 706*b*. As discussed above in FIGS. 50B-50D, when the male portion 706*b* is arranged in the "coupled"/"mated" orientation with respect to the female portion 706*a*, the male portion 706*b* may be said to fluidly-seal the passage 710 of the female portion 706*a*. With reference to FIG. 50C, because the fluid channel 744 extends through the male portion 706*b* of the inflation probe 706, upon arranging the male portion 706*b* in the "coupled"/"mated" orientation with respect to the female portion 706*a*, the fluid channel 744 may be said to be sealingly-extended-through the female portion 706*a* of the inflation probe 706 such that pressurized fluid, F, may be communicated: (1) from the pressurized fluid source 732, (2) into the fluid channel 744 of the male portion 706*b* of the inflation probe 706 such that the pressurized fluid F, is communicated within the fluid channel 744 from an orientation: (3a) upstream of the rear surface 712*b* of the distal end 708 of the female portion 706*a*, (3b) through the fluidly-sealed passage 710 of the female portion 706*a* and (3c) downstream of the front surface 712*a* of the distal end 708 of the female portion 706*a* such that the pressurized fluid, F, is permitted to be (4) evacuated from the one or more fluid channel openings 748 formed in the rear surface 722*b* of the distal end 716 of the second member 706*b*.

Once the male portion 706*b* is arranged in the "coupled"/"mated" orientation with respect to the female portion 706*a* as described above and shown in FIGS. 51C and 51C', the one or more fluid channel openings 748 formed in the rear surface 722*b* of the distal end 716 of the second member 706*b* may be said to be arranged in fluid communication with a cavity, C, of the tire-wheel assembly, TW. The cavity, C, may be formed by a circumferential rim, $W_R$, of the wheel, W, and an inner surface, $T_{IS}$, of the tire, T.

Further, when the inflation probe 706 is arranged in the "non-inflation"/"offline" orientation in FIGS. 51A-51B, the valve 730 is said to be in a closed orientation such that the pressurized fluid, F, within the pressurized fluid source 732 is not permitted to be communicated through the fluid channel 744 of the male portion 706*b* of the inflation probe 706. However, once arranged in the "inflation"/"online" orientation as seen in FIGS. 51C and 51C', the controller 724 may communicate with the valve 730 in order to cause the valve 730 to change in orientation from the closed orientation to an open orientation.

As seen in FIGS. 51C and 51C', when the valve 730 is arranged in the open orientation, the pressurized fluid, F, within the pressurized fluid source 732 is permitted to be communicated through fluid channel 744 of the male portion 706*b* of the inflation probe 706 as described above. Ultimately, the pressurized fluid, F, is evacuated from the male portion 706*b* of the inflation probe 706 by way of the one or more fluid channel openings 748 formed in the rear surface 722*b* of the distal end 716 of the male portion 706*b*. Because the one or more fluid channel openings 748 formed in the rear surface 722*b* of the distal end 716 of the male portion 706*b* is in fluid communication with the cavity, C, of the tire-wheel assembly, TW, the pressurized fluid, F, is deposited into and fills the cavity, C, such that the tire-wheel assembly, TW, becomes pressurized. Pressurization of the cavity, C, of the tire-wheel assembly, TW, results in beads, $T_B$, of the tire, T, being moved by the pressurized fluid, F, from a first orientation (see, e.g., FIGS. 51A-51C) to a second orientation (see, e.g., FIGS. 51D-51F) such that the beads, $T_B$, of the tire, T, may be located proximate/adjacent the bead seats, $W_{BS}$, of the wheel, W. As seen in FIGS. 51E-51F, upon retracting the female and male portions 706*a*, 706*b* of the inflation probe 706 according to the direction of arrows, D', the beads, $T_B$, of the tire, T, may be located adjacent the bead seats, $W_{BS}$, of the wheel, W, in a sealing relationship such that the pressurized fluid, F, may be trapped within the cavity, C, thereby causing the tire, T, to be inflatably-pressurized relative the wheel, W.

Figure 51D:
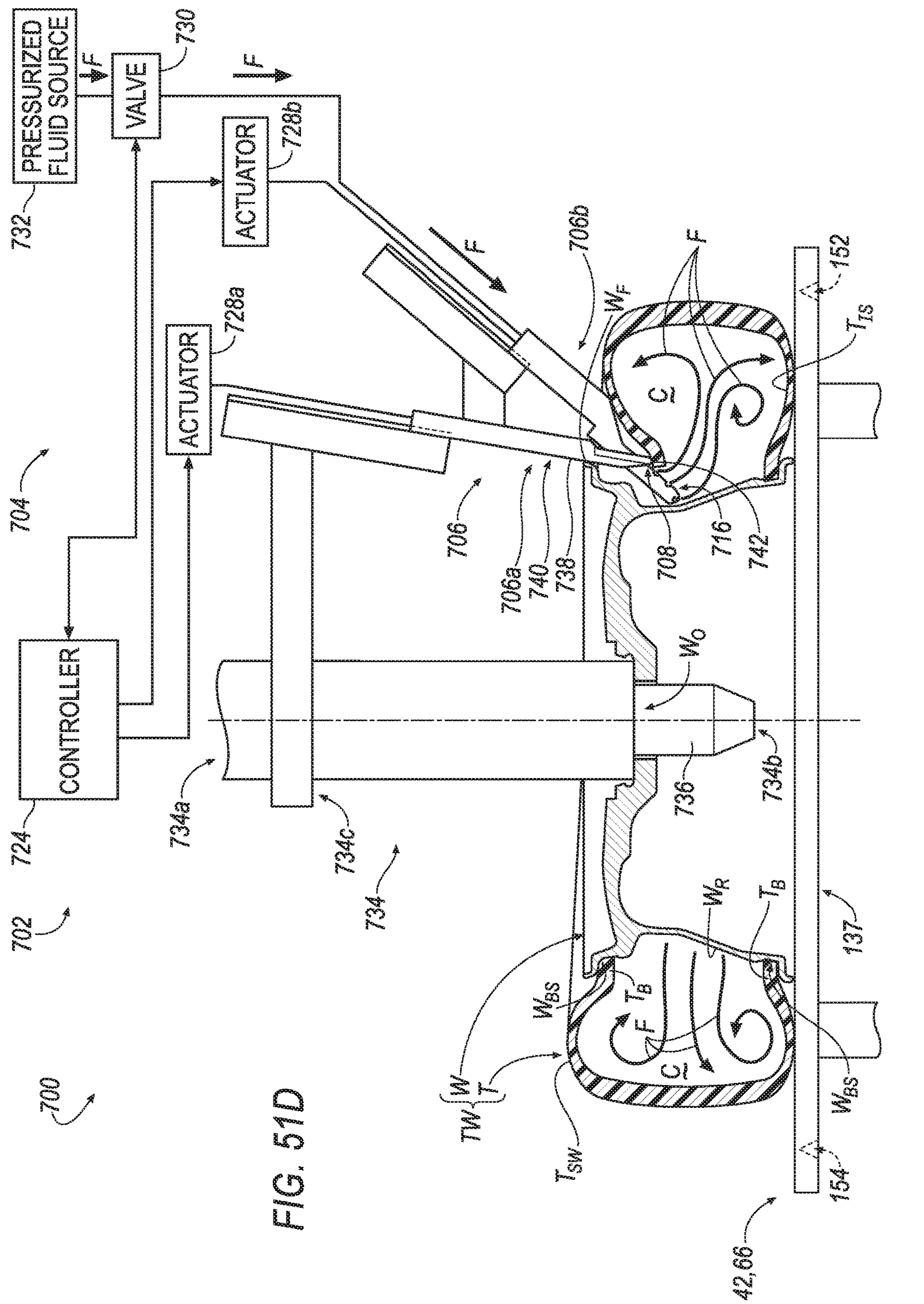
Figure 51E:
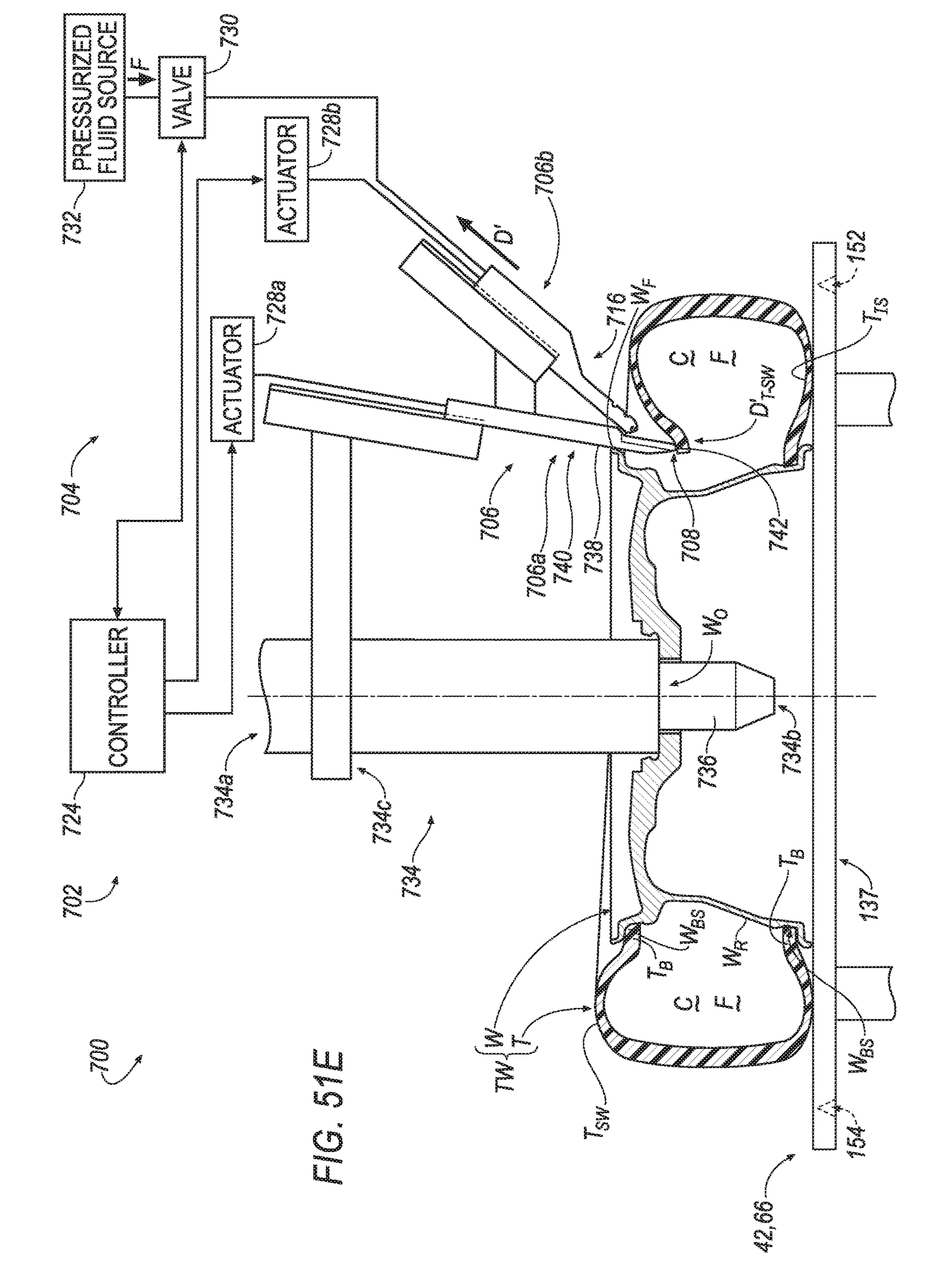
Figure 51F:
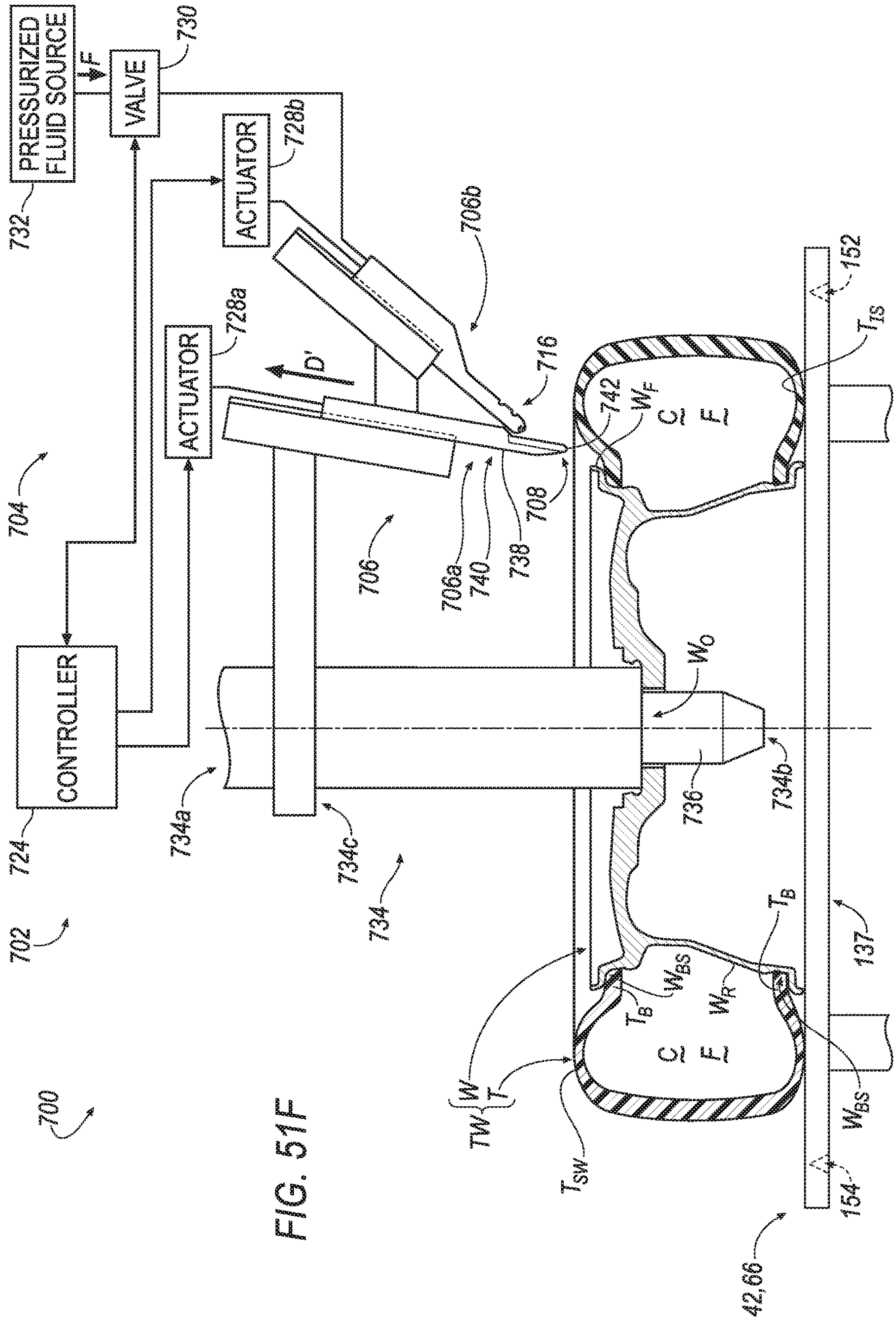

Referring to FIGS. 51C-51D, the pressurized fluid, F, is communicated to the cavity, C, of the tire-wheel assembly, TW, as described above. In an embodiment, the controller 724 may permit the valve 730 to be arranged in an open orientation for a predetermined period of time (e.g., "X number of seconds") in order to permit a predetermined amount of pressurized fluid, F, to be deposited into the cavity, C, of the tire-wheel assembly, TW. Once the predetermined period of time has expired, the controller 724 may communicate with the valve 730 in order to change the orientation of the valve 730 from the open orientation back to the closed orientation in order to cease the communication of the pressurized fluid, F, to the cavity, C, of the tire-wheel assembly, TW.

Referring to FIG. 51E, the male portion 706*b* of the inflation probe 706 may be retracted according to the direction of the arrow, D', which is opposite the direction of the arrow, D. In an implementation, the controller 724 may cause retraction of the male portion 706*b* of the inflation probe 706 by communicating with the male portion movement actuator 728*b* to cause movement of the male portion 706*b* of the inflation probe 706 according to the direction of the arrow, D'. Once the male portion 706*b* of the inflation probe 706 is retracted, the front surface 738 of the proximal end 740 of the female portion 706*a* remains directly engaged with the flange surface, $W_F$, of the wheel, W, while the leading edge 742 of the distal end 708 of the female portion 706*a* remains directly engaged with the sidewall surface, $T_{SW}$, of the tire, T.

Referring to FIG. 51F, the female portion 706*a* of the inflation probe 706 may be retracted according to the direction of the arrow, D', which is opposite the direction of the arrow, D. In an implementation, the controller 724 may cause retraction of the female portion 706*a* of the inflation probe 706 by communicating with the female portion movement actuator 728*a* to cause movement of the female portion 706*a* of the inflation probe 706 according to the direction of the arrow, D'. Once the female portion 706*a* of the inflation probe 706 is retracted, the front surface 738 of the proximal end 740 of the female portion 706*a* is no longer engaged with the flange surface, $W_F$, of the wheel, W, and, further, the leading edge 742 of the distal end 708 of the female portion 706*a* is no longer engaged with the sidewall surface, $T_{SW}$, of the tire, T.

Additionally, as seen in FIG. 51E, because of the pressurized fluid, F, trapped within the cavity, C, of the tire-wheel assembly, TW, the sidewall surface, $T_{SW}$, of the tire, T, may also exert a force (according to the direction of the arrow, $D'_{T-SW}$) for assisting in retraction of the female portion 706*a* of the inflation probe 706 away from the tire-wheel assembly, TW. Further, as seen in FIG. 51E, because of the contact of the leading edge 742 of the distal end 708 of the female portion 706*a* with the sidewall surface, $T_{SW}$, of the tire, T, a portion of the bead, $T_B$, of the tire, T, is inhibited from being located proximate/adjacent a portion of the bead seat, $W_{BS}$, of the wheel, W; accordingly, as seen in FIG. 51F, upon retraction of the female portion 706*b* of the inflation probe 706 according to the direction of the arrow, D', and, because of the pressurized fluid, F, trapped within the cavity, C, of the tire-wheel assembly, TW, the remaining portion of the bead, $T_B$, of the tire, T, that was previously inhibited (as seen in FIG. 51E) from being located adjacent a portion of the bead seat, $W_{BS}$, of the wheel, W, may be permitted to become seated adjacent the bead seat, $W_{BS}$, of the wheel, W.

Figure 52A:
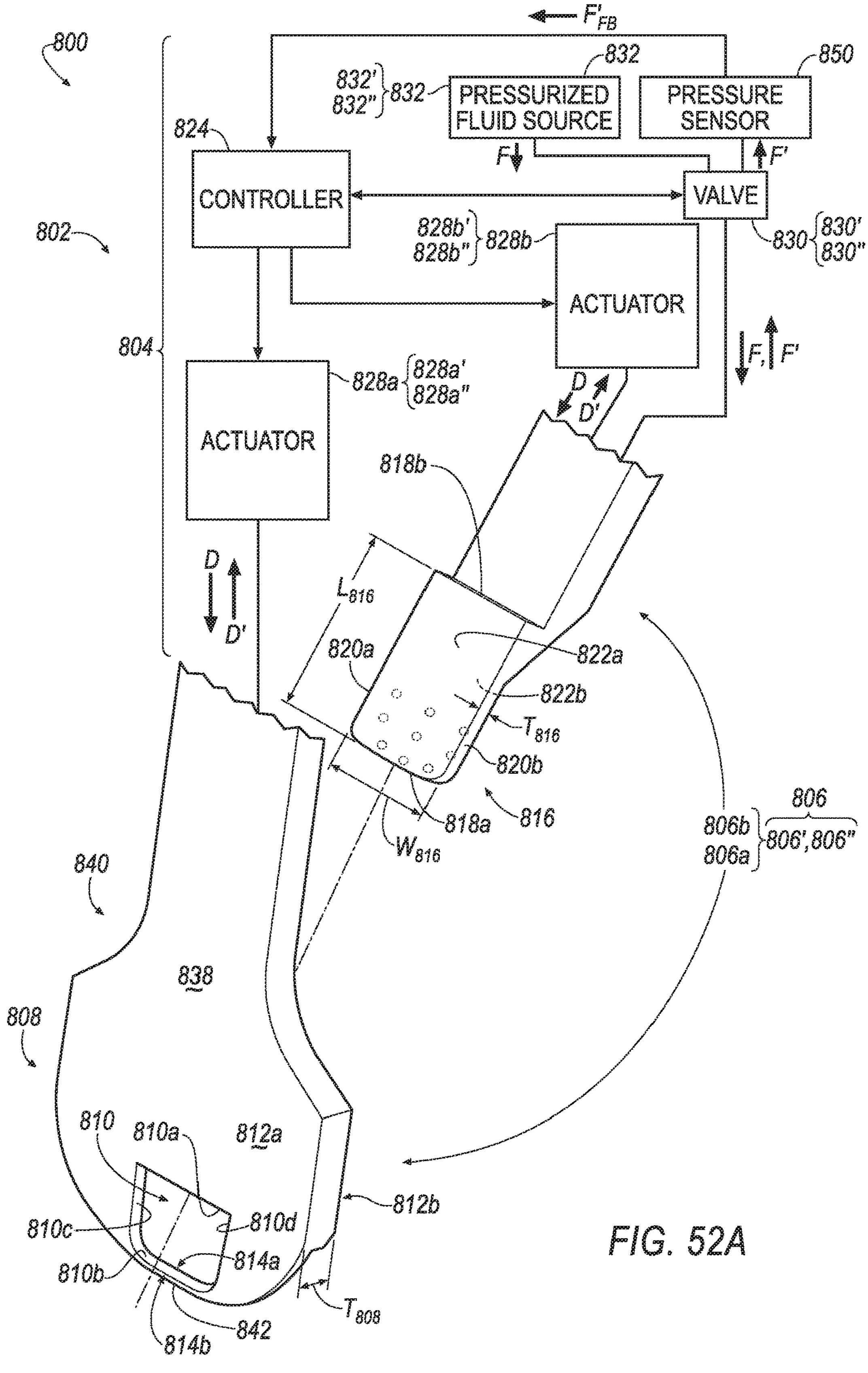
FIGS. 52A-52B illustrate a view of an exemplary inflation work station.
Figure 52B:
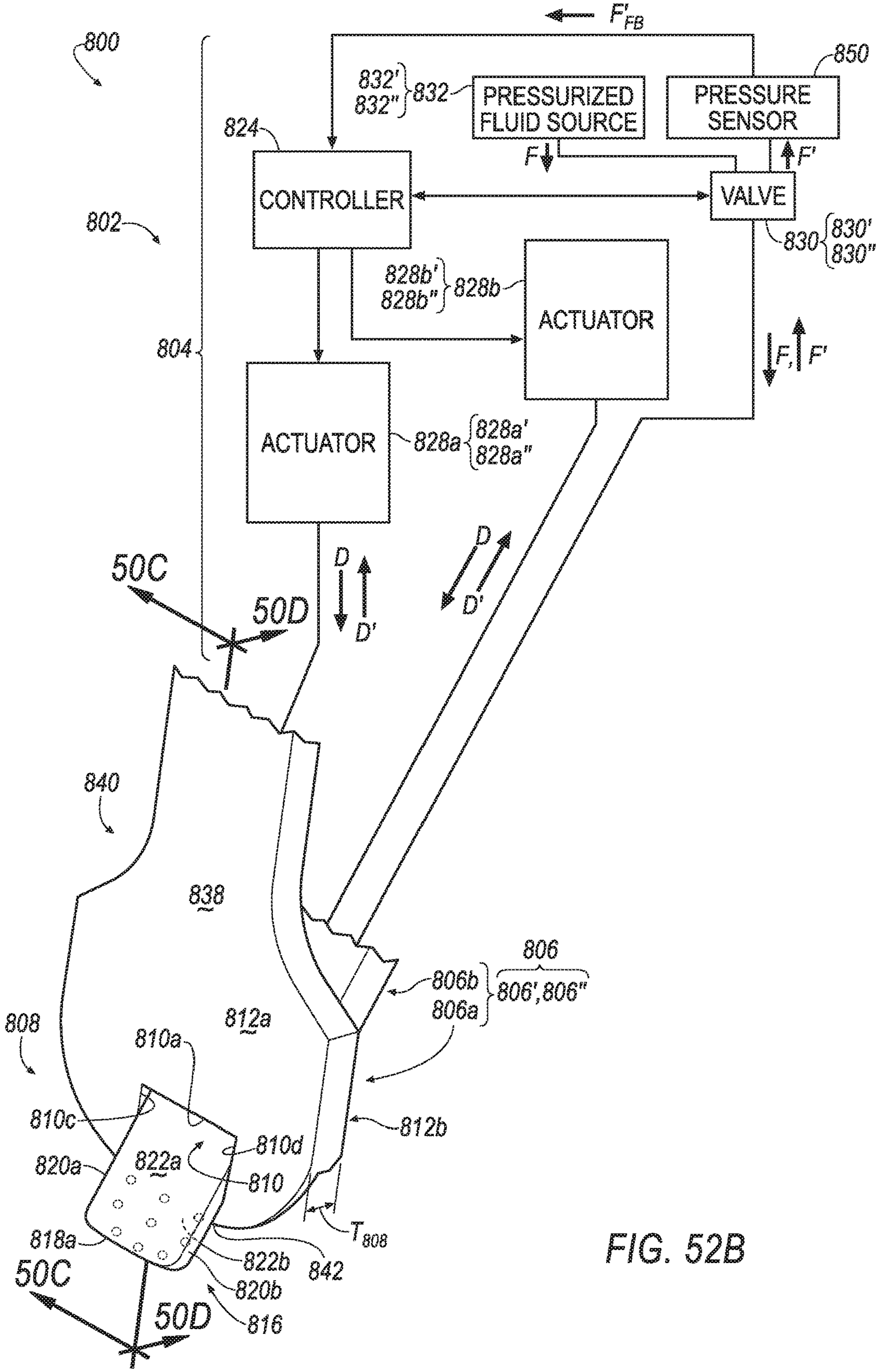

Referring to FIGS. 52A and 52B, a representative view of an exemplary inflation work station 800 is shown. The inflation work station 800 includes a system 802 for inflating a tire/wheel assembly.

The system 802 includes a working device 804. A pair of inflation probes 806 including a first inflation probe 806' and a second inflation probe 806" may be included as a component of the working device 804, or, alternatively, the pair of inflation probes 806 may be described as a component that is attached to/in communication with the working device 804. Each of the first and second inflation probes 806', 806" of the pair of inflation probes 806 includes a first member 806*a* and a second member 806*b*.

The first member 806*a* includes a distal end 808 that forms a passage 810 that extends through a thickness, $T_{808}$, of the distal end 808 of the first member 806*a*. The passage 810 includes a substantially square-shape-tubular dimension that is formed by an upper passage surface 810*a*, a lower passage surface 810*b*, a left side passage surface 810*c* and a right side passage surface 810*d*.

The thickness, $T_{808}$, is bound by a front surface 812*a* of the distal end 808 of the first member 806*a* and a rear surface 812*b* of the distal end 808 of the first member 806*a*. Access to the passage 810 is permitted by an entrance opening 814*a* formed by the rear surface 812*b* of the distal end 808 of the first member 806*a* and an exit opening 814*b* formed by the front surface 812*a* of the distal end 808 of the first member 806*a*.

The second member 806*b* includes a distal end 816 formed by a length, $L_{816}$, width, $W_{816}$, and thickness, $T_{816}$. The length, $L_{816}$, is bound by a leading edge 818*a* of the distal end 816 of the second member 806*b* and a trailing edge 818*b* of the distal end 816 of the second member 806*b*. The width, $W_{816}$, is bound by a left side surface 820*a* of the distal end 816 of the second member 806*b* and a right side surface 820*b* of the distal end 816 of the second member 806*b*. The thickness, $T_{816}$, is bound by a front surface 822*a* of the distal end 816 of the second member 806*b* and a rear surface 822*b* of the distal end 816 of the second member 806*b*.

Figure 52D:
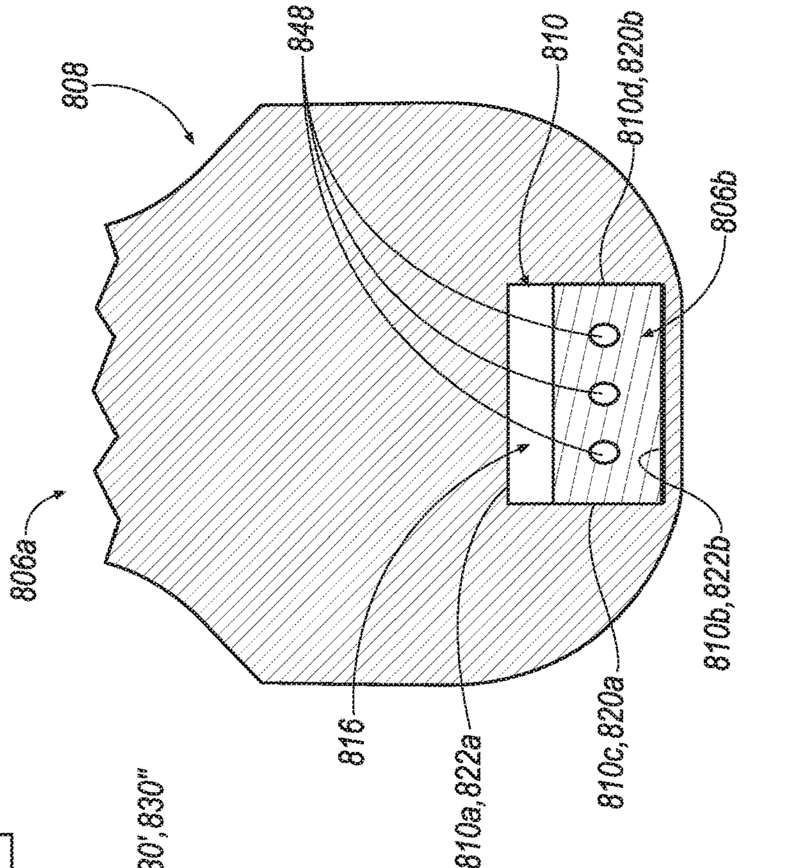
FIG. 52D illustrates a cross-sectional view of the inflation work station according to line 52D-52D of FIG. 52B.
Figure 52C:
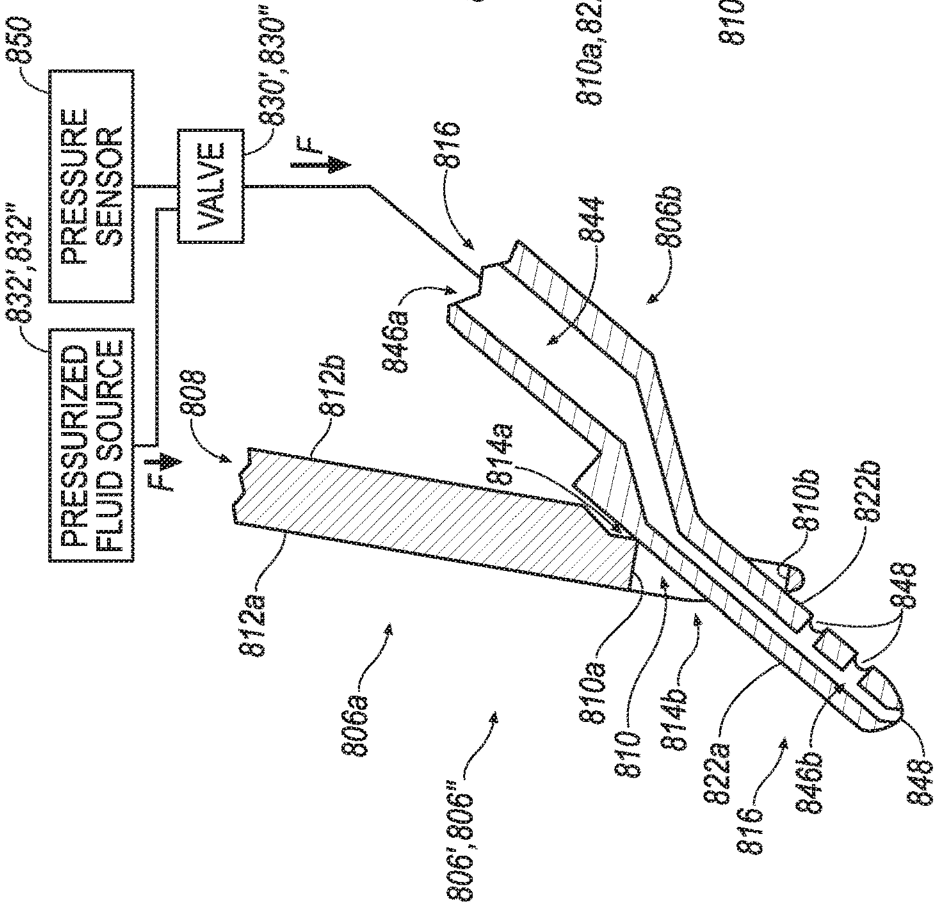
FIG. 52C illustrates a cross-sectional view of the inflation work station according to line 52C-52C of FIG. 52B.

Referring to FIGS. 52B-52D, the distal end 816 of the second member 806*b* is shown arranged within and extending through the passage 810 formed by the distal end 808 of the first member 806*a*; by virtue of the arrangement of the distal end 816 of the second member 806*b* and the distal end 808 of the first member 806*a*, the first member 806*a* may be hereinafter referred to as a “female portion” of the inflation probe 806, and, the second member 806*b* may be hereinafter referred to as a “male portion” of the inflation probe 806.

As will be described in the following disclosure at FIGS. 53A-53G, the male portion 806*b* may be permitted to reciprocate to/from a backwardly position (see, e.g., FIG. 52A) and a forwardly position (see, e.g., FIGS. 52B-52D) with respect to the female portion 806*a* such that pair of inflation probes 806 may be said to be arranged in one of a “non-inflation”/“offline” orientation (see, e.g., FIG. 52A) and an “inflation”/“online” orientation (see, e.g., FIGS. 52B-52D). For example, when the pair of inflation probes 806 is said to be arranged in the “non-inflation”/“offline” orientation, the male portion 806*b* may be said to be arranged in a “de-coupled”/“non-mated” orientation (see, e.g., FIG. 52A) with respect to the female portion 806*a*; alternatively, when the pair of inflation probes 806 is said to be arranged in the “inflation”/“online” orientation, the male portion 806*b* may be said to be arranged in a “coupled”/“mated” orientation (see, e.g., FIGS. 52B-52D) with respect to the female portion 806*a*.

Referring to FIGS. 52B-52D, when the male portion 806*b* is arranged in the “coupled”/“mated” orientation with respect to the female portion 806*a*, the male portion 806*b* may be said to fluidly-seal the passage 810 formed by the distal end 808 of the female portion 806*a* of the inflation probe 806. The sealing of the passage 810 may be accomplished by, for example, directly contacting: (1) the front surface 822*a* of the distal end 816 of the second member 806*b* with the upper passage surface 810*a* of the passage 810 proximate the entrance opening 814*a* formed by the rear surface 812*b* of the distal end 808 of the first member 806*a* (as seen in, e.g., FIGS. 52C, 52D), (2) the rear surface 822*b* of the distal end 816 of the second member 806*b* with the lower passage surface 810*b* of the passage 810 proximate the exit opening 814*b* formed by the front surface 812*a* of the distal end 808 of the first member 806*a* (as seen in, e.g., FIGS. 52C, 52D), (3) the left side 820*a* of the distal end 816 of the second member 806*b* with the left side passage surface 810*c* of the passage 810 (as seen in, e.g., FIG. 52D) and (4) the right side 820*b* of the distal end 816 of the second member 806*b* with the right side passage surface 810*d* of the passage 810 (as seen in, e.g., FIG. 52D).

Referring to FIGS. 52A and 52B, in some implementations, the working device 804 may include a controller 824. The controller 824 may include hardware (e.g., memory, a processor and the like) and software that operably-communicates with one or more components of the working device 804; the one or more components may include, for example: a pair of female portion movement actuators 828*a*, a pair of male portion movement actuators 828*b* and a pair of valves 830.

The pair of female portion movement actuators 828*a* includes a first female portion movement actuator 828*a*' and a second female portion movement actuator 828*a*". The pair of male portion movement actuators 828*b* includes a first male portion movement actuator 828*b*' and a second male portion movement actuator 828*b*". The pair of valves includes a first valve 830' and a second valve 830". The first valve 830' is connected to a first pressurized fluid source 832' (of a pair of pressurized fluid sources 832). The second valve 830" is connected to a second pressurized fluid source 832" of the pair of pressurized fluid sources 832. The pair of pressurized fluid sources 832 may also be considered to be included as a component of the working device 804.

Referring to FIGS. 52A-52B and 53A-53G, the working device 804 may further include a pressure sensor 850. As seen in FIGS. 53A-53G, the pressure sensor 850 is arranged to be in communication with the second inflation probe 806" of the pair of inflation probes 806.

As will be described in the following disclosure at FIGS. 53A-53G, the first inflation probe 806' (in combination with the first valve 830' and the first pressurized fluid source 832') exclusively functions as an inflation mechanism for inflating a tire-wheel assembly, TW, with a pressurized fluid, F, whereas the second inflation probe 806" of the pair of inflation probes 806 includes a functionality beyond a single-purpose function inflation mechanism. For example, as seen in FIGS. 53C-53D, the second inflation probe 806" (in combination with the second valve 830" and the second pressurized fluid source 832") firstly functions as an inflation mechanism in a substantially similar manner as the first inflation probe 806'. However, as seen in FIG. 53E, the first functionality associated with an inflation mechanism for the second inflation probe 806" ceases while the first inflation probe 806' continues to operate with the functionality of an inflation mechanism; with continued reference to FIG. 53E, upon ceasing first functionality associated with an inflation mechanism for the second inflation probe 806", the second inflation probe 806" (in combination with the second valve 830" and the pressure sensor 850) then secondly functions as a tire-wheel assembly pressurization detection mechanism.

Referring to FIGS. 52A-52B and 53A-53G, each of the first and second female portion movement actuators 828*a*', 828*a*" are respectively connected to the female portion 806*a* of the first and second inflation probes 806', 806", and, the first and second male portion movement actuators 828*b*', 828*b*" are respectively connected to the male portion 806*b* of the first and second inflation probes 806', 806". The first and second pressurized fluid sources 832', 832" are also respectively connected to the male portion 806*b* of the first and second inflation probes 806', 806" by way of, respectively, the first and second valves 830', 830".

The first and second female and male portion movement actuators 828*a*', 828*a*", 828*b*', 828*b*" may include any device that causes at least bi-directional movement (see, e.g., arrows D, D' in FIGS. 53A-53G). Accordingly, in an embodiment, the first and second female and male portion movement actuators 828*a*', 828*a*", 828*b*', 828*b*" may include, for example, a hydraulic arm, piston or the like that imparts the bi-directional movement D, D'.

Although shown in abstract form in FIGS. 52A and 52B, the working device 804 may be connected to and extend from an upper surface of a load bearing member (such as, e.g., a substantially similar load bearing member 144, 146 shown in FIG. 7). In some implementations, the working device 804 may cause the pair of inflation probes 806 to be moved from the “non-inflation”/“offline” orientation away from a tire-wheel assembly support member such as, for example, a wheeled cart (such as, e.g., a substantially similar wheel cart 42, 66 shown in FIG. 7 and also in, e.g., FIG. 53A-53G) to the “inflation”/“online” orientation proximate the tire-wheel assembly support member 42, 66. As seen in FIGS. 53A-53G, the tire-wheel assembly support member 42, 66 supports a tire, T, and a wheel, W, which may be collectively referred to as a tire-wheel assembly, TW.

Further, in some implementations, the upper surface of the load bearing member 144, 146 may also include an engagement member (such as, e.g., a substantially similar engagement member 148, 150 shown in FIG. 8) that may be interfaced with a respectively-associated mating engagement recess (such as, e.g., a substantially similar engagement recess 152, 154 shown in FIG. 8 and also in, e.g., FIG. 53A-53G) formed in a lower surface (such as, e.g., a substantially similar lower surface 137 shown in FIG. 53A-53G) of the wheeled cart 42, 66.

With continued reference to FIGS. 53A-53G, in some implementations, the inflation work station 800 may include a robotic arm 834 having a first end 834*a* and a second end 834*b*. The first end 834*a* of the robotic arm 834 may be attached to and extend from the upper surface 145, 147 of the load bearing member 144, 146. The second end 834*b* of the robotic arm 834 may terminate with/may include an end effecter or head portion 836 that may be selectively coupled to/selectively interfaced with the tire-wheel assembly, TW. An intermediate portion 834*c* of the robotic arm 834 may be connected to and support one or more of the working device 804 and the inflation probe 806.

Figure 53A:
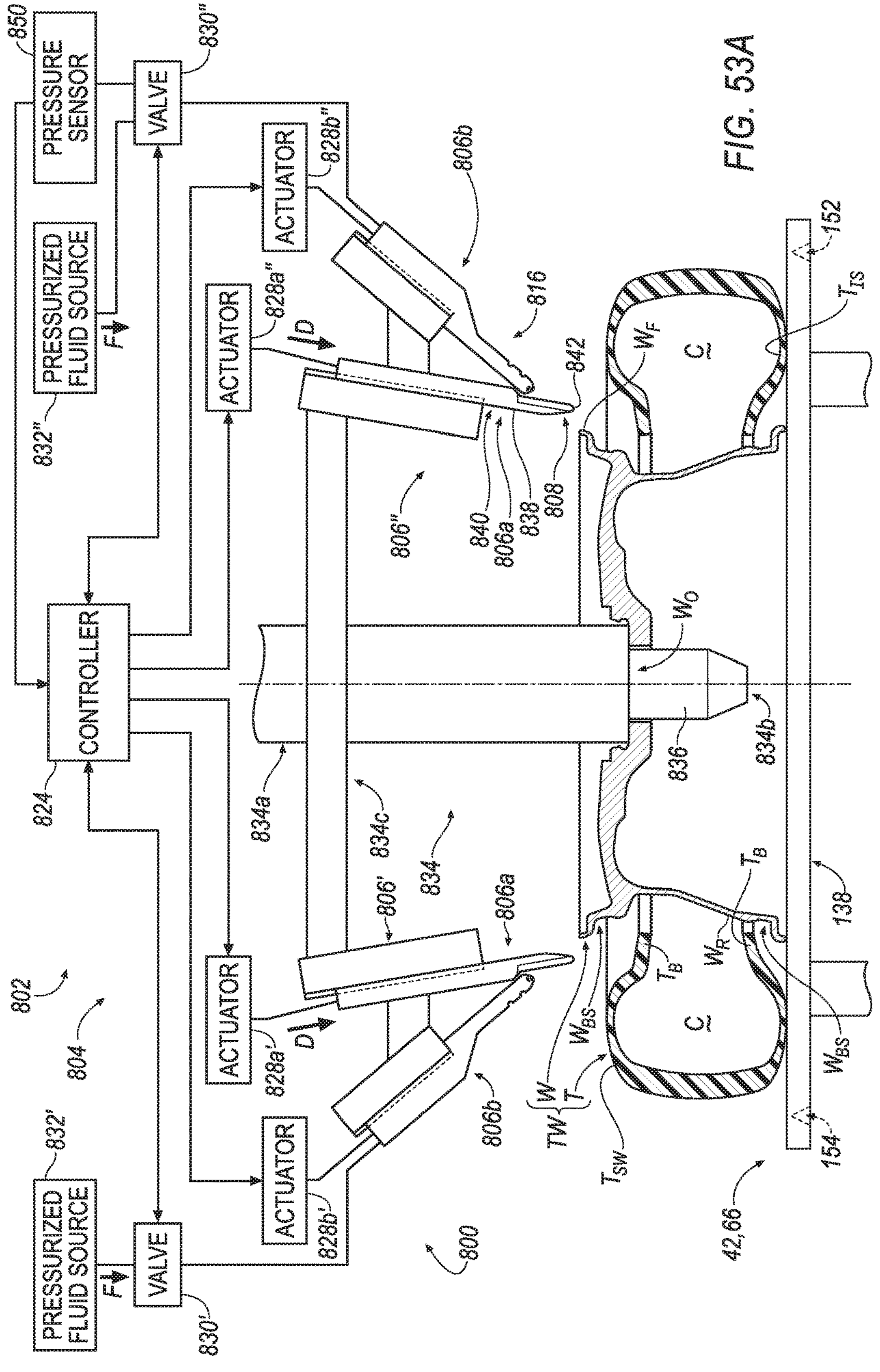
FIGS. 53A-53G illustrate a side view of the inflation work station of FIGS. 52A-52B.

Referring to FIG. 53A, the robotic arm 834 may be moved to an engaged position with respect to the tire-wheel assembly, TW, such that the head portion 836 may be inserted into an axial opening, $W_O$, formed by the wheel, W, such that the head portion 836 may directly engage the wheel, W. Movement of the robotic arm 834 to the engaged position may be conducted by, for example, a prime mover (not shown) connected to the robotic arm 834.

Figure 53B:
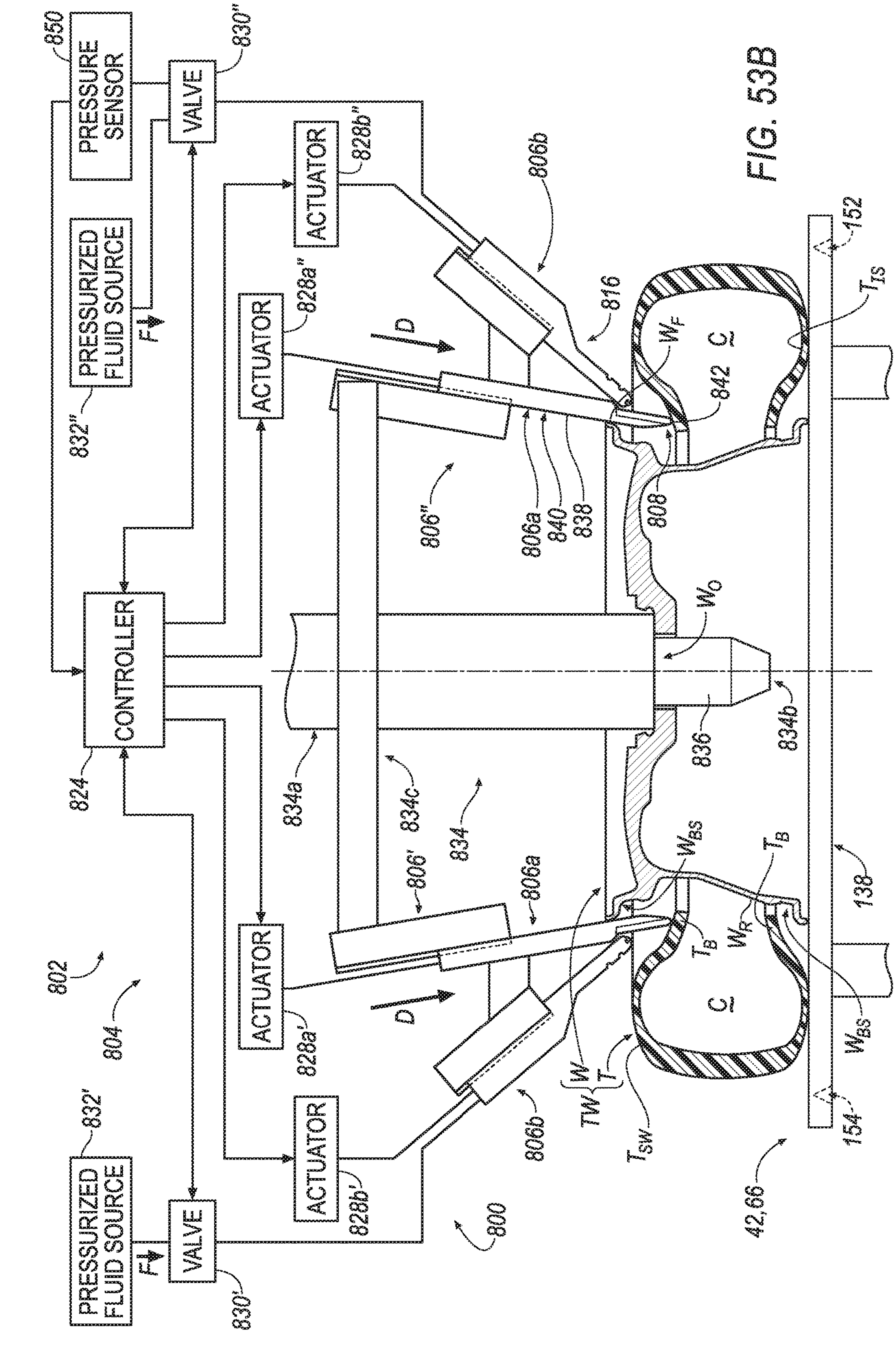
Figure 53C:
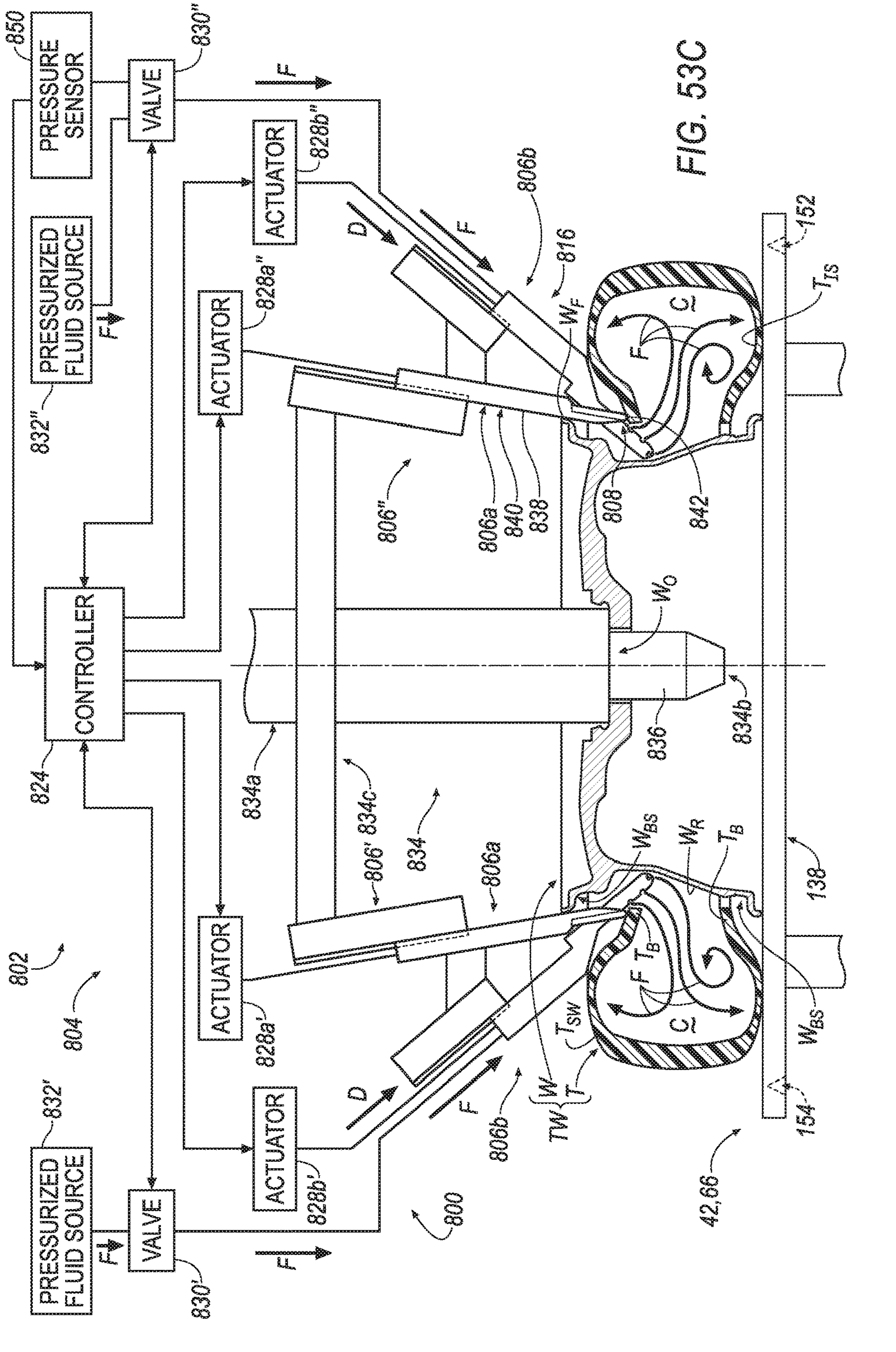
Figure 53D:
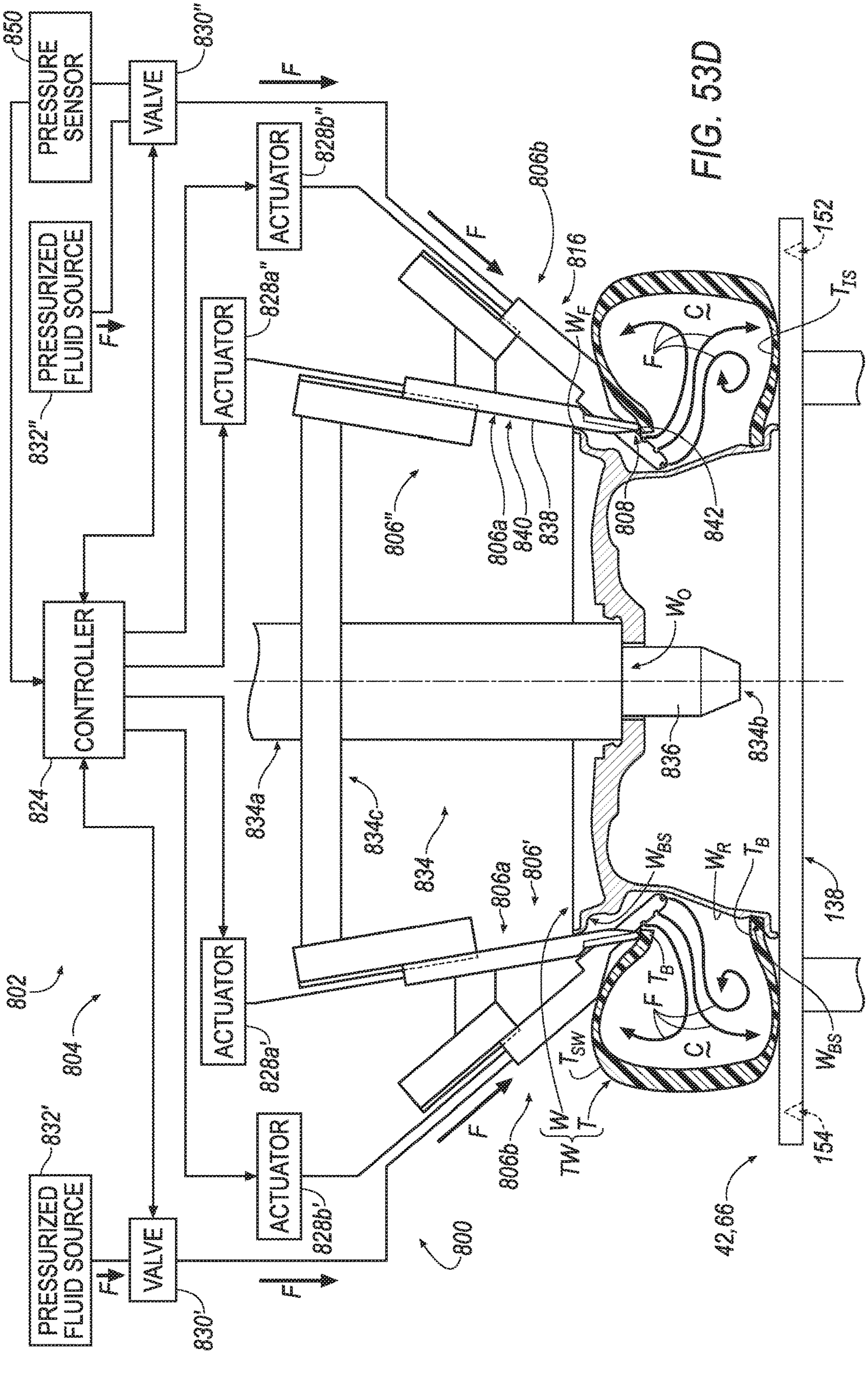
Figure 53E:
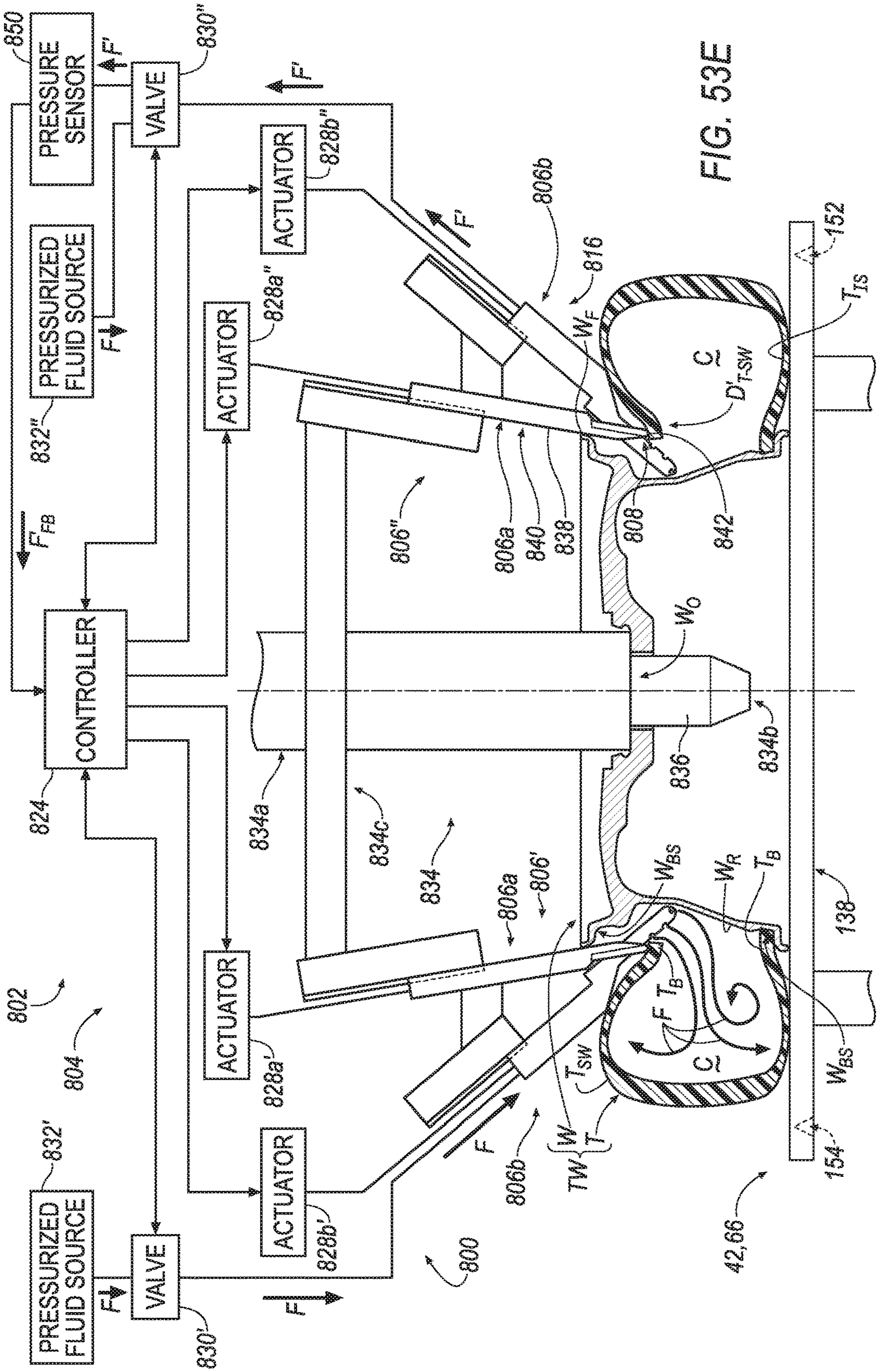

Once the robotic arm 834 is engaged with the wheel, W, the working device 804 may cause movement of each of the first and second inflation probes 806', 806" from a first orientation (e.g., away from) the tire-wheel assembly, TW (as seen in, e.g., FIG. 53A), to a second orientation (e.g., toward/closer-to/at least partially engaging) the tire-wheel assembly, TW (as seen in, e.g., FIG. 53B). Referring to FIG. 53B, the second orientation may be defined as a portion (e.g., the female portion 806*a*) of each of the first and second inflation probes 806', 806" directly engaging both of a portion of the tire, T, and a portion of the wheel, W, of the tire-wheel assembly, TW; in an embodiment, a front surface 838 of a proximal end 840 of the female portion 806*a* directly engages a flange surface, $W_F$, of the wheel, W, while a leading edge 842 of the distal end 808 of the female portion 806*a* directly engages a sidewall surface, $T_{SW}$, of the tire, T. In the second orientation, as seen in FIG. 53B, the male portion 806*b* of the first and second inflation probes 806', 806" may, in an implementation, not engage any of: (1) the female portion 806*a* of the first and second inflation probes 806', 806", (2) the tire, T, and (3) the wheel, W.

Movement of the first and second inflation probes 806', 806" from the first orientation shown in FIG. 53A to the second orientation shown in FIG. 53B may be conducted by the controller 824. Accordingly, in an implementation, the controller 824 may cause: (1) the first and second female portion movement actuators 828*a*', 828*a*" to cause movement of the female portion 806*a* of the first and second inflation probes 806', 806" according to the direction of the arrow, D, and (2) the first and second male portion movement actuators 828*b*', 828*b*" may not yet be actuated in order to cause movement of the male portion 806*b* in order to subsequently "mate" the male portion 806*b* with the female portion 806*a* according to the direction of the arrow, D (as seen in FIG. 53C).

Referring to FIG. 53C, further movement of the first and second inflation probes 806', 806" from the second orientation (as seen in, e.g., FIG. 53B) to a third orientation (as seen in, e.g., FIG. 53C) may be conducted by the controller 824. Accordingly, in an implementation, the controller 824 may cause: (3) the first and second male portion movement actuators 828*b*', 828*b*" to cause further movement of the male portion 806*b* according to the direction of the arrow, D, while (4) the female portion 806*a* of the first and second inflation probes 806', 806" remain in a fixed orientation directly engaging the flange surface, $W_F$, of the wheel, W, and the sidewall surface, $T_{SW}$, of the tire, T. Accordingly, it may be said that the male portion 806*b* is arranged in the "de-coupled"/"non-mated" orientation with respect to the female portion 806*a* in FIGS. 53A-53B (i.e., the first and second inflation probes 806', 806" are said to be arranged in the "non-inflation"/"offline" orientation in FIGS. 53A-53B) whereas the male portion 806*b* is arranged in the "coupled"/"mated" orientation with respect to the female portion 806*a* in FIG. 53C (i.e., the first and second inflation probes 806', 806" are said to be arranged in the "inflation"/"online" orientation in FIG. 53C).

Referring back to FIG. 52C, the male portion 806*b* includes a fluid channel 844. The fluid channel 844 includes a first end 846*a* that is in fluid communication with the first/second pressurized fluid source 832', 832" and a second end 846*b* that terminates with one or more fluid channel openings 848 (see, e.g., FIGS. 52C and 52D) formed in the rear surface 822*b* of the distal end 816 of the male portion 806*b*. As discussed above in FIGS. 52B-52D, when the male portion 806*b* is arranged in the "coupled"/"mated" orientation with respect to the female portion 806*a*, the male portion 806*b* may be said to fluidly-seal the passage 810 of the female portion 806*a*. With reference to FIG. 52C, because the fluid channel 844 extends through the male portion 806*b* of the first and second inflation probes 806', 806", upon arranging the male portion 806*b* in the "coupled"/"mated" orientation with respect to the female portion 806*a*, the fluid channel 844 may be said to be sealingly-extended-through the female portion 806*a* of the first and second inflation probes 806', 806" such that pressurized fluid, F, may be communicated: (1) from the first/second pressurized fluid source 832', 832", (2) into the fluid channel 844 of the male portion 806*b* of the first and second inflation probes 806', 806" such that the pressurized fluid F, is communicated within the fluid channel 844 from an orientation: (3a) upstream of the rear surface 812*b* of the distal end 808 of the female portion 806*a*, (3b) through the fluidly-sealed passage 810 of the female portion 806*a* and (3c) downstream of the front surface 812*a* of the distal end 808 of the female portion 806*a* such that the pressurized fluid, F, is permitted to be (4) evacuated from the one or more fluid channel openings 848 formed in the rear surface 822*b* of the distal end 816 of the second member 806*b*.

Once the male portion 806*b* is arranged in the "coupled"/"mated" orientation with respect to the female portion 806*a* as described above and shown in FIG. 53C, the one or more fluid channel openings 848 formed in the rear surface 822*b* of the distal end 816 of the second member 806*b* may be said to be arranged in fluid communication with a cavity, C, of the tire-wheel assembly, TW. The cavity, C, may be formed by a circumferential rim, $W_R$, of the wheel, W, and an inner surface, $T_{IS}$, of the tire, T.

Further, when the first and second inflation probes 806', 806" are arranged in the "non-inflation"/"offline" orientation in FIGS. 53A-53B, the first and second valves 830', 830" are said to be in a closed orientation such that the pressurized fluid, F, within the first and second pressurized fluid sources 832', 832" are not permitted to be communicated through the fluid channel 844 of the male portion 806*b* of the first and second inflation probes 806', 806". However, once arranged in the "inflation"/"online" orientation as seen in FIG. 53C, the controller 824 may communicate with the first and second valves 830', 830" in order to cause the first and second valves 830', 830" to change in orientation from the closed orientation to an open orientation.

Figure 53F:
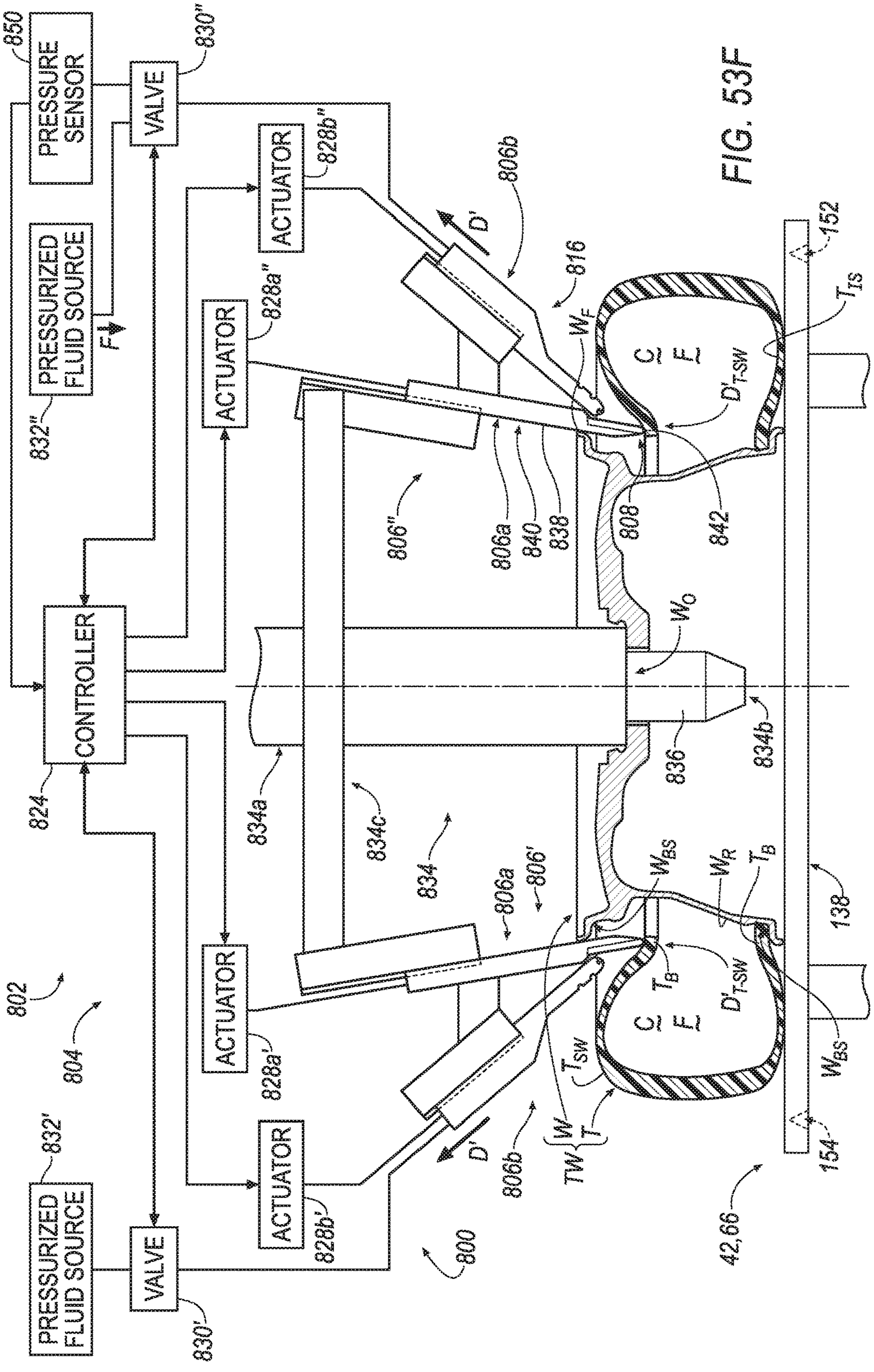
Figure 53G:
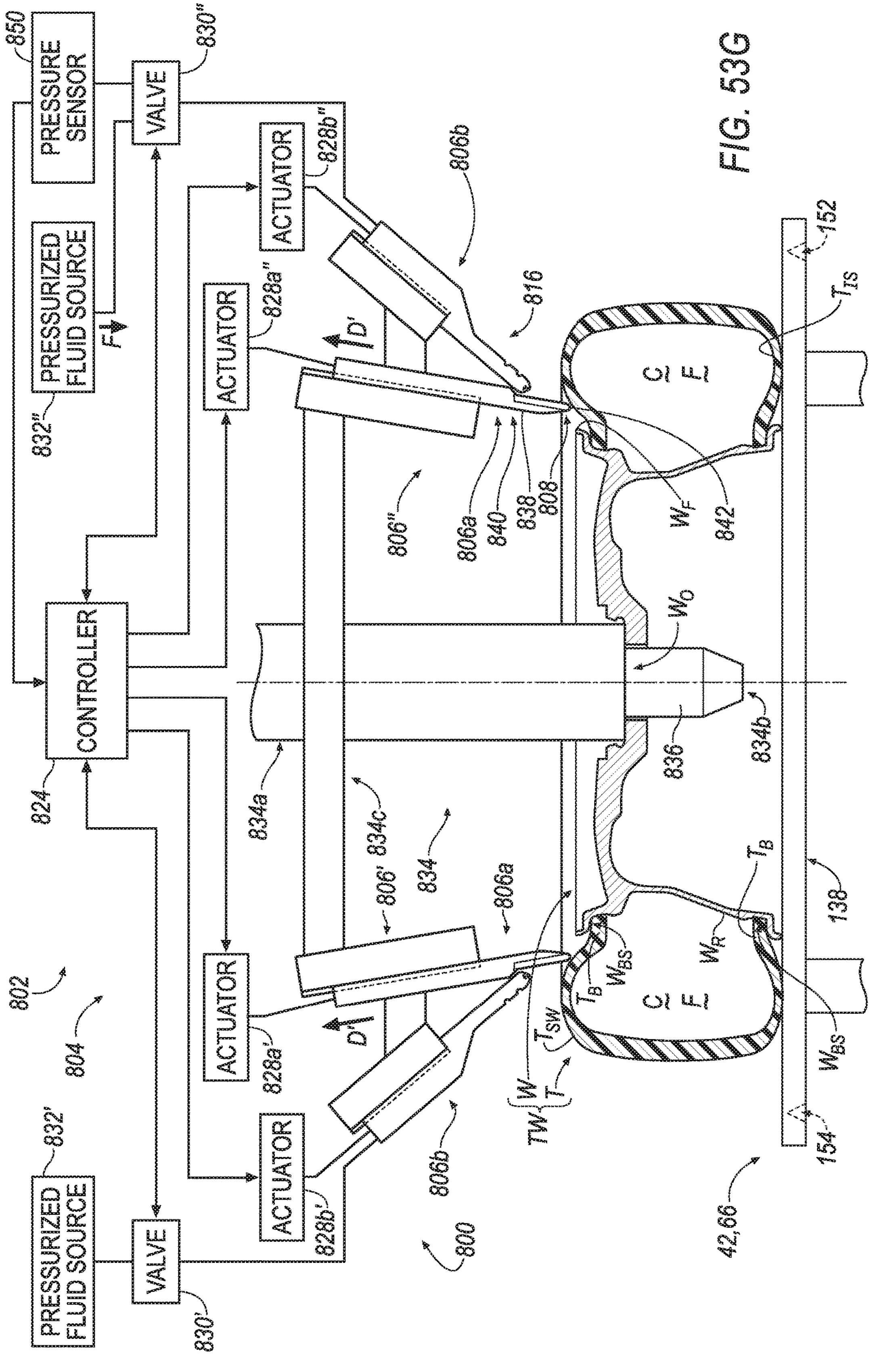

As seen in FIG. 53C, when the first and second valves 830', 830" are arranged in the open orientation, the pressurized fluid, F, within the first and second pressurized fluid sources 832', 832" are permitted to be communicated through the fluid channel 844 of the male portion 806*b* of the first and second inflation probes 806', 806" as described above. Ultimately, the pressurized fluid, F, is evacuated from the male portion 806*b* of the first and second inflation probes 806', 806" by way of the one or more fluid channel openings 848 formed in the rear surface 822*b* of the distal end 816 of the male portion 806*b*. Because the one or more fluid channel openings 848 formed in the rear surface 822*b* of the distal end 816 of the male portion 806*b* is in fluid communication with the cavity, C, of the tire-wheel assembly, TW, the pressurized fluid, F, is deposited into and fills the cavity, C, such that the tire-wheel assembly, TW, becomes pressurized. Pressurization of the cavity, C, of the tire-wheel assembly, TW, results in beads, $T_B$, of the tire, T, being moved by the pressurized fluid, F, from a first orientation (see, e.g., FIGS. 53A-53C) to a second orientation (see, e.g., FIGS. 53D-53G) such that the beads, $T_B$, of the tire, T, may be located proximate/adjacent the bead seats, $W_{BS}$, of the wheel, W. As seen in FIGS. 53F and 53G, upon retracting the first and second inflation probes 806', 806" according to the direction of arrows, D', the beads, $T_B$, of the tire, T, may be located proximate the bead seats, $W_{BS}$, of the wheel, W, in a sealing relationship such that the pressurized fluid, F, may be trapped within the cavity, C, thereby causing the tire, T, to be inflatably-pressurized relative the wheel, W.

Unlike the embodiment described above at FIGS. 51C-51D, where it is described that the controller 724 may permit the valve 730 to be arranged in an open orientation for a "predetermined period of time" in order to permit a "predetermined amount" of pressurized fluid, F, to be deposited into the cavity, C, of the tire-wheel assembly, TW, the embodiment described at FIGS. 53D-53E incorporates the dual inflation/pressurization detection functionality of the second inflation probe 806". For example, in an embodiment, both of the first and second inflation probes 806', 806" may deposit the pressurized fluid, F, into the cavity, C, of the tire-wheel assembly, TW, for a predetermined period of time (e.g., "X number of seconds"), and, then, as described above, the second inflation probe 806" may cease providing the pressurized fluid, F, into the cavity, C, whereas the first inflation probe 806' continues to deposit the pressurized fluid, F, into the cavity, C (it should be noted that although "fluid flow lines" from the one or more fluid channel openings 848 are not illustrated at the male portion 806*b* of the second inflation probe 806" within the cavity, C, at FIG. 53E, pressurized fluid, F, is still provided near this region from the one or more fluid channel openings 848 of the male portion 806*b* of the first inflation probe 806'—the "fluid flow lines" are not illustrated proximate the second inflation probe 806" in order to illustrate the "ceasing" of fluid flow from the second inflation probe 806"). Then, as seen in FIG. 53E, the second inflation probe 806" may switch to the second function of detecting pressurization of the cavity, C.

In an embodiment, the switching of functionality of the second inflation probe 806" from the "inflation function" to the "pressurization detection function" may occur at the second valve 830". For example, the second valve 830" may act as a "fluid switch." In an implementation, as seen at FIGS. 53C-53D, the second valve 830" may be said to behave as a fluid switch by being in an open orientation for the second pressurized fluid source 832" for communicating the pressurized fluid, F, to the cavity, C, while being in an closed orientation for the pressure sensor 850; conversely, as seen at FIG. 53E, the second valve 830" may said to behave as a fluid switch by being in a closed orientation for the second pressurized fluid source 832" (thereby not permitting a flow of the pressurized fluid, F, from the second pressurized fluid source 832" through the fluid channel 844 and into the cavity, C) while being in an open orientation for the pressure sensor 850.

Accordingly, as seen in FIG. 53E, the second inflation probe 830" may utilize the fluid channel 844 as a conduit to communicate (according to the direction of arrow, F', which is opposite the direction of the arrow, F, that indicates a flow of pressurized fluid from the second pressurized fluid source 832" to the cavity, C) to the pressure sensor 850 (by way of the second valve 830") an increasing variation of pressurization of the cavity, C, as a result of the continued depositing of the pressurized fluid, F, into the cavity, C, by the first inflation probe 806'. In an implementation, the pressure sensor 850 may be in communication with the controller 824 such that the pressure sensor 850 may provide feedback, $F'_{FB}$ (e.g., communicate the pressurization value of the cavity, C), to the controller 824.

In an embodiment, the controller 824 may be programmed to include a "desired pressurization value" of the cavity, C. Accordingly, when the pressure sensor 850 communicates a pressurization value, $F'_{FB}$, of the cavity, C, that is approximately equal to about the programmed "desired pressurization value" of the cavity, C, the controller 824 may communicate with the first valve 830' in order to cause the first valve 830' to change orientation from the open orientation to a closed orientation; thus, as seen in FIG. 53F, by arranging the first valve 830' in the closed orientation, depositing of the pressurized fluid, F, from the first pressurized fluid source 832' into the cavity, C, is ceased.

Referring to FIG. 53F, the male portion 806*b* of the first and second inflation probes 806', 806" may be retracted according to the direction of the arrow, D', which is opposite the direction of the arrow, D. In an implementation, the controller 824 may cause retraction of the male portion 806*b* of the first and second inflation probes 806', 806" by communicating with the first and second male portion movement actuators 828*b*', 828*b*" to cause movement of the male portion 806*b* of the pair of inflation probes 806 according to the direction of the arrow, D'. Once the male portion 806*b* of the first and second inflation probes 806', 806" are retracted, the front surface 838 of the proximal end 840 of the female portion 806*a* remains directly engaged with the flange surface, $W_F$, of the wheel, W, while the leading edge 842 of the distal end 808 of the female portion 806*a* remains directly engaged with the sidewall surface, $T_{SW}$, of the tire, T.

Referring to FIG. 53G, the female portion 806*a* of the first and second inflation probes 806', 806" may be retracted according to the direction of the arrow, D', which is opposite the direction of the arrow, D. In an implementation, the controller 824 may cause retraction of the female portion 806*a* of the first and second inflation probes 806', 806" by communicating with the first and second female portion movement actuators 828*a*', 828*a*" to cause movement of the female portion 806*a* of the first and second inflation probes 806', 806" according to the direction of the arrow, D'. Once the female portion 806*a* of the first and second inflation probes 806', 806" are retracted, the front surface 838 of the proximal end 840 of the female portion 806*a* is no longer engaged with the flange surface, $W_F$, of the wheel, W, and, further, the leading edge 842 of the distal end 808 of the female portion 806_a_ is no longer engaged with the sidewall surface, $T_{SW}$, of the tire, T.

Additionally, because of the pressurized fluid, F, trapped within the cavity, C, of the tire-wheel assembly, TW, the sidewall surface, $T_{SW}$, of the tire, T, may also exert a force (according to the direction of the arrow, $D'_{T-SW}$, as seen in FIGS. 53E and 53F) for assisting in retraction of the female portion 806_a_ of the first and second inflation probes 806', 806" away from the tire-wheel assembly, TW. Further, as seen in FIG. 53F, because of the contact of the leading edge 842 of the distal end 808 of the female portion 806_a_ with the sidewall surface, $T_{SW}$, of the tire, T, a portion of the bead, $T_B$, of the tire, T, is inhibited from being located proximate/adjacent a portion of the bead seat, $W_{BS}$, of the wheel, W; accordingly, as seen in FIG. 53G, upon retraction of the female portion 806_b_ of the first and second inflation probes 806', 806" according to the direction of the arrow, D', and, because of the pressurized fluid, F, trapped within the cavity, C, of the tire-wheel assembly, TW, the remaining portion of the bead, $T_B$, of the tire, T, that was previously inhibited (as seen in FIG. 53F) from being located proximate/adjacent a portion of the bead seat, $W_{BS}$, of the wheel, W, may be permitted to become seated adjacent the bead seat, $W_{BS}$, of the wheel, W.

The working device 704, 804 of each of the systems 702, 802 includes (an) inflation probe(s) 706, 806', 806" that are designed to include a minimal amount of surface area contact with the tire-wheel assembly, TW. For example, the front surface 738, 838 of the proximal end 740, 840 of the female portion 706_a_, 806_a_ of the inflation probe(s) 706, 806', 806" directly engages a limited portion of the flange surface, $W_F$, of the wheel, W, while the leading edge 742, 842 of the distal end 708, 808 of the female portion 706_a_, 806_a_ directly engages a limited portion of the sidewall surface, $T_{SW}$, of the tire, T. Because the tire, T, may be a deformable, non-rigid material, there may be a limited amount of wear to leading edge 742, 842 of the distal end 708, 808 of the female portion 706_a_, 806_a_ due to successive inflation operations to be conducted upon a plurality of tire-wheel assemblies, TW. However, because the wheel, W, may include a substantially rigid, metal material, an otherwise greater amount of wear could be imparted to the inflation probe(s) 706, 806', 806"; therefore, as a result of: (1) the minimal amount of contact arising from the front surface 738, 838 of the proximal end 740, 840 of the female portion 706_a_, 806_a_ of the inflation probe(s) 706, 806', 806" directly engaging the limited portion of the flange surface, $W_F$, of the wheel, W, and, (2) due to the sliding, bi-directional movement, D/D', of the female portion 706_a_, 806_a_ relative to the flange surface, $W_F$, of the wheel, W, the inflation probe(s) 706, 806', 806" are less likely to be serviced as a result of wear occurring from repeatable contact with one or more of the wheel, W, and the tire, T, of a tire-wheel assembly, TW.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. An inflation probe for inflating a tire-wheel assembly including a tire, the inflation probe comprising:

a female portion; and a male portion that mates with the female portion by extending at least partially through a passage defined by the female portion, the male portion including a channel that carries a fluid to inflate a cavity within the tire-wheel assembly.

2. The inflation probe of claim 1, wherein the passage includes a substantially square-shape-tubular dimension and wherein, the passage is formed by an upper passage surface, a lower passage surface, a left side passage surface and a right side passage surface.

3. The inflation probe of claim 2, wherein the male portion mates with the female portion by contacting a portion of the upper passage surface and a portion of the lower passage surface.

4. The inflation probe of claim 1, wherein the passage extends through a thickness of a distal end of the female portion, wherein the thickness is bound by a front surface of the distal end of the female portion and a rear surface of the distal end of the female portion.

5. The inflation probe of claim 1, wherein the male portion fluidly seals the passage when mated with the female portion.

6. The inflation probe of claim 5, wherein the male portion fluidly seals the passage by directly contacting opposing surfaces of a distal end of the female portion.

7. The inflation probe of claim 6, wherein the tire-wheel assembly includes a wheel and the tire, the cavity is formed by a circumferential rim of a wheel and an inner surface of the tire.

8. The inflation probe of claim 7, wherein the female portion contacts a bead of the tire and a flange surface of the wheel during inflation.

9. The inflation probe of claim 1, wherein the male portion includes a distal end, and wherein the channel includes a first end and a second end, and wherein the channel forms an opening in the distal end.

10. The inflation probe of claim 1, wherein the male portion can be decoupled from the female portion to be arranged in a non-inflation orientation.

11. An inflation probe comprising:

a female portion; and a male portion that mates with the female portion by extending through a passage of the female portion in an online orientation, the male portion including a channel that carries a fluid to inflate a cavity within a tire-wheel assembly, the male portion is in a non-mated orientation in an offline orientation.

12. The inflation probe of claim 11, wherein the male portion fluidly seals the passage when mated with the female portion in the online orientation.

13. The inflation probe of claim 12, wherein the male portion contacts opposing surfaces of a distal end of the female portion in the online orientation.

14. The inflation probe of claim 11, wherein the female portion contacts a bead of the tire and a flange surface of the wheel during inflation in the online orientation.

15. The inflation probe of claim 11, the passage includes a substantially square-shape-tubular dimension, the passage is formed by an upper passage surface, a lower passage surface, a left side passage surface and a right side passage surface.

16. The inflation probe of claim 11, wherein the passage extends through a thickness of a distal end of the female portion, wherein the thickness is bound by a front surface of the distal end of the female portion and a rear surface of the distal end of the female portion.

17. The inflation probe of claim 11, wherein the male portion includes a distal end, the channel includes a first end and a second end, the channel forms an opening along a surface of the distal end.

18. The inflation probe of claim 11, wherein the male portion can be decoupled from the female portion to be arranged in the offline orientation.

19. A method of inflating a tire, the method comprising:

contacting the tire and a wheel rim with a female portion of an inflator;

extending a distal end of a male portion of the inflator through a passage within the female portion, the male portion including a channel that terminates with a fluid channel opening along a surface of the distal end;

forming a seal between the male portion and the female portion; and injecting a fluid through the channel of the male portion into a cavity.

20. The method of claim 19, further comprising decoupling the male portion from the female portion.

* * * * *